(12) United States Patent
Saari et al.

(10) Patent No.: US 12,259,563 B2
(45) Date of Patent: Mar. 25, 2025

(54) LIGHT FIELD IMAGING DEVICE AND METHOD FOR 3D SENSING

(71) Applicant: AIRY3D INC., Montreal (CA)

(72) Inventors: Jonathan Ikola Saari, Halifax (CA); Ji-Ho Cho, Montreal (CA); Pascal Grégoire, Montreal (CA)

(73) Assignee: AIRY3D INC., Montreal (CA)

( * ) Notice: Subject to any disclaimer, the term of this patent is extended or adjusted under 35 U.S.C. 154(b) by 696 days.

(21) Appl. No.: 17/596,184

(22) PCT Filed: Jun. 3, 2020

(86) PCT No.: PCT/CA2020/050760
§ 371 (c)(1),
(2) Date: Dec. 3, 2021

(87) PCT Pub. No.: WO2020/243828
PCT Pub. Date: Dec. 10, 2020

(65) Prior Publication Data
US 2022/0221733 A1    Jul. 14, 2022

Related U.S. Application Data

(60) Provisional application No. 62/857,469, filed on Jun. 5, 2019.

(51) Int. Cl.
*G02B 27/42* (2006.01)
*G02B 5/18* (2006.01)
(Continued)

(52) U.S. Cl.
CPC ........ *G02B 27/4211* (2013.01); *G02B 5/1842* (2013.01); *G02B 5/1871* (2013.01); *H04N 25/11* (2023.01); *H04N 23/957* (2023.01)

(58) Field of Classification Search
CPC .......................... G02B 27/4211; G02B 27/42; G02B 27/4205; G02B 5/1842; G02B 5/1871;
(Continued)

(56) References Cited

U.S. PATENT DOCUMENTS

| 3,756,695 A | 9/1973 | Mino |
| 3,910,683 A | 10/1975 | Nishino |

(Continued)

FOREIGN PATENT DOCUMENTS

| JP | 4978105 | 7/2012 |
| WO | 2007/031992 A1 | 3/2007 |
| WO | 2017/210781 | 12/2017 |

OTHER PUBLICATIONS

Extended European Search Report issued in corresponding European Patent Application No. 20819248.4, mailed Jun. 22, 2023, 8 pages.
Written Opinion and International Search Report for corresponding PCT application No. PCT/CA2020/050760, dated Aug. 11, 2020.
Chinese Office Action in Chinese Application No. 201780048871.2, dated Nov. 25, 2020.
(Continued)

*Primary Examiner* — Derek S. Chapel
*Assistant Examiner* — Adam W Booher
(74) *Attorney, Agent, or Firm* — McDonnell Boehnen Hulbert & Berghoff LLP

(57) ABSTRACT

A light field imaging device may include a diffraction grating assembly configured to receive an optical wavefront from a scene and including one or more diffraction gratings. Each diffraction grating has a refractive index modulation pattern with a grating period along a grating axis and is configured to generate a diffracted wavefront. The device may also include a pixel array configured to detect the diffracted wavefront in a near-field region. The pixel array includes light-sensitive pixels and a pixel pitch along the grating axis that is equal to or larger than the grating period. Each pixel samples a portion of the diffracted wavefront and generates a pixel response. The pixels include groups or (Continued)

pairs of adjacent pixels, where the adjacent pixels in each group or pair have different pixel responses as a function of the angle of incidence of the optical wavefront. Light field imaging methods are also disclosed.

20 Claims, 25 Drawing Sheets

(51) Int. Cl.
  *H04N 23/957* (2023.01)
  *H04N 25/11* (2023.01)
(58) Field of Classification Search
  CPC ...... G02B 5/18; G02B 5/1814; G02B 5/1819;
       G02B 5/1866; G02B 2005/1804; H04N
       25/11; H04N 23/957; H04N 23/80; H04N
       23/95; H04N 23/00; H04N 23/955; H04N
       23/958
  See application file for complete search history.

(56) References Cited

U.S. PATENT DOCUMENTS

| | | | |
|---|---|---|---|
| 3,940,788 A | 2/1976 | Abe |
| 4,105,289 A | 8/1978 | Hershel |
| 4,255,019 A | 3/1981 | Knop |
| 4,729,641 A | 3/1988 | Matsuoka |
| 4,998,800 A | 3/1991 | Nishida |
| 5,007,708 A | 4/1991 | Gaylord |
| 5,046,827 A | 9/1991 | Frost |
| 5,225,920 A | 7/1993 | Kasazumi |
| 5,237,452 A | 8/1993 | Okayama |
| 5,467,224 A | 11/1995 | Ohnishi |
| 5,513,025 A | 4/1996 | Watanabe |
| 5,513,289 A | 4/1996 | Hosokawa |
| 5,621,487 A | 4/1997 | Shirochi |
| 5,627,847 A | 5/1997 | Leger |
| 5,682,265 A | 10/1997 | Farn |
| 6,040,857 A | 3/2000 | Hirsh |
| 6,081,354 A | 6/2000 | Gambogi, Jr. |
| 6,101,034 A | 8/2000 | Cox |
| 6,219,015 B1 | 4/2001 | Bloom |
| 6,310,724 B1 | 10/2001 | Shirochi |
| 6,473,144 B1 | 10/2002 | Ichikawa |
| 6,738,171 B1 | 5/2004 | Campbell |
| 6,819,361 B1 | 11/2004 | Lee |
| 6,981,773 B2 | 1/2006 | Kamijima |
| 6,999,235 B2 | 2/2006 | Nakamura |
| 7,113,341 B2 | 9/2006 | Kamijima |
| 7,114,820 B1 | 10/2006 | Parikka |
| 7,133,204 B2 | 11/2006 | Urey |
| 7,253,799 B2 | 8/2007 | Lee |
| 7,423,796 B2 | 9/2008 | Woodgate |
| 7,719,767 B2 | 5/2010 | Lin |
| 8,189,260 B2 | 5/2012 | Lin |
| 8,199,231 B2 | 6/2012 | Takamiya |
| 8,514,352 B2 | 8/2013 | Montgomery |
| 8,530,811 B2 | 9/2013 | Molnar |
| 8,680,591 B2 | 3/2014 | Haddad |
| 8,736,787 B2 | 5/2014 | Li |
| 8,767,047 B2 | 7/2014 | Molnar |
| 8,792,027 B2 | 7/2014 | Yamagata |
| 8,809,758 B2 | 8/2014 | Molnar |
| 8,823,067 B2 | 9/2014 | Wasaki |
| 8,963,808 B2 | 2/2015 | Gollier |
| 9,203,054 B2 | 12/2015 | Hirasawa |
| 9,515,113 B2 | 12/2016 | Gill |
| 9,819,846 B2 | 11/2017 | Masuda |
| 9,851,579 B2 | 12/2017 | Inada |
| 10,317,589 B2 | 6/2019 | Ueda |
| 10,319,760 B2 | 6/2019 | Lin |
| 10,429,660 B2 | 10/2019 | Chen |
| 10,481,328 B1 | 11/2019 | Krueger |
| 2003/0067460 A1 | 4/2003 | Tomono |
| 2005/0260349 A1 | 11/2005 | Pawlowski |
| 2006/0209292 A1 | 9/2006 | Dowski |
| 2007/0047221 A1 | 3/2007 | Park |
| 2008/0186491 A1 | 8/2008 | Baxter |
| 2009/0122229 A1 | 5/2009 | Kim |
| 2009/0180115 A1 | 7/2009 | Wilson |
| 2009/0180180 A1 | 7/2009 | Shimshi |
| 2010/0118172 A1 | 5/2010 | McCarten |
| 2010/0165134 A1 | 7/2010 | Dowski |
| 2010/0243869 A1 | 9/2010 | Wano |
| 2010/0244168 A1 | 9/2010 | Shiozawa |
| 2011/0134294 A1 | 6/2011 | Ernst |
| 2011/0192962 A1 | 8/2011 | Nishiwaki |
| 2011/0266441 A1 | 11/2011 | Fagan, III |
| 2012/0008056 A1 | 1/2012 | Gong |
| 2012/0013654 A1 | 1/2012 | Yashiro |
| 2012/0091372 A1 | 4/2012 | Molnar |
| 2014/0146207 A1 | 5/2014 | Yokogawa |
| 2014/0253781 A1 | 9/2014 | Gill |
| 2014/0313368 A1 | 10/2014 | Tanaka |
| 2015/0042858 A1 | 2/2015 | Kokubun |
| 2015/0061065 A1 | 3/2015 | Gill |
| 2015/0070536 A1 | 3/2015 | Sasaki |
| 2015/0125943 A1 | 5/2015 | Molnar |
| 2015/0138402 A1 | 5/2015 | Ng |
| 2015/0293018 A1 | 10/2015 | Stork |
| 2015/0371434 A1 | 12/2015 | Nash |
| 2016/0003994 A1 | 1/2016 | Gill |
| 2016/0062100 A1 | 3/2016 | Cohen |
| 2016/0088265 A1 | 3/2016 | Lu |
| 2016/0126275 A1 | 5/2016 | Kurokawa |
| 2016/0133762 A1 | 5/2016 | Blasco Claret |
| 2016/0187664 A1 | 6/2016 | Chen |
| 2016/0225922 A1 | 8/2016 | Akkaya |
| 2016/0337607 A1 | 11/2016 | Okamoto |
| 2017/0059412 A1 | 3/2017 | Ye |
| 2017/0084046 A1 | 3/2017 | Gill |
| 2017/0112376 A1 | 4/2017 | Gill |
| 2017/0115436 A1 | 4/2017 | Qian |
| 2017/0171470 A1 | 6/2017 | Sakioka |
| 2017/0229503 A1 | 8/2017 | Suzuki |
| 2017/0300011 A1 | 10/2017 | Gill |
| 2017/0373105 A1 | 12/2017 | Galor Gluskin |
| 2018/0011237 A1 | 1/2018 | Fattal |
| 2018/0020157 A1 | 1/2018 | Gill |
| 2018/0149796 A1 | 5/2018 | Xu |
| 2018/0350856 A1 | 12/2018 | Masagaki |
| 2019/0086698 A1 | 3/2019 | Mizusaki |
| 2019/0246091 A1 | 8/2019 | Bikumandia |
| 2019/0257987 A1 | 8/2019 | Saari |
| 2019/0339485 A1 | 11/2019 | Nakamura |
| 2020/0075656 A1 | 3/2020 | Lee |
| 2020/0150489 A1 | 5/2020 | Ma |

OTHER PUBLICATIONS

International Search Reported mailed Aug. 24, 2017, issued in connection with International Application No. PCT/CA2017/050686, filed on Jun. 6, 2017, 3 pages.
Written Opinion mailed Aug. 24, 2017, issued in connection with International Application No. PCT/CA2017/050686, filed on Jun. 6, 2017, 4 pages.
PCT/CA2018/051554, International Search Report (mailing date Feb. 20, 2019) and Written Opinion of the International Searching Authority (date of completion Jan. 14, 2019).
Wang et al. "A Light-Field Image Sensor in 180 nm CMOS", IEEE Journal of Solid-State Circuits, 2012, 47(1):257-271.
Extended European Search Report of European Patent Application 17809494.2, Jan. 21, 2020.
Noponen et al., "Electromagnetic theory of Talbot imaging", Optics Communications 98. 1993, pp. 132-140, North Holland.
Suleski, "Generation of Lohmann images from binary-phase Talbot array illuminators", Applied Optics, vol. 36, No. 20, Jul. 10, 1997, pp. 4686-4691.

LIGHT FIELD IMAGING DEVICE AND METHOD FOR 3D SENSING

CROSS REFERENCE TO RELATED APPLICATION

The present application is a U.S. National Phase of International (PCT) Application No. PCT/CA20/35589, filed Jun. 3, 2020, and claims priority to U.S. Provisional Patent Application No. 62/857,469 filed on Jun. 5, 2019, the contents of each of which are hereby incorporated by reference.

TECHNICAL FIELD

The general technical field relates to imaging systems and methods and, more particularly, to a light field imaging device and method for 3D sensing.

BACKGROUND

Traditional imaging hardware involves the projection of complex three-dimensional (3D) scenes onto simplified two-dimensional (2D) planes, forgoing dimensionality inherent in the incident light. This loss of information is a direct result of the nature of square-law detectors, such as charge-coupled devices (CCD) or complementary metal-oxide-semiconductor (CMOS) sensor arrays, which can only directly measure the time-averaged intensity I of the incident light, not its phase, $\varphi$, or wave vector, k, or angular frequency, $\omega$:

$$I \sim \langle E(t) \rangle; \text{ where } E(t) = E_0 \cos(\vec{k} \cdot \vec{r} - \omega t + \varphi). \quad (1)$$

Plenoptic cameras generally describe a scene through the "plenoptic function", which parameterizes a light field impingent on an observer or point by:

$$P = P(x, y, \lambda, t, V_x, V_y, V_z, p), \quad (2)$$

where the x and y coordinates define a certain image plane at time t, for wavelength $\lambda$, and polarization angle p, as witnessed by an observer at location $(V_x, V_y, V_z)$. While they may be single- or multi-sensor based systems, current plenoptic cameras rely, at minimum, solely on the intensity of light detected by any given pixel of a sensor array. More practically, existing solutions, such as stereovision or micro-lensing, sacrifice overall image quality and sensor footprint by employing multiple sensors or sensor segmentation to accommodate the various fields of view required to discern depth.

Random binary occlusion masks and coded apertures are other existing approaches that provide single-sensor solutions with minimal impact on packaging or overall footprint. However, despite advances in compressed sensing and non-linear reconstruction techniques, these solutions remain hindered by the massive image dictionaries and computational expense involved.

Time-of-flight and structured-light based techniques actively illuminate a scene with pulsed, patterned, or modulated continuous-wave infrared light, and determine depth via the full return-trip travel time or subtle changes in the illuminated light pattern. While these techniques do not suffer from image segmentation, they generally require additional active infrared emitters and detectors which increase both power consumption and overall device footprint. Furthermore, these techniques tend to be sensitive to interfering signals, specular reflections, and ambient infrared light, thus limiting their viability outdoors.

Challenges therefore remain in light field imaging techniques, particularly in terms of providing 3D sensing solutions that can deliver both 2D image and depth information in a single-sensor system without excessive computational or manufacturing complexity.

SUMMARY

The present description generally relates to light field imaging techniques for 3D sensing and imaging applications.

In accordance with an aspect, there is provided a light field imaging device, including:

a diffraction grating assembly configured to receive an optical wavefront incident from a scene, the diffraction grating assembly including a diffraction grating having a grating axis and a refractive index modulation pattern with a grating period along the grating axis, the diffraction grating being configured to generate, in a near-field region, a diffracted wavefront having an intensity pattern that is spatially modulated according to the grating period and that shifts laterally along the grating axis as a function of an angle of incidence of the optical wavefront; and a pixel array configured to detect the diffracted wavefront in the near-field region, the pixel array having a plurality of light-sensitive pixels and a pixel pitch along the grating axis that is equal to or larger than the grating period, the light-sensitive pixels being configured to sample respective portions of the diffracted wavefront and generate therefrom corresponding pixel responses, the plurality of light-sensitive pixels including groups of adjacent pixels, the adjacent pixels in each group having different pixel responses as a function of the angle of incidence.

In one embodiment, a ratio of the pixel pitch to the grating period is different from a positive integer.

In one embodiment, the groups of adjacent pixels are pairs of adjacent pixels. In one embodiment, the ratio of the pixel pitch to the grating period is equal to $(2n+1)/2$, where n is a positive integer, for example, n=1 or n=2. In one embodiment, the light field imaging device further includes a processor configured to compute a plurality of summed pixel responses, each summed pixel response being based on a sum of the pixel responses of a respective one of the pairs of adjacent pixels, and generate a 2D image of the scene from the plurality of summed pixel responses; and/or compute a plurality of differential pixel responses, each differential pixel response being based on a difference between the pixel responses of a respective one of the pairs of adjacent pixels, and generate a depth image of the scene from the plurality of differential pixel responses.

In one embodiment, the ratio of the pixel pitch to the grating period is equal to n/m, where n and m are positive integers larger than two, and n is larger than m, for example, m=3 and n=4.

In one embodiment, the adjacent pixels in each group have identical pixel dimensions along the grating axis. In another embodiment, the adjacent pixels in each group do not all have identical pixel dimensions along the grating axis.

In one embodiment, a ratio of the pixel pitch to the grating period is equal to one and the adjacent pixels in each group do not all have identical pixel dimensions along the grating axis. In one embodiment, the groups of adjacent pixels are pairs of adjacent pixels.

In one embodiment, the diffraction grating is a phase grating, for example, a binary phase grating. In one embodiment, the refractive index modulation pattern of the binary phase grating includes a series of ridges periodically spaced-apart at the grating period, interleaved with a series of grooves periodically spaced-apart at the grating period. In one embodiment, each group of adjacent pixels provided with a chief ray angle of zero is positioned in alignment with a center of a corresponding one of the ridges, a center of a corresponding one of the grooves, or a transition between a corresponding one of the ridges and a corresponding one of the grooves. In one embodiment, a degree of vertical alignment between the ridges and the grooves and the underlying light-sensitive pixels changes as a function of position within the pixel array. In one embodiment, the diffraction grating has a duty cycle of about 50%. In another embodiment, the diffraction grating has a duty cycle different from 50%.

In one embodiment, the grating period ranges from 0.1 micrometer to 10 micrometers. In one embodiment, the pixel pitch ranges from 0.7 micrometer to 10 micrometers.

In one embodiment, a separation distance between the refractive index modulation pattern of the diffraction grating and a light-receiving surface of the pixel array ranges from 0.2 micrometer to 20 micrometers. In another embodiment, a separation distance between the refractive index modulation pattern of the diffraction grating and a light-receiving surface of the pixel array is less than about twenty times a center wavelength of the optical wavefront.

In one embodiment, the light field imaging device further includes a color filter array disposed over the pixel array and including a plurality of color filters arranged in a mosaic color pattern, the color filter array being configured to filter the diffracted wavefront according to the mosaic color pattern prior to detection of the diffracted wavefront by the pixel array. In one embodiment, the mosaic color pattern is a Bayer pattern. In one embodiment, the adjacent pixels in each group are disposed under identical color filters. In one embodiment, the identical color filters are green filters.

In one embodiment, each color filter is a red filter, a green filter, a blue filter, a yellow filter, a cyan filter, a magenta filter, a clear filter, or an infrared filter.

In one embodiment, the light field imaging device further includes a microlens array disposed over the pixel array and below the diffraction grating assembly, the microlens array including a plurality of microlenses, each microlens being optically coupled to a corresponding one of the light-sensitive pixels.

In one embodiment, the light field imaging device further includes pixel array circuitry disposed either under the pixel array, in a backside illumination configuration, or between the diffraction grating assembly and the pixel array, in a frontside illumination configuration.

In one embodiment, the diffraction grating is a single diffraction grating of the diffraction grating assembly.

In one embodiment, the diffraction grating is one of a plurality of diffraction gratings of the diffraction grating assembly. In one embodiment, the plurality of diffraction gratings is arranged in a two-dimensional grating array disposed over the pixel array. In one embodiment, the diffraction gratings are not all identical. In one embodiment, the plurality of diffraction gratings includes multiple sets of diffraction gratings, the grating axes of the diffraction gratings of different ones of the sets having different orientations. In one embodiment, the multiple sets of diffraction gratings include a first set of diffraction gratings and a second set of diffraction gratings, the grating axes of the diffraction gratings of the first set extending substantially perpendicularly to the grating axes of the diffraction gratings of the second set.

In one embodiment, the diffraction grating is one of a plurality of diffraction gratings of the diffraction grating assembly, each diffraction grating includes a grating substrate including a top surface having the refractive index modulation pattern formed thereon, and the grating substrate includes a spectral filter material or region configured to filter the diffracted wavefront prior to detection of the diffracted wavefront by the plurality of light-sensitive pixels, the plurality of diffraction gratings thus forming a color filter array. In one embodiment, the grating substrate of each diffraction grating acts as a red filter, a green filter, a blue filter, a yellow filter, a cyan filter, a magenta filter, a clear filter, or an infrared filter. In one embodiment, the color filter array is arranged in a Bayer pattern.

In accordance with another aspect, there is provided a light field imaging device, including:
 a diffraction grating assembly configured to receive an optical wavefront incident from a scene, the diffraction grating assembly including a diffraction grating having a grating axis and a refractive index modulation pattern with a grating period along the grating axis, the diffraction grating being configured to diffract the optical wavefront to generate a diffracted wavefront; and
 a pixel array having a plurality of light-sensitive pixels disposed under the diffraction grating assembly and configured to detect the diffracted wavefront in a near-field region, the pixel array having a pixel pitch along the grating axis that is larger than the grating period, a ratio of the pixel pitch to the grating period being different from a positive integer In one embodiment, the ratio of the pixel pitch to the grating period is equal to $(2n+1)/2$, where n is a positive integer, for example, $n=1$ or $n=2$.

In one embodiment, the ratio of the pixel pitch to the grating period is equal to $n/m$, where n and m are positive integers larger than two, and n is larger than m, for example, $m=3$ and $n=4$.

In one embodiment, the light-sensitive pixels are configured to sample respective portions of the diffracted wavefront and generate therefrom corresponding pixel responses, the plurality of light-sensitive pixels including pairs of adjacent pixels, the adjacent pixels in each pair having different pixel responses as a function of angle of incidence, the light field imaging device further including a processor configured to: compute a plurality of summed pixel responses, each summed pixel response being based on a sum of a pixel responses of a respective one of the pairs of adjacent pixels, and generate a 2D image of the scene from the plurality of summed pixel responses; and/or compute a plurality of differential pixel responses, each differential pixel response being based on a difference between the pixel responses of a respective one of the pairs of adjacent pixels, and generate a depth image of the scene from the plurality of differential pixel responses.

In one embodiment, pixels have identical pixel dimensions along the grating axis. In another embodiment, the pixels do not all have identical pixel dimensions along the grating axis.

In one embodiment, the diffraction grating is a phase grating, for example, a binary phase grating. In one embodiment, the refractive index modulation pattern includes a series of ridges periodically spaced-apart at the grating period, interleaved with a series of grooves periodically spaced-apart at the grating period. In one embodiment, each pixel with a chief ray angle of zero is positioned in alignment with a center of a corresponding one of the ridges, a center of a corresponding one of the grooves, or a transition between a corresponding one of the ridges and a corresponding one of the grooves. In one embodiment, a degree of vertical alignment between the ridges and the grooves and the underlying light-sensitive pixels changes as a function of position within the pixel array. In one embodiment, the diffraction grating has a duty cycle of about 50%. In another embodiment, the diffraction grating has a duty cycle different from 50%.

In one embodiment, the grating period ranges from 0.1 micrometer to 10 micrometers. In one embodiment, the pixel pitch ranges from 0.7 micrometer to 10 micrometers.

In one embodiment, a separation distance between the refractive index modulation pattern of the diffraction grating and a light-receiving surface of the pixel array ranges from 0.2 micrometer to 20 micrometers. In another embodiment, a separation distance between the refractive index modulation pattern of the diffraction grating and a light-receiving surface of the pixel array is less than about twenty times a center wavelength of the optical wavefront.

In one embodiment, the light field imaging device further includes a color filter array disposed over the pixel array and including a plurality of color filters arranged in a mosaic color pattern, the color filter array filtering the diffracted wavefront according to the mosaic color pattern prior to detection of the diffracted wavefront by the pixel array.

In one embodiment, the light field imaging device further includes a microlens array disposed over the pixel array and below the diffraction grating assembly, the microlens array including a plurality of microlenses, each microlens being optically coupled to a corresponding one of the light-sensitive pixels.

In one embodiment, the light field imaging device further includes pixel array circuitry disposed either under the pixel array, in a backside illumination configuration, or between the diffraction grating assembly and the pixel array, in a frontside illumination configuration.

In one embodiment, the diffraction grating assembly includes a single grating orientation.

In one embodiment, the diffraction grating is one of a plurality of diffraction gratings of the diffraction grating assembly. In one embodiment, the plurality of diffraction gratings is arranged in a two-dimensional grating array disposed over the pixel array. In one embodiment, the diffraction gratings are not all identical. In one embodiment, the plurality of diffraction gratings includes multiple sets of diffraction gratings, the grating axes of the diffraction gratings of different ones of the sets having different orientations. In one embodiment, the multiple sets of diffraction gratings include a first set of diffraction gratings and a second set of diffraction gratings, the grating axes of the diffraction gratings of the first set extending substantially perpendicularly to the grating axes of the diffraction gratings of the second set.

In accordance with another aspect, there is provided a diffraction grating assembly for use with an image sensor, the image sensor including a pixel array having a plurality of light-sensitive pixels, the diffraction grating assembly including a diffraction grating having a grating axis and a refractive index modulation pattern with a grating period along the grating axis, the grating period being equal to or smaller than a pixel pitch of the pixel array along the grating axis, the diffraction grating being configured to diffract an incident optical wavefront and generate, in a near-field region, a diffracted wavefront having an intensity pattern that is spatially modulated according to the grating period and that shifts laterally along the grating axis as a function of an angle of incidence of the optical wavefront, the diffraction grating assembly being configured to be disposed over the pixel array with the light-sensitive pixels located in the near-field region and including laterally adjacent pixels configured to generate different pixel responses as a function of the angle of incidence.

In one embodiment, the diffraction grating assembly is configured to be disposed over a color filter array of the image sensor, the color filter array being disposed over pixel array and configured to filter the diffracted wavefront prior to detection of the diffracted wavefront by the plurality of light-sensitive pixels.

In one embodiment, the diffraction grating is a binary phase grating. In one embodiment, the refractive index modulation pattern includes a series of ridges periodically spaced-apart at the grating period, interleaved with a series of grooves periodically spaced-apart at the grating period.

In one embodiment, the diffraction grating assembly includes a single grating orientation.

In one embodiment, the diffraction grating is one of a plurality of diffraction gratings of the diffraction grating assembly, the plurality of diffraction gratings being arranged in a two-dimensional grating array disposed over the pixel array. In one embodiment, the diffraction grating assembly includes two orthogonal grating orientations.

In one embodiment, the grating period ranges from 0.1 micrometer to 20 micrometers.

In accordance with another aspect, there is provided, a method of capturing light field image data about a scene, the method including:

diffracting an optical wavefront originating from the scene with a diffraction grating having a grating axis and a refractive index modulation pattern with a grating period along the grating axis to generate a diffracted wavefront having, in a near-field diffraction region, an intensity pattern that is spatially modulated according to the grating period and that shifts laterally along the grating axis as a function of an angle of incidence of the optical wavefront; and detecting, as the light field image data, the diffracted wavefront with a pixel array positioned in the near-field diffraction region, the pixel array having a plurality of light-sensitive pixels and a pixel pitch along the grating axis that is equal to or larger than the grating period, said detecting including sampling, by the light-sensitive pixels, respective portions of the diffracted wavefront to generate corresponding pixel responses, the plurality of light-sensitive pixels including groups of adjacent pixels, the adjacent pixels in each group having different pixel responses as a function of the angle of incidence.

In one embodiment, the method includes setting a ratio of the pixel pitch to the grating period to be different from a positive integer.

In one embodiment, the groups of adjacent pixels are pairs of adjacent pixels. In one embodiment, the method includes setting the ratio of the pixel pitch to the grating period to be equal to $(2n+1)/2$, where n is a positive integer, for example, $n=1$ or $n=2$. In one embodiment, the method includes computing a plurality of summed pixel responses, each summed pixel response being based on a sum of the pixel responses of a respective one of the pairs of adjacent pixels; and generating a 2D image of the scene from the plurality of summed pixel responses. In one embodiment, the method includes: computing a plurality of differential pixel responses, each differential pixel response being based on a difference between the pixel responses of a respective one of the pairs of adjacent pixels; and generating a depth image of the scene from the plurality of differential pixel responses.

In one embodiment, the method includes setting the ratio of the pixel pitch to the grating period to be equal to n/m, where n and m are positive integers larger than two, and n is larger than m, for example m=3 and n=4.

In one embodiment, the method includes providing the adjacent pixels in each group with identical pixel dimensions along the grating axis. In another embodiment, the method includes providing the adjacent pixels in each group not with all identical pixel dimensions along the grating axis.

In one embodiment, the method includes providing the diffraction grating as a binary phase grating including a series of ridges periodically spaced-apart at the grating period, interleaved with a series of grooves periodically spaced-apart at the grating period. In one embodiment, the method includes providing the diffraction grating with a duty cycle of about 50% and positioning each group of adjacent pixels having a chief ray angle of zero in alignment with a center of a corresponding one of the ridges, a center of a corresponding one of the grooves, or a transition between a corresponding one of the ridges and a corresponding one of the grooves. In one embodiment, the method further includes providing a degree of vertical alignment between the ridges and the grooves and the underlying light-sensitive pixels that changes as a function of position within the pixel array.

In one embodiment, the method further includes setting a separation distance between the refractive index modulation pattern of the diffraction grating and a light-receiving surface of the pixel array to be less than about twenty times a center wavelength of the optical wavefront.

In one embodiment, the method further includes filtering the diffracted wavefront with a color filter array prior to detecting the diffracted wavefront with the plurality of light-sensitive pixels.

In accordance with another aspect, there is provided a method of providing light field imaging capabilities to an image sensor including a pixel array having a plurality of light-sensitive pixels and a pixel pitch along a pixel axis, the method including:
  providing a diffraction grating assembly including a diffraction grating having a grating axis and a refractive index modulation pattern with a grating period along the grating axis, the grating period being equal to or smaller than the pixel pitch, the diffraction grating being configured to diffract an incident optical wavefront into a diffracted wavefront having, in a near-field diffraction region, an intensity pattern that is spatially modulated according to the grating period and that shifts laterally along the grating axis as a function of an angle of incidence of the optical wavefront; and
  disposing the diffraction grating assembly in front of the image sensor with the grating axis parallel to the pixel axis and the light-sensitive pixels located in the near-field diffraction region for detection of the diffracted wavefront, the light-sensitive pixels including laterally adjacent pixels configured to generate different pixel responses as a function of the angle of incidence.

In one embodiment, the method includes setting a ratio of the pixel pitch to the grating period to be different from a positive integer.

In one embodiment, the method includes setting the ratio of the pixel pitch to the grating period to be equal to $(2n+1)/2$, where n is a positive integer, for example, n=1 or n=2.

In one embodiment, the method includes setting the ratio of the pixel pitch to the grating period to be equal to n/m, where n and m are positive integers larger than two, and n is larger than m, for example, m=3 and n=4.

In one embodiment, the method includes providing the pixels with identical pixel dimensions along the grating axis. In another embodiment, the method includes providing the pixels not with all identical pixel dimensions along the grating axis.

In one embodiment, disposing the diffraction grating assembly in front of the image sensor includes positioning the diffraction grating assembly at a separation distance from the pixel array selected such that an optical path length of the diffracted wavefront prior to being detected by the light-sensitive pixels is less than about twenty times a center wavelength of the optical wavefront. In another embodiment, disposing the diffraction grating assembly in front of the image sensor includes positioning the diffraction grating assembly at a separation distance from the pixel array that ranges from 0.2 micrometer to 20 micrometers.

In one embodiment, providing the diffraction grating assembly includes providing the diffraction grating as a binary phase grating including a series of ridges periodically spaced-apart at the grating period, interleaved with a series of grooves periodically spaced-apart at the grating period.

In one embodiment, providing the diffraction grating assembly includes providing the diffraction grating assembly with a plurality of diffraction gratings, the plurality of diffraction gratings includes multiple sets of diffraction gratings having different orientations.

In one embodiment, providing the diffraction grating assembly includes providing the diffraction grating assembly with a single grating orientation.

In accordance with another aspect, there is provided a light field imaging device, including:
  a diffraction grating assembly configured to receive an optical wavefront incident from a scene, the diffraction grating assembly including a phase diffraction grating having a grating axis and a refractive index modulation pattern with a grating period along the grating axis, the refractive index modulation pattern including a series of ridges periodically spaced-apart at the grating period, interleaved with a series of grooves periodically spaced-apart at the grating period, the diffraction grating being configured to generate, in a near-field region, a diffracted wavefront having an intensity pattern that is spatially modulated according to the grating period and that shifts laterally along the grating axis as a function of an angle of incidence of the optical wavefront; and
  a pixel array configured to detect the diffracted wavefront in the near-field region, the pixel array having a plurality of light-sensitive pixels and a pixel pitch along the grating axis, a ratio of the pixel pitch to the grating period being equal to $(2n+1)/2$, where n is a positive integer, the light-sensitive pixels sampling respective portions of the diffracted wavefront and generating therefrom corresponding pixel responses, the plurality of light-sensitive pixels including pairs of adjacent pixels, the adjacent pixels in each pair having different pixel responses as a function of the angle of incidence.

In one embodiment, n=1 or n=2.

In one embodiment, each pair of adjacent pixels with a chief range angle of zero is positioned in alignment with a center of a corresponding one of the ridges or a center of a corresponding one of the grooves.

In one embodiment, the refractive index modulation pattern has a duty cycle of 50%. In another embodiment, the refractive index modulation pattern has a duty cycle different from 50%.

In accordance with another aspect, there is provided a light field imaging device, including:
- a diffraction grating assembly configured to receive an optical wavefront incident from a scene, the diffraction grating assembly including a phase diffraction grating having a grating axis and a refractive index modulation pattern with a grating period along the grating axis, the refractive index modulation pattern including a series of ridges periodically spaced-apart at the grating period, interleaved with a series of grooves periodically spaced-apart at the grating period, the diffraction grating being configured to diffract the optical wavefront to generate a diffracted wavefront; and
- a pixel array having a plurality of light-sensitive pixels disposed under the diffraction grating assembly and configured to detect the diffracted wavefront in a near-field region, the pixel array having a pixel pitch along the grating axis, a ratio of the pixel pitch to the grating period being equal to $(2n+1)/2$, where n is a positive integer.

In one embodiment, n=1 or n=2.

In one embodiment, each pixel with a chief ray angle of zero is positioned in alignment with a transition between a corresponding one of the ridges and a corresponding one of the grooves.

In one embodiment, the refractive index modulation pattern has a duty cycle of 50%. In another embodiment, the refractive index modulation pattern has a duty cycle different from 50%.

In accordance with an aspect, there is provided a light field imaging device, including:
- a diffraction grating assembly configured to receive an optical wavefront incident from a scene, the diffraction grating assembly including a diffraction grating having a refractive index modulation pattern with a grating period along a grating axis, the diffraction grating being configured to generate, in a near-field regime, a diffracted wavefront having an intensity pattern that is spatially modulated according to the grating period and that shifts laterally along the grating axis as a function of an angle of incidence of the optical wavefront; and
- a pixel array configured to detect the diffracted wavefront in the near-field regime, the pixel array having a plurality of light-sensitive pixels and a pixel pitch along the grating axis that is equal to or larger than the grating period, each light-sensitive pixel sampling a respective portion of the diffracted wavefront and generating therefrom a corresponding pixel response, the plurality of light-sensitive pixels including groups of adjacent pixels, the adjacent pixels in each group having different pixel responses as a function of the angle of incidence.

In accordance with another aspect, there is provided a light field imaging device, including:
- a diffraction grating assembly configured to receive an optical wavefront incident from a scene, the diffraction grating assembly including a diffraction grating having a refractive index modulation pattern with a grating period along a grating axis, the diffraction grating diffracting the optical wavefront to generate a diffracted wavefront; and
- a pixel array having a plurality of light-sensitive pixels disposed under the diffraction grating assembly and configured to detect the diffracted wavefront in a near-field regime, the pixel array having a pixel pitch along the grating axis that is larger than the grating period, a ratio of the pixel pitch to the grating period being different from a positive integer.

In accordance with another aspect, there is provided a frontside-illuminated light field imaging device, including:
- a substrate having a front side and a back side;
- a diffraction grating assembly disposed on the front side and configured to receive an optical wavefront incident from a scene, the diffraction grating assembly including a diffraction grating having a refractive index modulation pattern with a grating period along a grating axis, the diffraction grating being configured to generate, in a near-field regime, a diffracted wavefront having an intensity pattern that is spatially modulated according to the grating period and that shifts laterally along the grating axis as a function of an angle of incidence of the optical wavefront;
- a pixel array formed in the substrate and configured to detect the diffracted wavefront in the near-field regime, the pixel array having a plurality of light-sensitive pixels and a pixel pitch along the grating axis that is equal to or larger than the grating period, each light-sensitive pixel sampling a respective portion of the diffracted wavefront and generating therefrom a corresponding pixel response, the plurality of light-sensitive pixels including groups of adjacent pixels, the adjacent pixels in each group having different pixel responses as a function of the angle of incidence; and
- pixel array circuitry coupled to the pixel array and disposed on the front side between the diffraction grating assembly and the pixel array.

In accordance with another aspect, there is provided a backside-illuminated light field imaging device, including:
- a substrate having a front side and a back side;
- a diffraction grating assembly disposed on the back side and configured to receive an optical wavefront incident from a scene, the diffraction grating assembly including a diffraction grating having a refractive index modulation pattern with a grating period along a grating axis, the diffraction grating being configured to generate, in a near-field regime, a diffracted wavefront having an intensity pattern that is spatially modulated according to the grating period and that shifts laterally along the grating axis as a function of an angle of incidence of the optical wavefront;
- a pixel array formed in the substrate and configured to detect the diffracted wavefront in the near-field regime, the pixel array having a plurality of light-sensitive pixels and a pixel pitch along the grating axis that is equal to or larger than the grating period, each light-sensitive pixel sampling a respective portion of the diffracted wavefront and generating therefrom a corresponding pixel response, the plurality of light-sensitive pixels including groups of adjacent pixels, the adjacent pixels in each group having different pixel responses as a function of the angle of incidence; and
- pixel array circuitry disposed on the front side and coupled to the pixel array.

In accordance with another aspect, there is provided a diffraction grating assembly for use with an image sensor, the image sensor including a pixel array having a plurality of light-sensitive pixels, the diffraction grating assembly including a diffraction grating having a refractive index modulation pattern with a grating period along a grating axis, the grating period being equal to or smaller than a pixel pitch of the pixel array along the grating axis, the diffraction grating being configured to diffract an incident optical wavefront and generate, in a near-field diffraction plane, a diffracted wavefront having an intensity pattern that is spatially modulated according to the grating period and that shifts laterally along the grating axis as a function of an angle of incidence of the optical wavefront, the diffraction grating assembly being configured to be disposed over the pixel array with the light-sensitive pixels located at the near-field diffraction plane and including laterally adjacent pixels generating different pixel responses as a function of the angle of incidence.

In accordance with another aspect, there is provided a method of capturing light field image data about a scene, the method including:

diffracting an optical wavefront originating from the scene with a diffraction grating having a refractive index modulation pattern with a grating period along a grating axis to generate a diffracted wavefront having, in a near-field diffraction plane, an intensity pattern that is spatially modulated according to the grating period and that shifts laterally along the grating axis as a function of an angle of incidence of the optical wavefront; and detecting, as the light field image data, the diffracted wavefront with a pixel array positioned in the near-field diffraction plane, the pixel array having a plurality of light-sensitive pixels and a pixel pitch along the grating axis that is equal to or larger than the grating period, said detecting including sampling, by each light-sensitive pixel, a respective portion of the diffracted wavefront to generate a corresponding pixel response, the plurality of light-sensitive pixels including groups of adjacent pixels, the adjacent pixels in each group having different pixel responses as a function of the angle of incidence.

In accordance with another aspect, there is provided a method of capturing light field image data about a scene, the method including:

diffracting an optical wavefront originating from the scene with a diffraction grating having a refractive index modulation pattern with a grating period along a grating axis to generate a diffracted wavefront in near-field diffraction plane; and detecting, as the light field image data, the diffracted wavefront with a pixel array positioned in the near-field diffraction plane, the pixel array having a plurality of light-sensitive pixels and a pixel pitch along the grating axis that is equal to or larger than the grating period.

In accordance with another aspect, there is provided a method of providing light field imaging capabilities to an image sensor including a pixel array having a plurality of light-sensitive pixels and a pixel pitch along a pixel axis, the method including:

providing a diffraction grating assembly including a diffraction grating having a refractive index modulation pattern with a grating period along a grating axis, the grating period being equal to or smaller than the pixel pitch, the diffraction grating being configured to diffract an incident optical wavefront into a diffracted wavefront having, in a near-field diffraction plane, an intensity pattern that is spatially modulated according to the grating period and that shifts laterally along the grating axis as a function of an angle of incidence of the optical wavefront; and disposing the diffraction grating assembly in front of the image sensor with the grating axis parallel to the pixel axis and the light-sensitive pixels located at the near-field diffraction plane for detection of the diffracted wavefront and including laterally adjacent pixels configured to generate different pixel responses as a function of the angle of incidence.

In some implementations, a ratio of the pixel pitch to the grating period is different from a positive integer. In one embodiment, each group of pixels is a pair of adjacent pixels, wherein the two pixels in each pair have different pixel responses as a function of the angle of incidence. In one embodiment, the ratio of the pixel pitch to the grating period is equal to $(2n+1)/2$, where n is a positive integer. For example, the ratio of the pixel pitch to the grating period may be equal to $3/2$ (i.e., $n=1$). In another embodiment, the ratio of the pixel pitch to the grating period is equal to $n/m$, where n and m are positive integers larger than two, and n is larger than m. Depending on the application, the adjacent pixels in each group or pair have identical or different pixel dimensions along the grating axis.

In some implementations, the aspects described above may include a step of computing a plurality of summed pixel responses, each summed pixel response corresponding to a sum of the pixel responses of one pair of adjacent pixels, and a step of generating a 2D image of the scene from the plurality of summed pixel responses. Additionally, or alternatively, the aspects described above may include a step of computing a plurality of differential pixel responses, each differential pixel response corresponding to a difference between the pixel responses of one pair of adjacent pixels, and a step of generating a depth image of the scene from the plurality of differential pixel responses.

Depending on the implementations, the present techniques may be used in both monochrome and color applications. In the case of color applications, the light field imaging device may include a color filter array disposed over the pixel array and including a plurality of color filters arranged in a mosaic color pattern. In such a case, the color filter array is configured to spatio-spectrally filter the diffracted wavefront according to the mosaic color pattern prior to detection of the diffracted wavefront by the pixel array.

It is to be noted that other method and process steps may be performed prior, during or after the steps described herein. The order of one or more steps may also differ, and some of the steps may be omitted, repeated and/or combined, depending on the application.

Other objects, features, and advantages of the present description will become more apparent upon reading of the following non-restrictive description of specific embodiments thereof, given by way of example only with reference to the appended drawings. Although specific features described in the above summary and in the detailed description below may be described with respect to specific embodiments or aspects, it should be noted that these specific features can be combined with one another unless stated otherwise.

DETAILED DESCRIPTION

Figure 1:
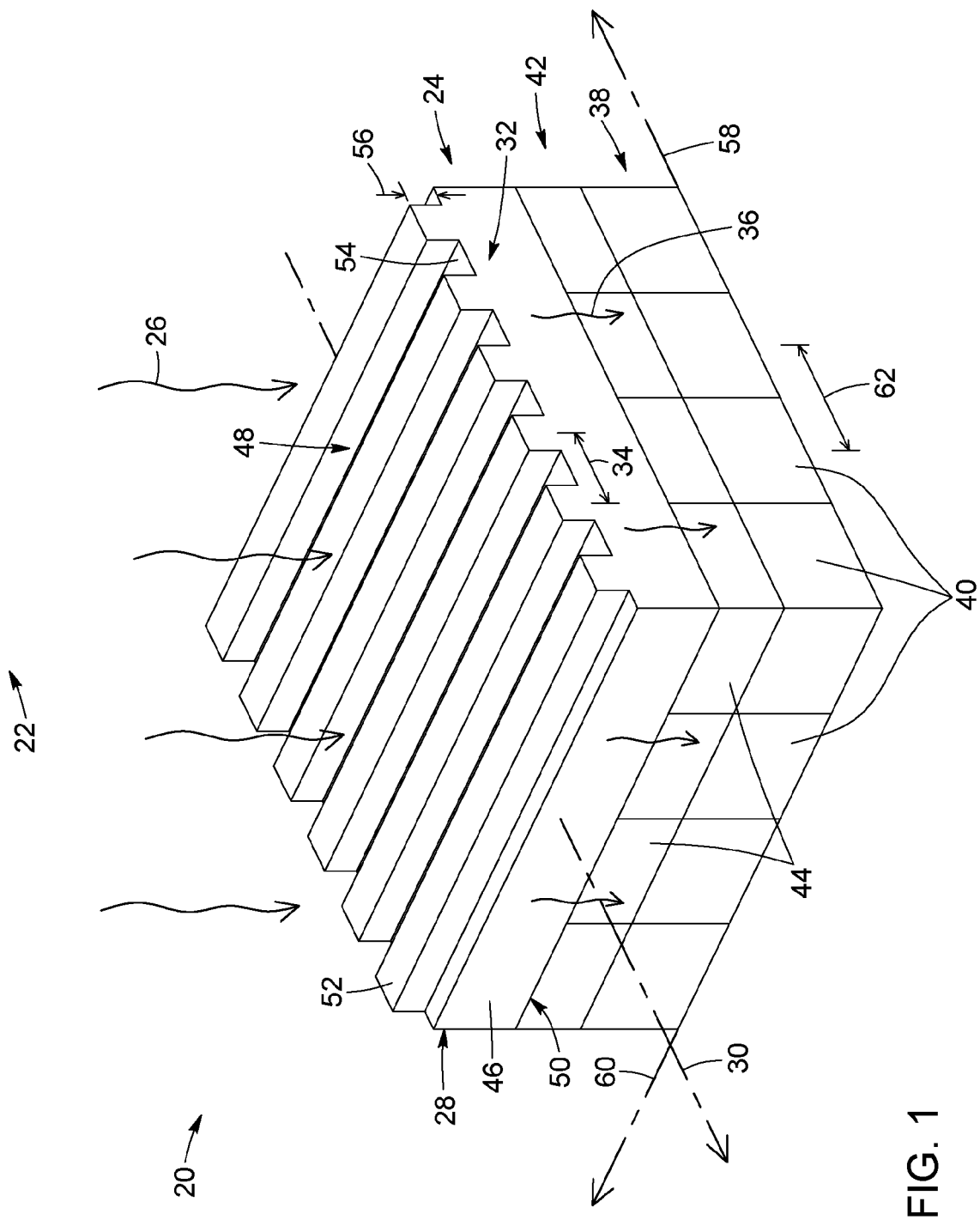
FIG. 1 is a schematic perspective view of a light field imaging device, in accordance with a possible embodiment.

In the present description, similar features in the drawings have been given similar reference numerals. To avoid cluttering certain figures, some elements may not be indicated if they were already identified in a preceding figure. It is also appreciated that the elements of the drawings are not necessarily depicted to scale, since emphasis is placed on clearly illustrating the elements and structures of the present embodiments. Furthermore, positional descriptors indicating the location and/or orientation of one element with respect to another element are used herein for ease and clarity of description. Unless otherwise indicated, these positional descriptors should be taken in the context of the figures and should not be considered limiting. It will be appreciated that such spatially relative terms are intended to encompass different orientations in the use or operation of the present embodiments, in addition to the orientations exemplified in the figures. In particular, terms such as "on", "over", "under", "above", and "below", used in specifying the relative spatial relationship of two elements denote that the two elements can be either in direct contact with each other or separated from each other by one or more intervening elements.

The terms "connected" and "coupled", and derivatives and variants thereof, are intended to refer herein to any structural or functional connection or coupling, either direct or indirect, between two or more elements. The connection or coupling between the elements may be, for example, mechanical, optical, thermal, electrical, magnetic, chemical, logical, operational, or any combination thereof.

The terms "a", "an", and "one" are defined herein to mean "at least one", that is, these terms do not exclude a plural number of elements, unless stated otherwise.

Terms such as "substantially", "generally", and "about", that modify a value, a condition, or a characteristic of a feature of an exemplary embodiment, should be understood to mean that the value, condition, or characteristic is defined within tolerances that are acceptable for the proper operation of this exemplary embodiment for its intended application or that fall within an acceptable range of experimental error. In particular, the term "about" can refer to a range of numbers that one skilled in the art would consider equivalent to the stated value (e.g., having the same or equivalent function or result). In some instances, the term "about" means a variation of ±10 percent of the stated value. It is noted that all numeric values used herein are assumed to be modified by the term "about", unless stated otherwise.

The terms "match", "matching", and "matched" are intended to refer herein to a condition in which two elements are either the same or within some predetermined tolerance of each other. That is, these terms are meant to encompass not only "exactly" or "identically" matching the two elements but also "substantially", "approximately" "subjectively", or "sufficiently" matching the two elements, as well as providing a higher or best match among a plurality of matching possibilities.

The present description generally relates to light field imaging techniques for acquiring light field information or image data about an optical wavefront emanating from a scene. In accordance with various aspects, the present description relates to a light field imaging device for capturing light field image data about a scene; a diffraction grating assembly for use with an image sensor to obtain light field image data about a scene; a method of capturing light field image data about a scene; and a method of providing 3D or light field imaging capabilities to an image sensor array viewing a scene.

In some implementations, the present techniques enable the specific manipulation and comparison of the chromatic dependence of diffraction by means of one or more diffractive optical elements paired with an appropriate chromatic encoding mechanism, as well as its use in 3D imaging. In some implementations, the light field imaging devices and methods disclosed herein are sensitive to not only the intensity and angle of incidence of an optical wavefront originating from an observable scene, but also the wavelength, through a specific spatio-spectral subsampling of a generated interference pattern allowing for the direct measurement of the chromatic dependence of diffraction. The acquired light field information can include information about not only the intensity of an incident optical wavefront, but also other light field parameters including, without limitation, the angle of incidence, the phase, the wavelength, and the polarization of the optical wavefront. Therefore, light field imaging devices, for example, depth cameras, may acquire more information than traditional cameras, which typically record only light intensity. The image data captured by light field imaging devices may be used or processed in a variety of ways to provide multiple functions including, but not limited to, 3D depth map extraction, 3D surface reconstruction, image refocusing, and the like. Depending on the application, the light field image data of an observable scene may be acquired as one or more still images or as a video stream.

The present techniques may be used in imaging applications that require or may benefit from enhanced depth sensing and other 3D imaging capabilities, for example, to allow a user to change the focus, the point of view, and/or the depth of field of a captured image of a scene. The present techniques may be applied to or implemented in various types of 3D imaging systems and methods including, without limitation, light field imaging applications using plenoptic descriptions, ranging applications through the comparative analysis of the chromatic dependence of diffraction, and single-sensor single-image depth acquisition applications.

Non-limiting fields of application include, to name a few, consumer electronics (e.g., mobile phones, tablets, and notebooks, gaming, virtual and augmented reality, photography, etc.), automotive applications (e.g., advanced driver assistance systems, in-cabin monitoring, etc.), industrial applications (e.g., inspection, robot guidance, object identification and tracking, etc.), and security and surveillance (e.g., facial recognition and biometrics, motion tracking, traffic monitoring, drones, agricultural inspection with aerial and ground-based drones, etc.).

Non-exhaustive advantages and benefits of certain implementations of the present techniques may include: compatibility with passive sensing modalities that employ less power to perform their functions; compatibility with single-sensor architectures having reduced footprints; enablement of depth mapping functions while preserving 2D performance; simple and low-cost integration into existing image sensor hardware and manufacturing processes; compatibility with conventional CMOS and CCD image sensors; extension of the capabilities of other 3D sensing apparatuses, for example, by extending the range of stereo vision devices in the near field or when images are too blurry to perform standard stereo image pairs registration; use in recalibration of other 3D sensing apparatuses, for example, by recalibrating misaligned stereo vision systems; and elimination of the need for multiple components, such as dual cameras or cameras equipped with active lighting systems for depth detection.

In the present description, the terms "light" and "optical", and variants and derivatives thereof, are intended to refer to radiation in any appropriate region of the electromagnetic spectrum. In particular, the terms "light" and "optical" are not limited to visible light, but may also include invisible regions of the electromagnetic spectrum including, without limitation, the terahertz (THz), infrared (IR), and ultraviolet (UV) spectral bands. In some implementations, the terms "light" and "optical" may encompass electromagnetic radiation having a wavelength ranging from about 175 nanometers (nm) in the deep ultraviolet to about 300 micrometers (µm) in the terahertz range, for example, from about 400 nm at the blue end of the visible spectrum to about 1550 nm at telecommunication wavelengths, or between about 400 nm and about 650 nm to match the spectral range of typical red-green-blue (RGB) color filters. Those skilled in the art will understand, however, that these wavelength ranges are provided for illustrative purposes only and that the present techniques may operate beyond this range.

In the present description, the terms "color" and "chromatic", and variants and derivatives thereof, are used not only in their usual context of human perception of visible electromagnetic radiation (e.g., red, green, and blue), but also, and more broadly, to describe spectral characteristics (e.g., diffraction, transmission, reflection, dispersion, absorption) over any appropriate region of the electromagnetic spectrum. In this context, and unless otherwise specified, the terms "color" and "chromatic", and their variants and derivatives, may be used interchangeably with the term "spectral" and its variants and derivatives.

Various implementations of the present techniques are described below with reference to the figures.

Light Field Imaging Device Implementations

Figure 2:
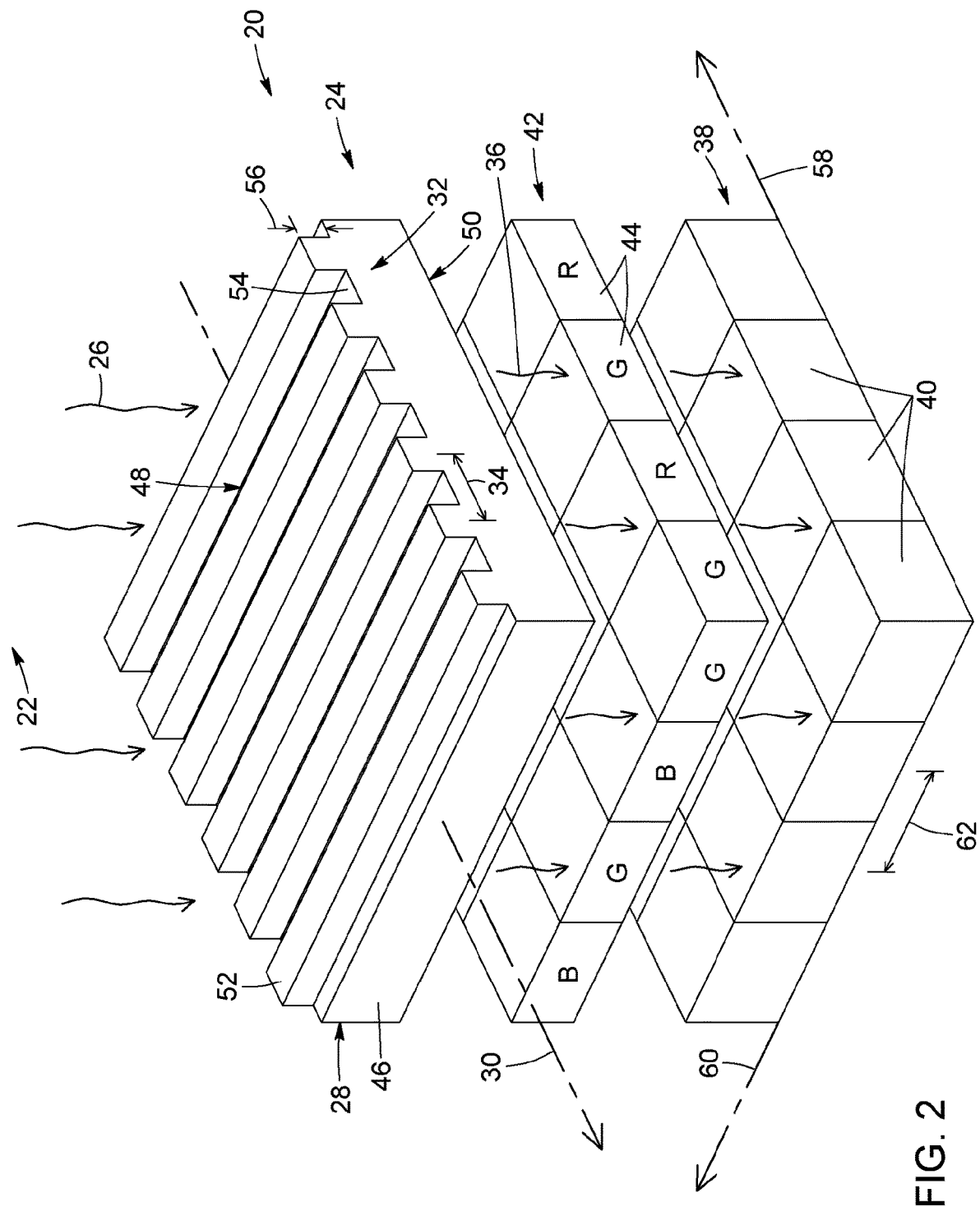
FIG. 2 is a schematic partially exploded perspective view of the light field imaging device of FIG. 1.

Referring to FIGS. 1 and 2, there is provided a schematic representation of a possible embodiment of a light field imaging device 20 for capturing light field or depth image data about an observable scene 22.

In the present description, the term "light field imaging device" broadly refers to an image capture device capable of acquiring an image representing a light field or wavefront emanating from a scene, where the acquired light field image contains information about not only light intensity at the image plane, but also other light field parameters such as, for example, the direction from which light rays enter the device (i.e., the angle of incidence), the spectrum of the light field, its phase, and its polarization. In some instances, the term "light field imaging device" may be used interchangeably with terms such as "light field camera", "light field imager", "light field image capture device", "depth image capture device", "3D image capture device", "plenoptic camera", and the like.

The term "scene" is meant to denote any region, space, volume, area, surface, environment, target, feature, or information of interest which may be imaged according to the present techniques. Depending on the application, the observable scene can be an indoor scene or an outdoor scene.

The light field imaging device 20 depicted in FIGS. 1 and 2 includes a diffraction grating assembly or structure 24 configured to receive an optical wavefront 26 incident from the scene 22. The diffraction grating assembly 24 may, in some cases, be referred to as a transmissive diffraction mask (TDM). The diffraction grating assembly 24 includes one or more diffraction gratings 28. In the illustrated embodiment, the diffraction grating assembly 24 includes a single diffraction grating 28, but as described below, in other embodiments the diffraction grating assembly may include more than one diffraction grating. The diffraction grating 28 has a grating axis 30 and a refractive index modulation pattern 32 or grating profile having a grating period 34 along the grating axis 30. The diffraction grating 28 is configured to diffract the incoming optical wavefront 26 into a diffracted wavefront 36. In the illustrated embodiment, the diffraction grating 28 is used in transmission since the incident wavefront 26 and the diffracted wavefront 36 lie on opposite sides of the diffraction grating 28.

The light field imaging device 20 also includes a pixel array 38 including a plurality of light-sensitive pixels 40 disposed under the diffraction grating assembly 24 and configured to detect, in a near-field region, the diffracted wavefront 36 as light field image data about the scene 22. In color implementations, the light field imaging device 20 may also include a color filter array 42 disposed over the pixel array 38. The color filter array 42 may include a plurality of color filters 44 arranged in a mosaic color pattern. Each color filter 44 may be configured to filter incident light according to wavelength to capture color information at a respective location of the color filter array 42. The color filter array 42 may be configured to spatially and spectrally filter the diffracted wavefront 36 according to the mosaic color pattern prior to detection of the diffracted wavefront 36 by the plurality of light-sensitive pixels 40.

As noted above, by providing a color filter array to perform a direct spatio-chromatic subsampling of the diffracted wavefront generated by the diffraction grating assembly prior to its detection by the pixel array, the light field imaging device may be sensitive to not only the intensity and the angle of incidence of an input optical wavefront, but also its spectral content.

It is appreciated that a color filter array need not be provided in some applications, for example, monochrome imaging. It is also appreciated that, for simplicity, the wavefront detected by the light-sensitive pixels will be generally referred to as a "diffracted wavefront" in both monochrome and color implementations, although in the latter case, the terms "filtered wavefront" or "filtered diffracted wavefront" may, in some instances, be used to denote the fact that the diffracted wavefront generated by the diffraction grating assembly is both spatially and spectrally filtered by the color filter array prior to detection by the underlying pixel array. Furthermore, in some implementations where a color filter array is not provided, it may be envisioned that the diffraction grating itself could act as a color filter. For example, the diffraction grating could include a grating substrate with a top surface having the refractive index modulation pattern formed thereon, the grating substrate including a spectral filter material or region configured to spectrally filter the diffracted wavefront according to wavelength prior to detection of the diffracted wavefront by the plurality of light-sensitive pixels. For example, and without limitation, the spectral filter material or region could act as one of a red filter, a green filter, a blue filter, a yellow filter, a cyan filter, a magenta filter, a clear or white filter, or an infrared filter (e.g., at around 850 nm or 940 nm). Of course, various other types of color filters may be used in other variants.

Depending on the application or use, the light field imaging device may be implemented using various image sensor architectures and pixel array configurations. In some embodiments, the light field imaging device may be implemented simply by adding or coupling a diffraction grating assembly on top of an already existing image sensor including a pixel array and, in color-based applications, a color filter array. For example, the existing image sensor may be a conventional 2D CMOS or CCD imager. However, in other implementations, the light field imaging device may be implemented and integrally packaged as a separate, dedicated, and/or custom-designed device incorporating therein all or most of its components (e.g., diffraction grating assembly, pixel array, color filter array, microlens array, etc.).

More details regarding the structure, configuration, and operation of the components introduced in the preceding paragraphs as well as other possible components of the light field imaging device will be described below.

In the embodiment of FIGS. 1 and 2, the diffraction grating 28 includes a grating substrate 46 extending over the color filter array 42. The grating substrate 46 has a top surface 48 and a bottom surface 50 opposed to the top surface 48. The periodic refractive index modulation pattern 32 is formed on the top surface 48. In the illustrated embodiment, the grating substrate 46 is made of a low-absorbing material having a refractive index greater than one and that is transparent, or sufficiently transparent, in the spectral operating range to permit the diffracted wavefront 36 to be transmitted therethrough. Non-limiting examples of such material include, to name a few, silicon oxides (SiOx), polymers, colloidal particles, SU-8 photoresist, glasses, and the like. For example, in some implementations the diffraction grating 28 may be configured to diffract the optical wavefront 26 in a waveband ranging from about 400 nm to about 1550 nm. Depending on the application, the refractive index modulation pattern 32 may be made of the same or a different material than the rest of the grating substrate 46.

Diffraction occurs when a wavefront, whether electromagnetic or otherwise, encounters a physical object or a refractive-index perturbation. The wavefront tends to bend around the edges of the object. Should a wavefront encounter multiple objects, whether periodic or otherwise, the corresponding wavelets may interfere some distance away from the initial encounter as demonstrated by Young's double slit experiment. This interference creates a distinct pattern, referred to as a "diffraction pattern" or an "interference pattern", as a function of distance from the original encounter, which is sensitive to the incidence angle and the spectral content of the wavefront, and the general size, shape, and relative spatial relationships of the encountered objects. This interference may be described through the evolving relative front of each corresponding wavelet, as described by the Huygens-Fresnel principle.

In the present description, the term "diffraction grating", or simply "grating", refers to a periodic or aperiodic optical structure having spatially modulated optical properties (e.g., a refractive index modulation pattern, defining a grating profile) and being configured to modulate the amplitude and/or the phase of an incident optical wavefront. A diffraction grating may include a periodic arrangement of diffracting elements (e.g., alternating ridges and grooves) whose spatial period—the grating period—is nearly equal to or slightly longer than the wavelength of light incident on the grating.

An optical wavefront containing a range of wavelengths incident on a diffraction grating will, upon diffraction, have its amplitude and/or phase modified. As a result, a space- and time-dependent diffracted wavefront is produced. In general, a diffraction grating is spectrally dispersive such that each wavelength of an input optical wavefront will be outputted along a different direction. However, diffraction gratings exhibiting a substantially achromatic response over an operating spectral range exist and may be used in some implementations. For example, in some implementations, the diffraction grating may be substantially achromatic in a spectral range of interest and be designed for the center wavelength of the spectral range of interest. In particular, in an embodiment using a Bayer patterned color filter array, the diffraction grating may be optimized for the green channel, that is, around a center wavelength of about 532 nm. It is to be noted that when the diffraction grating is substantially achromatic over the operating spectral range, it is the color filter array that may provide a chromatic sub-sampling of the diffracted wavefront.

Depending on whether the diffracting elements forming the diffraction grating are transmitting or reflective, the diffraction grating may be referred to as a "transmission grating" or a "reflection grating". It is noted that while several embodiments described herein may use transmission gratings, the use of reflection gratings in other embodiments is not excluded.

Diffraction gratings may also be classified as "amplitude gratings" or "phase gratings", depending on the nature of the diffracting elements. In amplitude gratings, the perturbations to the initial wavefront caused by the grating are the result of a direct amplitude modulation, while in phase gratings, these perturbations are the result of a modulation of the relative group velocity of light caused by a spatial variation of the refractive index of the grating material. In several embodiments disclosed in the present description, the diffraction gratings are phase gratings, which generally absorb less light than amplitude gratings, although amplitude gratings may be used in other embodiments.

In the embodiment of FIGS. 1 and 2, the diffraction grating 28 is a phase grating, more specifically a binary phase grating for which the refractive index modulation pattern 32 includes a series of ridges 52 periodically spaced-apart at the grating period 34, interleaved with a series of grooves 54 also periodically spaced-apart at the grating period 34. The spatial profile of the refractive index modulation pattern 32 thus exhibits a two-level step function, or square-wave function. In such a case, the grating period 34 of the diffraction grating 28 corresponds to the sum of the width, along the grating axis 30, of one ridge 52 and one adjacent groove 54. In some implementations, the grating period 34 may range from about 0.1 µm to about 20 µm, although other values are possible in other implementations. In FIGS. 1 and 2, the grooves 54 are empty (e.g., filled with air), but they could alternatively be filled with a material having a refractive index different from that of the ridge material.

Depending on the application, the diffraction grating 28 may have a duty cycle substantially equal to 50% or different from 50%. The duty cycle is defined herein as the ratio of the ridge width to the grating period 34.

Another parameter of the diffraction grating 28 is the step height 56, which is the difference in level between the ridges 52 and the grooves 54. For example, in some implementations, the step height 56 may range from about 0.1 µm to about 1 µm. It is to be noted that in some implementations, the step height 56 may be selected such that the diffraction grating 28 causes a predetermined optical path difference between adjacent ridges 52 and grooves 54. For example, the step height 56 may be controlled, along with the refractive index difference between the ridges 52 and the grooves 54, to provide, at a given wavelength and angle of incidence of the optical wavefront (e.g. its center wavelength), a half-wave optical path difference between the ridges and the grooves. Of course, other optical path difference values may be used in other implementations.

It is to be noted that while the diffraction grating 28 in the embodiment of FIGS. 1 and 2 is a linear, or one-dimensional, binary phase grating consisting of alternating sets of parallel ridges 52 and grooves 54 forming a square-wave refractive index modulation pattern 32, other embodiments may use other types of diffraction gratings. For example, other implementations may use diffraction gratings where at least one among the grating period, the duty cycle and the step height is variable; diffraction gratings with non-straight features perpendicular to the grating axis; diffraction gratings having more elaborate refractive index profiles; 2D diffraction gratings; and the like. It is appreciated the properties of the diffracted wavefront may be tailored by proper selection of the grating parameters. More details regarding the operation of the diffraction grating 28 will be described further below.

Referring still to FIGS. 1 and 2, the pixel array 38 includes a plurality of light-sensitive pixels 40 disposed under the color filter array 42, which is itself disposed under the diffraction grating assembly 24.

The term "pixel array" refers generally to a sensor array made up of a plurality of photosensors, referred to herein as "light-sensitive pixels", or simply "pixels", which are configured to detect electromagnetic radiation incident thereonto from an observable scene and to convert the detected radiation into electrical data, which may be processed to generate an image of the scene. In the present techniques, the electromagnetic radiation that is detected by the light-sensitive pixels as light field image data corresponds to an optical wavefront incident from the scene, which has been diffracted, and possibly spatio-chromatically filtered, prior to reaching the pixel array.

The pixel array 38 may be embodied by a CMOS or a CCD image sensor, but other types of photodetector arrays (e.g., charge injection devices or photodiode arrays) or devices (e.g., an event camera) could alternatively be used. As mentioned above, the pixel array 38 may be configured to detect electromagnetic radiation in any appropriate region of the spectrum.

Depending on the application, the pixel array 38 may be configured according to a rolling or global shutter readout design. The pixel array 38 may further be part of a stacked, backside, or frontside illumination sensor architecture, as described in greater detail below. The pixel array 38 may be of any standard or non-standard optical format, for example, but not limited to, 4/3", 1", 2/3", 1/1.8", 1/2", 1.27", 1/3", 1/3.2", 1/3.6", 35 mm, and the like. The pixel array 38 may also include a contrast or a phase-detection autofocus mechanism, along with their respective pixel architectures. Unless stated otherwise, the term "pixel array" may be used herein interchangeably with terms such as "photodetector array", "photosensor array", "imager array", and the like.

A light-sensitive pixel 40 of the pixel array 38 may convert the spatial portion of the diffracted wavefront 36 incident upon it into accumulated charge, the amount of which is proportional to the amount of light collected and recorded by the pixel 40. Each light-sensitive pixel 40 may include a light-sensitive surface and associated pixel circuitry for processing signals at the pixel level and communicating with other electronics, such as a readout unit. Those skilled in the art will appreciate that various other components may be integrated into the pixel circuitry. In general, the light-sensitive pixels 40 may be individually addressed and read out.

Referring still to FIGS. 1 and 2, the light-sensitive pixels 40 may be arranged into a rectangular grid of rows and columns defined by two orthogonal pixel axes 58, 60, although other arrangements may be used on other embodiments. The number of rows and columns defines the resolution of the pixel array 38. For example, in some implementations, the pixel array 38 may have a resolution of at least 16 pixels, although a wide range of other resolution values, including up to 40 megapixels or more, may be used in other embodiments. It is appreciated that while the light-sensitive pixels 40 are arranged into a 2D array in the embodiment of FIGS. 1 and 2, they may alternatively be configured as a linear array in other embodiments. It is also appreciated that while the light-sensitive pixels 40 are square in the embodiment of FIGS. 1 and 2, corresponding to a pixel aspect ratio of 1:1, other pixel aspect ratio values may be used in other embodiments. Furthermore, depending on the application, the pixels 40 may or may not all have the same dimensions (e.g., shape and size).

In the embodiment of FIGS. 1 and 2, the diffraction grating 28 is oriented with respect to the underlying pixel array 38 such that the grating axis 30 is parallel to one of the two orthogonal pixel axes 58, 60. However, in other embodiments, the grating axis 30 may be oriented at an oblique angle (e.g., 45°) to the orthogonal pixel axes 58, 60.

The pixel array 38 may also be characterized by a pixel pitch 62. In the present description, the term "pixel pitch" generally refers to the spacing between individual pixels 40 and is typically defined as the center-to-center distance between nearest-neighbor pixels 40. Depending on the physical arrangement of the pixel array 38, the pixel pitch 62 along the two orthogonal pixel axes 58, 60 may or may not be the same. It is appreciated that a pixel pitch may also be defined along an arbitrary axis, for example, along a diagonal axis oriented at 45° with respect to the two orthogonal pixel axes 58, 60. As described in greater detail below, a relevant pixel pitch 62 is the one along the grating axis 30. As also described in greater detail below, in the present techniques, the pixel pitch 62 of the pixel array 38 along the grating axis 30 is equal to or larger than the grating period 34. For example, in some implementations the pixel pitch 62 along the grating axis 30 may range from 0.7 µm or less to 10 µm, although different pixel pitch values may be used in other implementations.

In the present description, the term "pixel data" refers to the image information captured by each individual pixel and can include intensity data indicative of the total amount of optical energy absorbed by each individual pixel over an integration period. Combining the pixel data from all the pixels 40 yields light field image data about the scene 22. In the present techniques, because the optical wavefront 26 incident from the scene 22 is diffracted and, possibly, spatially and spectrally filtered prior to detection, the light field image data can provide information about not only the intensity of the incident wavefront 26, but also other light field parameters such as its angle of incidence, phase and spectral content. In particular, as described in greater detail below, the present techniques may allow depth information to be retrieved from angle-of-incidence-dependent information encoded into the intensity-based diffraction pattern produced by the diffraction grating 28 and recorded by the pixel array 38.

Figure 3:
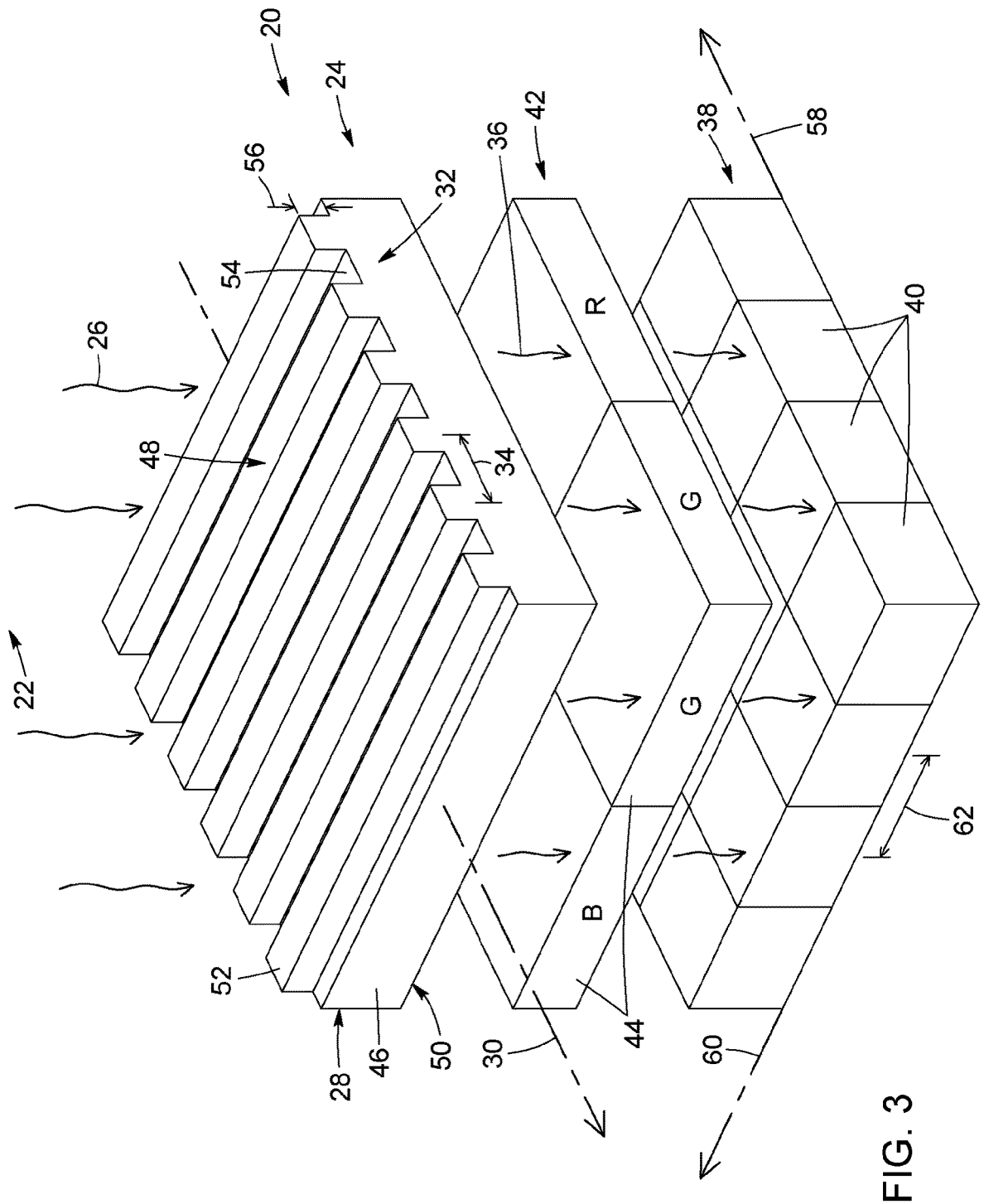
FIG. 3 is a schematic partially exploded perspective view of a light field imaging device, in accordance with another possible embodiment, where each color filter overlies a 2×2 block of light-sensitive pixels.

Referring still to FIGS. 1 and 2, the color filter array 42 is spatially registered with the pixel array 38 such that each color filter 44 is optically coupled to a corresponding one of the light-sensitive pixels 40. That is, each color filter 44 overlies a single light-sensitive pixel 40 such that there is a one-to-one relationship, or mapping, between the color filters 44 and the light-sensitive pixels 40. However, in other implementations, each color filter may be optically coupled to at least two corresponding ones of the plurality of light-sensitive pixels. For example, turning briefly to FIG. 3, there is shown another embodiment of a light field imaging device 20 in which each color filter 44 of the color filter array 42 overlies a group or subset of light-sensitive pixels 40, namely a 2×2 block of light-sensitive pixels 40. In both the embodiment of FIGS. 1 and 2 and the embodiment of FIG. 3, the color filter array 42 and the pixel array 38 together enable the direct spatio-chromatic sampling of the diffracted wavefront 36 produced by the overlying diffraction grating assembly 24, as explained below.

As mentioned above regarding the terms "color" and "chromatic", terms such as "color filter" and "color filtering" are to be understood as being equivalent to "spectral filter" and "spectral filtering" in any appropriate spectral range of the electromagnetic spectrum, and not only within the visible range. Depending on the application, the color filters may achieve spectral filtering through absorption of unwanted spectral components, for example, using dye-based color filters. However, other filtering principles may be used without departing from the scope of the present techniques.

Returning to FIGS. 1 and 2, the color filters 44 are physically organized according to a mosaic color pattern or configuration. In some implementations, each color filter 44 is one of a red filter, a green filter, a blue filter, a yellow filter, a cyan filter, a magenta filter, or a clear or white filter. For example, in the illustrated embodiment, the mosaic color pattern of the color filter array 42 is a RGGB Bayer pattern, in which the color filters arranged in a checkerboard pattern with rows of alternating red (R) and green (G) filters interleaved with rows of alternating green (G) and blue (B) filters. A Bayer pattern contains twice as many green filters as red or blue filters such that the green component of the mosaic color pattern is more densely sampled than red and blue components. In alternative implementations, the mosaic color pattern may be embodied by more elaborate Bayer-type patterns, for example, Bayer-type patterns with an n-pixel unit cell, where n is an integer greater than 4. Of course, the present techniques are not limited to Bayer-type patterns, but may be applied to any appropriate mosaic color pattern including, but not limited to, RGB-IR, RGB-W, CYGM, CYYM, RGBE, RGBW #1, RGBW #2, RGBW #3, and monochrome. It is to be noted that, in some implementations, the color filter array 42 may be configured to provide hyperspectral imaging and filtering techniques and/or interferometric filtering techniques. In such embodiments, the design of the diffraction grating 28 (e.g., the grating period 34) may be adjusted to accommodate the increased spectral sampling range.

Figure 4:
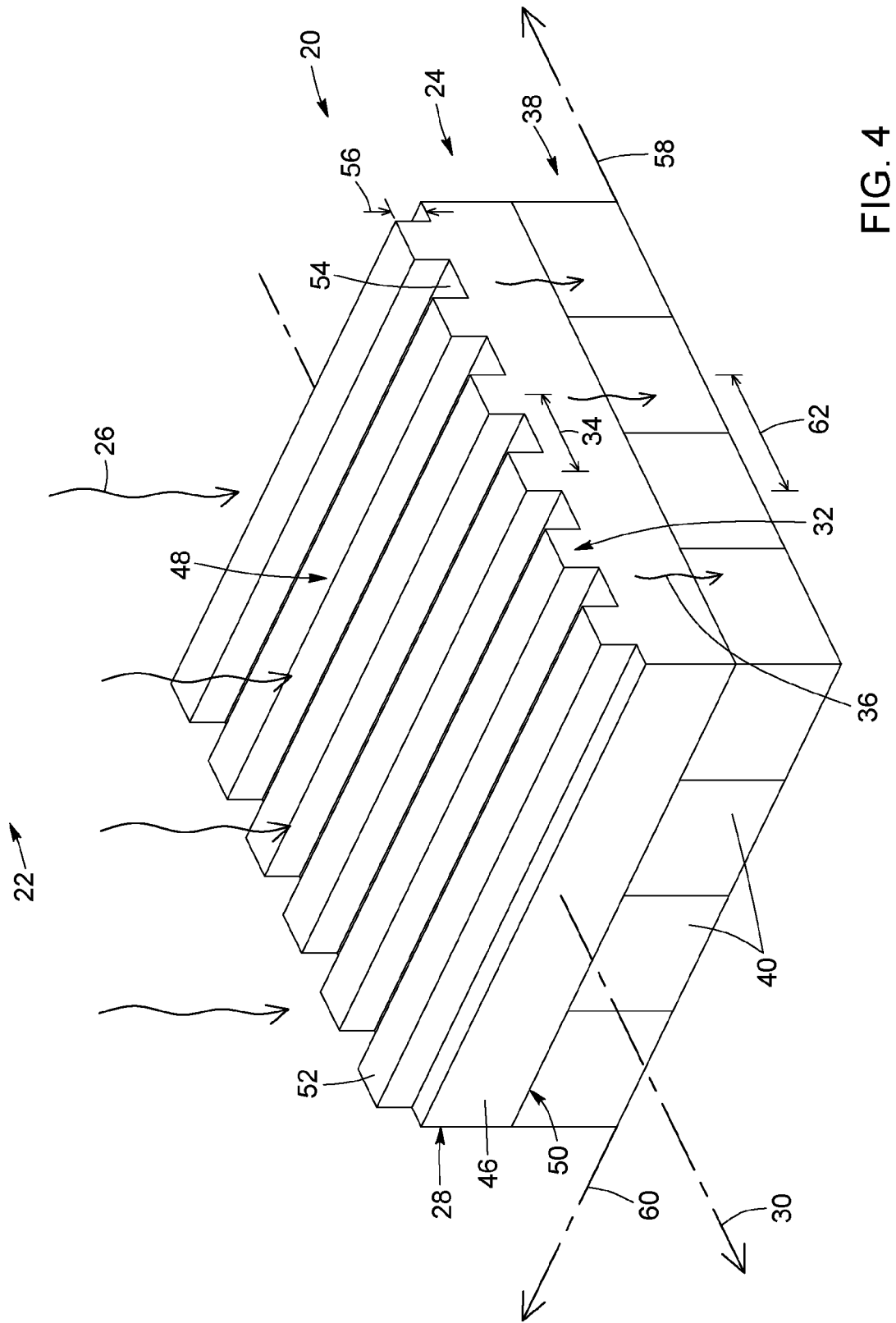
FIG. 4 is a schematic perspective view of a light field imaging device, in accordance with another possible embodiment, where the light field imaging device is configured for monochrome imaging applications.
Figure 5:
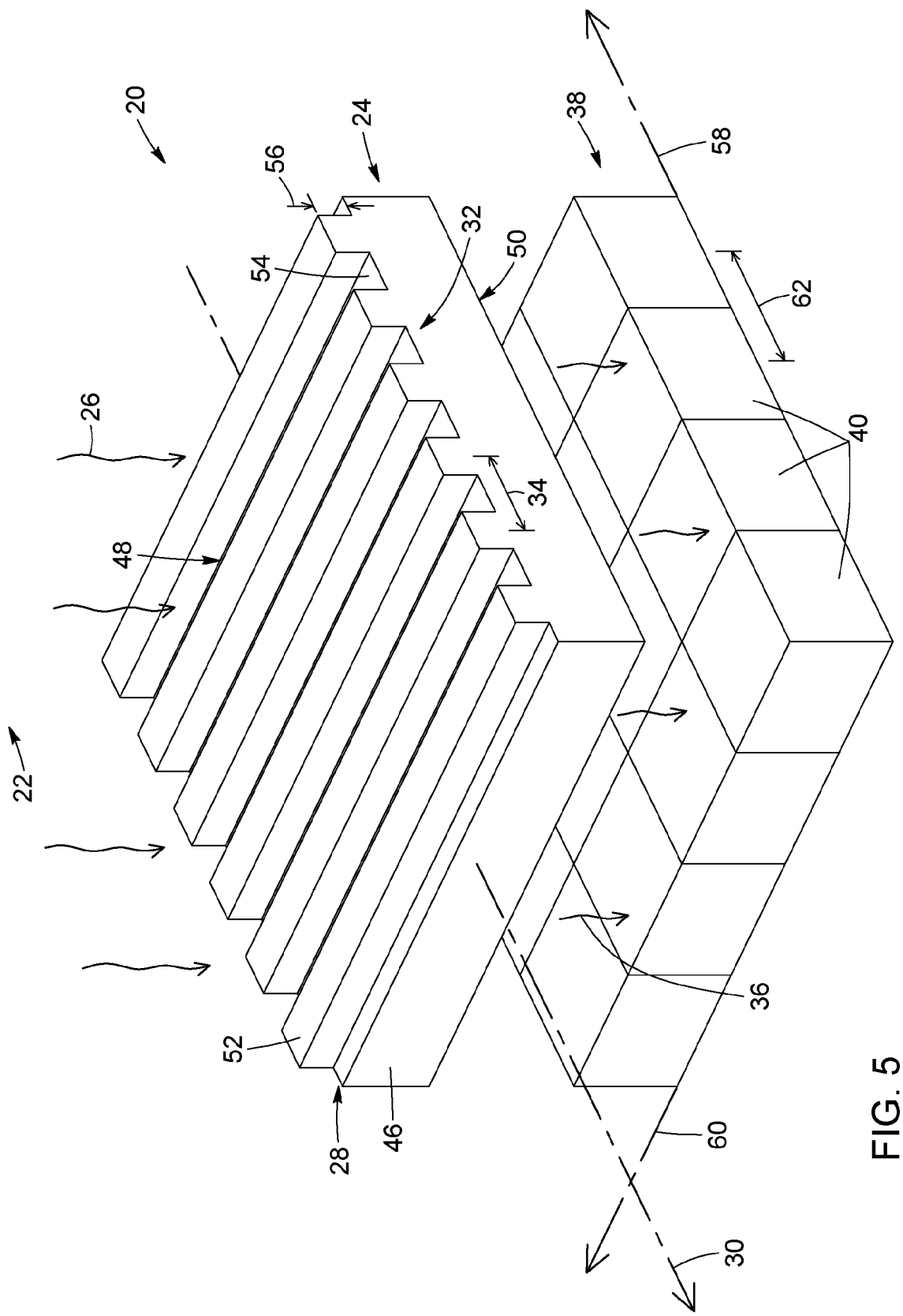
FIG. 5 is a schematic partially exploded perspective view of the light field imaging device of FIG. 4.

Referring now to FIGS. 4 and 5, there is shown another embodiment of a light field imaging device 20, which is suitable for monochrome imaging applications. This embodiment shares many features with the embodiment described above and illustrated in FIGS. 1 and 2, insofar as it generally includes a diffraction grating assembly 24 including at least one diffraction grating 28 and disposed over a pixel array 38 including a plurality of light-sensitive pixels 40. These components may generally be similar in terms of structure and operation to like components of the embodiment of FIGS. 1 and 2. The light field imaging device 20 of FIGS. 4 and 5 differs from that of FIGS. 1 and 2 mainly in that it does not include a color filter array disposed between the diffraction grating assembly 24 and the pixel array 38. As a result, the light-sensitive pixels 40 directly detect the diffracted wavefront 36 transmitted by the diffraction grating 28, without prior spatio-chromatic filtering.

Figure 6:
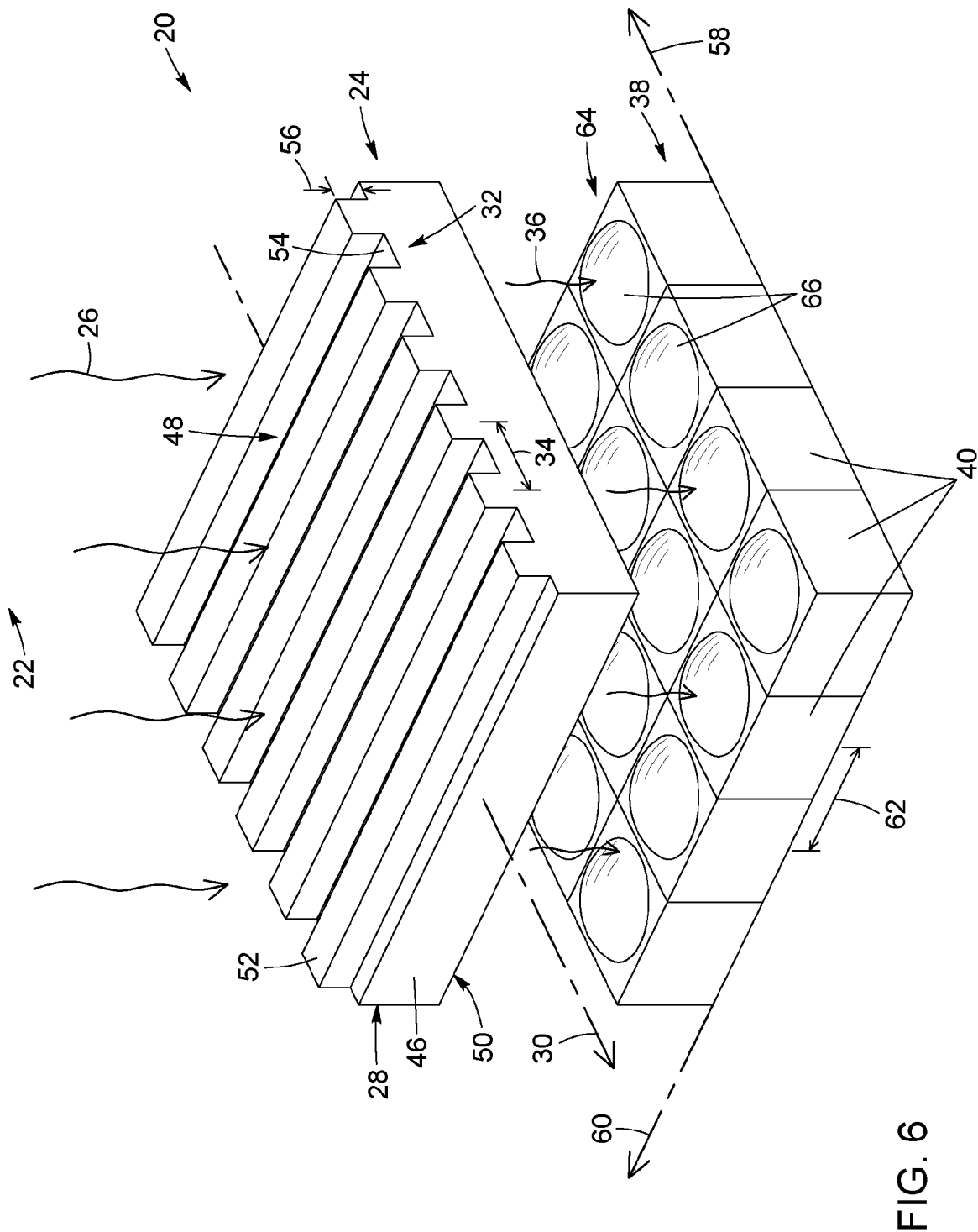
FIG. 6 is a schematic partially exploded perspective view of the light field imaging device, in accordance with another possible embodiment, where the light field imaging device includes a microlens array on top of the color filter array.

Referring to FIG. 6, there is shown another embodiment of a light field imaging device 20, which shares similar features with the embodiment of FIGS. 4 and 5, but differs mainly in that it further includes a microlens array 64 disposed over the pixel array 38 and below the diffraction grating assembly 24. The microlens array 64 includes a plurality of microlenses 66. Each microlens 66 is optically coupled to a corresponding one of the light-sensitive pixels 40 and is configured to focus or otherwise direct the spatial portion of the diffracted wavefront 36 incident upon it onto its corresponding light-sensitive pixel 40. It is to be noted that in embodiments where an array of color filters is provided, such as in FIGS. 1 and 2, the microlens array would be disposed over the color filter array such that each microlens would be optically coupled to a corresponding one of the color filters. In some variants, the light imaging device 20 may also include an anti-reflection coating (not shown) provided over the pixel array 38.

Figure 7:
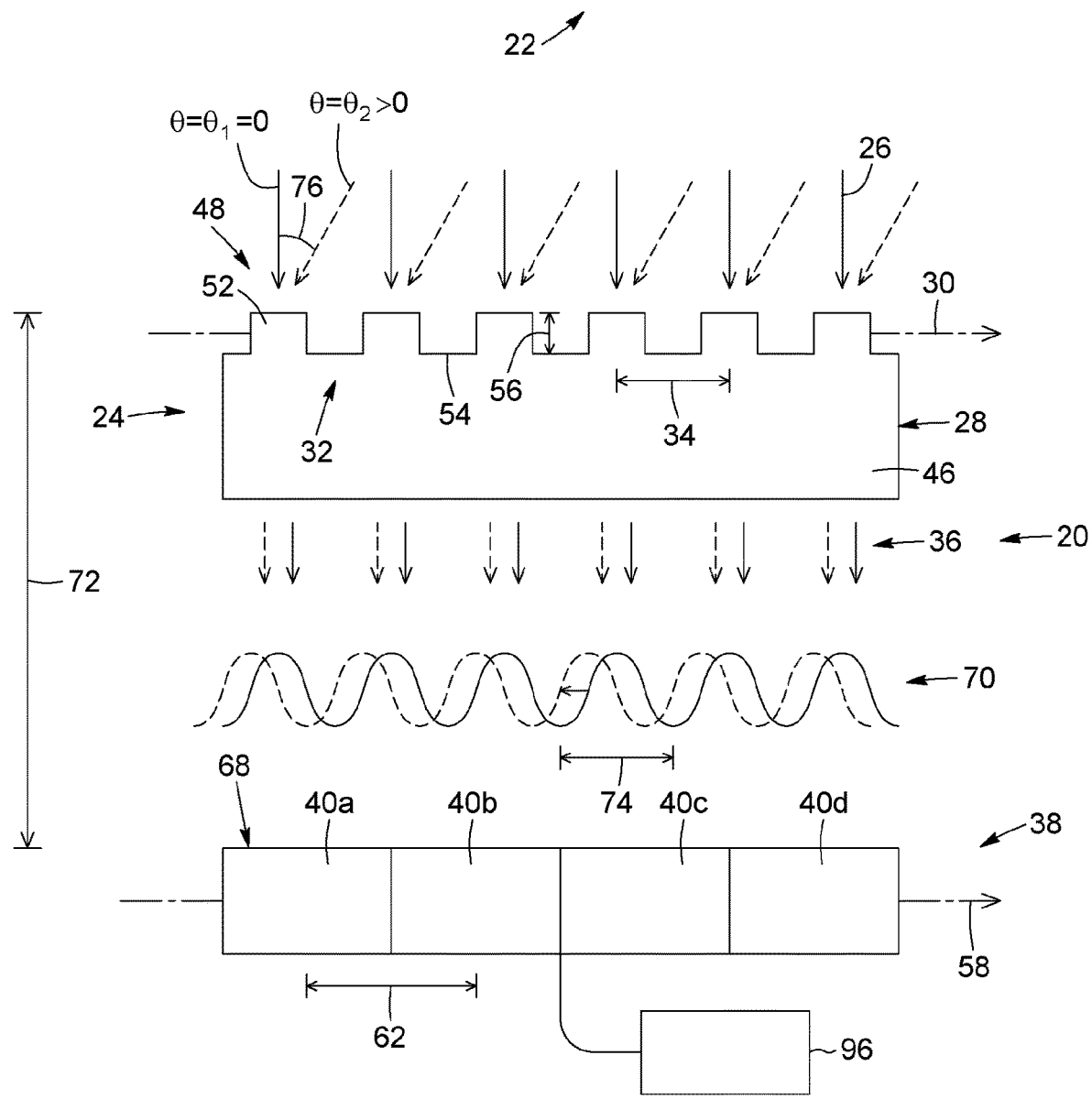
FIG. 7 is a schematic partially exploded side view of a light field imaging device, in accordance with another possible embodiment, where the propagation of a wavefront of light through the device is schematically depicted. The light field imaging device of FIG. 7 is suitable for monochrome imaging applications.

Referring to FIG. 7, there is illustrated a schematic partially exploded side view of an embodiment of a light field imaging device 20 suitable for monochrome imaging applications. The light field imaging device 20 shares similarities with the one shown in FIGS. 4 and 5, in that it includes a diffraction grating assembly 24 including a diffraction grating 28 disposed on top of a pixel array 38 of light-sensitive pixels 40a-40d. For illustrative purposes, the diffraction grating 28 depicted in FIG. 7 is a binary phase transmission grating having a duty cycle of 50% and a periodic refractive index modulation pattern 32 consisting of alternating sets of ridges 52 and grooves 54.

FIG. 7 schematically depicts the propagation of light through the device 20. In operation, the light field imaging device 20 has a field of view encompassing an observable scene 22. The diffraction grating 28 receives an optical wavefront 26 (solid line: normal incidence, $\theta=\theta_1=0$; dashed line: oblique incidence, $\theta=\theta_2>0$) originating from the scene 22 on its input side, and diffracts the optical wavefront 26 to generate, on its output side, a diffracted wavefront 36 (solid line: normal incidence; dashed line: oblique incidence) that propagates toward the pixel array 38 for detection thereby. The effect of the angle of incidence of the incident optical wavefront 26 on the diffracted wavefront 36 and how this effect may be used to provide the light field imaging device 20 with an angle-sensitive response will be discussed in greater detail below.

In FIG. 7, the diffracted wavefront 36 may be characterized by a spatially modulated intensity or diffraction pattern 70 whose spatial profile is a function of the geometrical and optical properties of the diffraction grating 28, the wavelength and angle of incidence of the optical wavefront 26, the position of the observation plane (e.g., the pixel array 38 or intermediate optical components, such as micro-lenses, configured to relay the diffracted wavefront 36 onto the pixel array 38) and the presence of optical components (e.g., micro-lenses, color filters, color filter isolation structures, light guides, and the like) between the diffraction grating 28 and the observation plane. In the present case, the observation plane corresponds to the light-receiving surface 68 of the pixel array 38. In particular, the intensity pattern 70 of the diffracted wavefront 36 may be characterized by a spatially varying intensity profile along the grating axis 30 in the light-receiving surface 68 of the pixel array 38. It is to be noted that in FIG. 7, the grating axis 30 is assumed to be parallel to the pixel axis 58, though this need not be the case in other variants.

In the present techniques, the diffraction grating 28 and the pixel array 38 are disposed relative to each other such that the light-receiving surface 68 of the pixel array 38 is positioned in the near-field diffraction region of the diffraction grating 28. In a near-field diffraction regime, the Fresnel diffraction theory can be used to calculate the diffraction pattern of waves passing through a diffraction grating. Unlike the far-field Fraunhofer diffraction theory, Fresnel diffraction accounts for the wavefront curvature, which allows calculation of the relative phase of interfering waves. Similarly, when detecting the diffracted irradiance pattern within a few integer multiples of the wavelength with a photosensor or another imaging device of the same dimensional order as the grating, higher order-diffractive effects tend to be limited simply by spatial sampling.

To detect the diffracted wavefront 36 in the near field, the present techniques may involve maintaining a sufficiently small separation distance 72, or pedestal height, between the top surface 48 of the diffraction grating 28, where refractive index modulation pattern 32 is formed and diffraction occurs, and the light-receiving surface 68 of the underlying pixel array 38, where the diffracted wavefront 36 is detected. In some implementations, this involves selecting the separation distance 72 to be less than about twenty times a center wavelength of the optical wavefront 26. In some implementations, the separation distance 72 may range between about 0.2 μm and about 20 μm, for example, between 0.5 μm and about 8 μm if the center wavelength of the optical wavefront lies in the visible range.

The Talbot effect is a near-field diffraction effect in which plane waves incident on a periodic structure, such as a diffraction grating, produce self-images, called Talbot images, of the periodic structure at regular distances behind the periodic structure. The regular distance at which self-images of the periodic structure are observed due to interference is called the Talbot length $z_T$. In the case of a diffraction grating having a grating period g, the Talbot length $z_T$ may be expressed as follows:

$$z_T = \frac{\lambda}{1 - \sqrt{1 - \frac{\lambda^2}{g^2}}}, \quad (3)$$

where $\lambda$ is the wavelength of the incidence. This expression simplifies to the following expression when the grating period g is much larger than the wavelength $\lambda$:

$$z_T = \frac{2g^2}{\lambda}. \quad (4)$$

Other self-images are observed at integer multiples of the half Talbot length ($nz_T/2$). These additional self-images are either in-phase and out-of-phase by half of the grating period (i.e., by g/2) with respect to the self-image observed at $z_T$, depending on whether n is even or odd. Further sub-images can also be observed at smaller fractional values of the Talbot length.

It is to be noted that these Talbot self-images are observed in the case of amplitude gratings. In the case of phase gratings, such as in FIG. 7, it is the phase of the grating that is self-imaged at integer multiples of the half-Talbot distance, which cannot be observed using detectors that are sensitive only to light intensity, such as photodiodes. As such, a phase grating, unlike an amplitude grating, produces a diffracted wavefront of constant light intensity in an observation plane located at integer multiples of the half-Talbot distance. However, phase gratings may also be used to generate near-field intensity patterns similar to Talbot self-images at intermediate observation planes that are shifted from the planes located at integer multiples of the half-Talbot distance. For example, such intermediate observation planes may be located at $z_T/4$ and $3z_T/4$. These intensity patterns, which are sometimes referred to as Lohmann images, can be detected with intensity-sensitive photodetectors.

Returning to FIG. 7, in the illustrated embodiment, the phase grating 28 and the pixel array 38 are positioned relative to each other so as to detect these Talbot-like, near-field intensity patterns formed at observation planes corresponding to non-integer multiples of the half-Talbot distance (i.e., away from integer multiples of the half-Talbot distance). In such a case, the diffraction grating 28 is configured to generate, in the observation plane, a diffracted wavefront 36 having an intensity pattern 70 that is spatially modulated according to the grating period 34. As depicted in FIG. 7, the intensity pattern 70 of the diffracted wavefront 36 has a spatial period 74 that substantially matches the grating period 34 of the diffraction grating 28 as well as a shape that relates to that of the refractive index modulation pattern 32 of the diffraction grating 28. It is appreciated that each of the light-sensitive pixels 40a-40d of the array 38 is configured to sample a respective portion of the intensity pattern 70 of the diffracted wavefront 36 and to generate therefrom a corresponding intensity-based pixel response.

As noted above, the term "match" and its derivatives are meant to encompass not only an exact or identical match or concordance between the profile and the period of the intensity pattern 70 of the detected diffracted wavefront 36 and the profile and the period of the refractive index modulation pattern 32 of the diffraction grating 28, but also but also a substantial, approximate, sufficient, or subjective match. It is also to be noted that the expression "spatially modulated according to the grating period" is meant to encompass both "at the grating period", to describe implementations where the spatial period 74 of the intensity pattern 70 is substantially equal to the grating period 34, as in FIG. 7, and "related to the grating period", to describe other implementations where the spatial period 74 of the intensity pattern 70 is some rational multiple of the grating period 34, such as twice the grating period in the case of doubled Lohmann images.

Another feature of near-field diffraction by a periodic diffraction grating 28, is that upon varying the angle of incidence 76 of the optical wavefront 26 impinging on the diffraction grating 28, the intensity pattern 70 of the diffracted wavefront 36 shifts laterally (i.e., along the grating axis 30), but substantially retains its period 74 and shape, as may be seen from the comparison between the solid and dashed diffraction patterns in FIG. 7. Thus, the diffraction grating 28 is configured to induce angle-dependent intensity modulations in the incident optical wavefront 26, which is be directly sampled by the light-sensitive pixels 40a-40d. By properly setting the relationship between the pixel pitch 62 of the pixel array 38 and the grating period 34 of the diffraction grating 28, the intensities measured by the individual pixels 40a-40d for a given intensity of incident light will vary as a function of the angle of incidence due to the lateral shifts experienced by the diffracted intensity pattern 70. The angle-dependent information encoded by the diffraction grating 28 into the intensity-based diffraction pattern 70 recorded by the pixel array 38 as a superposition of individual intensity-based pixel responses may be decoded to provide depth information about the scene 22.

In some implementations, the separation distance 72 between the diffraction grating 28 and the pixel array 38 may be selected to ensure that the lateral shift experienced by the intensity pattern 70 of the diffracted wavefront 36 remains less than the grating period 34 as the angle of incidence 76 of the optical wavefront 26 is varied across the range of possible angles of incidence on the pixel array 38 as defined by the numerical aperture of the light field imaging device 20. Otherwise, the depth sensitivity of the light field imaging device 20 may be degraded or otherwise adversely affected.

It is appreciated that it is generally not possible to determine with certainty whether variations in a single pixel response are due to changes in intensity only, changes in angle of incidence only, or changes in both intensity and angle of incidence. Thus, the angle-dependent response of a single pixel cannot, in general, be used to unambiguously recover both the intensity and the angle of incidence of the incoming wavefront. Rather, the difference between the pixel responses from at least a pair or group of pixels configured to sample different portions of the intensity pattern of diffracted wavefront may be used to resolve the ambiguity between intensity and angle of incidence. Thus, in the present techniques, the plurality of light-sensitive pixels includes groups or pairs of adjacent pixels, where the adjacent pixels in each group or pair have different pixel responses as a function of the angle of incidence. In the present description, the term "adjacent pixels" generally refers to two or more pixels whose separation along a line parallel to the grating axis of the overlying diffraction grating is equal to the pixel pitch along the grating axis. It is to be noted, however, that adjacent pixels may, but need not, be arranged along a same line parallel to the grating axis. For example, two nearest-neighbor green pixels in a Bayer pattern may be considered to form a pair of adjacent pixels as defined herein (see, e.g., green pixels 40a and 40b in FIG. 10, which are not arranged along a same line parallel to the grating axis 30). It is also to be noted that in a group of more than two adjacent pixels, each pixel may be separated by a distance equal to the pixel pitch from at least one other pixel in the group, but not necessarily from all the other pixels in the group (see, e.g., the pixels 40 in FIG. 9D, which include groups of three adjacent pixels, where, in each group, the distance between the center pixel and each of side pixel is equal to the pixel pitch while the distance between the two side pixels is equal to twice the pixel pitch).

It is to be noted that upon being optically coupled to an underlying pixel array 38, the diffraction grating 28 convolves phase-dependent information with a standard 2D image such that the intensity pattern 70 of the detected diffracted wavefront 36 may generally be expressed as a modulated function $I \sim I_{mod}(\text{depth info}) \times I_{base}(2D \text{ image})$ including a modulating component $I_{mod}$ and a base component $I_{base}$. The base component $I_{base}$ represents the non-phase-dependent optical wavefront that would be detected by the pixel array 38 in the absence of the diffraction grating 28. That is, detecting the base component $I_{base}$ alone would allow a conventional 2D image of the scene 22 to be obtained. Meanwhile, the modulating component $I_{mod}$, is a direct result of the phase of the incident optical wavefront 26 such that any edge or slight difference in incidence angle will manifest itself as a periodic electrical response spatially sampled across the pixel array 38. The amplitude of the modulating component $I_{mod}$ is generally, but not necessarily, small compared to the base component $I_{base}$ (e.g., the ratio of $I_{mod}$ to $I_{base}$ may typically range from about 0.1 to about 0.3). It is appreciated that the sensitivity to the angle of incidence 76 of the optical wavefront 26, and therefore the angular resolution of the light field imaging device 20, will generally depend on the specific design of the diffraction grating 28.

Grating designs in which the grating period is twice as large as the pixel pitch are disclosed in co-assigned international patent application PCT/CA2017/050686, published as WO 2017/210781 A1, the contents of which are incorporated herein by reference in their entirety. In these designs, adjacent pixels of the pixel array are configured to sample complementary portions of the diffracted wavefront that are phase-shifted by half a grating period relative to each other. In such a configuration, the differential response between the pixel responses of two adjacent pixels may achieve, in principle, a maximum modulation depth of substantially 100% between a first angle of incidence, where the maximum of the diffracted intensity pattern is centered on one pixel and the minimum diffracted intensity pattern is centered on the other pixel (peak modulation level), and a second angle of incidence, where either the maximum or the minimum of the diffracted intensity pattern is centered on the transition between the pixels (unmodulated level).

In contrast, the present techniques relate to grating designs in which the grating period is equal to or smaller than the pixel pitch along the grating axis. For example, in the embodiments depicted in FIGS. 1 to 7, the ratio of the pixel pitch 62 to the grating period 34 is equal to 3/2. Using grating designs in which the grating period 34 is equal to or smaller than the pixel pitch 62 may be advantageous, notably in implementations where the pixel pitch 62 is relatively large and/or at shorter wavelengths. The reason for this can be explained as follows.

As noted above, phase gratings may be used to generate near-field intensity patterns similar to Talbot self-images, which may be referred to as Lohmann images, at observation planes that are located at distances that scale as $g^2/\lambda$. This means that in FIG. 7, the separation distance 72 between the diffraction grating 28 and the pixel array 38 scales up with the square of the grating period 34. For example, if the pixel pitch p is equal to 1 µm, using a grating period g of 2 µm, corresponding to twice the pixel pitch p, would result in a separation distance of 3.76 µm if the observation plane is at $z_T/4=g^2/2\lambda$ with $\lambda$=532 nm. Now, if the pixel pitch p is increased to 3 µm, one would have to use a grating period g of 6 µm to keep the same ratio of p/g. However, to keep the observation plane at $z_T/4$, the separation distance would have to be increased to 33.83 µm, a nine-fold increase compared to the case where p=1 µm. In general, the separation distance 72 between the diffraction grating 28 and the pixel array 38 is controlled mainly by the height or thickness of the grating substrate 46. (It is to be noted that with FIG. 7 being a schematic partially exploded representation of an embodiment of a light field device, the separation distance 72 appears to be significantly larger than the height of the grating substrate 46; however, in practice, it will be appreciated that the separation distance 72 is generally equal to or slightly larger than the height of the grating substrate 46.)

Beyond a certain height, manufacturing a grating substrate can become challenging. In some implementations, the challenge is related to the fact that manufacturing a grating substrate involves a layering process in which the higher the number of layers (i.e., the thicker the grating substrates), the harder it is to maintain flatness uniformity and/or to avoid or at least control void formation, delamination, and other factors affecting yield and reliability.

Moreover, when the separation distance 72 between the diffraction grating 28 and the pixel array 38 increases, so generally does the lateral shift experienced by the intensity pattern 70 of the diffracted wavefront 36 for a given variation of angle of incidence 76 of the optical wavefront 26. As noted above, it may be desirable or required in some implementations to achieve a condition that this lateral shift remain less than the grating period 34 across the range of possible angles of incidence defined by the numerical aperture of the light field imaging device 20. Because the separation distance 72 scales up with the square of the grating period 34, the range of possible angles of incidence for which this condition may be satisfied, which in turn defines the largest achievable value for the numerical aperture of the light field imaging device 20, generally becomes smaller as the separation distance 72 increases. It is appreciated that a limited numerical aperture may be undesirable or disadvantageous in some applications.

Thus, in some implementations, for example, when the pixel pitch exceeds a certain value, it may be desirable, advantageous, or required to limit the separation distance 72 between the diffraction grating 28 and the pixel array 38. In the present techniques, it has been found that one way of achieving this is by using designs where the pixel pitch is equal to or greater than the grating period. For example, returning to the case above where p=3 µm, if one uses g=2 µm instead of 6 µm, which corresponds to p/g=3/2>1 rather than p/g=1/2<1, then the separation distance 72 may be kept at 3.76 µm, as for the case where p=1 µm, g=2 µm, and p/g=1/2.

In designs where p≥g, not at all values of p/g necessarily fulfill the condition that the pixel array includes angle-sensitive groups or pairs of adjacent pixels where the pixels in each group or pair have different pixel responses as a function of the angle of incidence. For example, when the adjacent pixels in a given pixel group or pair all have identical pixel dimensions along the grating axis, values of p/g=n, where n is a positive integer, generally do not fulfill this condition, since in this case the intensity measured by each adjacent pixel does not vary with the angle of incidence of the incoming wavefront because a whole number of grating periods of the diffraction grating extend above each pixel. Thus, as the intensity pattern of the diffracted wavefront shifts laterally above a particular pixel as a function of angle of incidence, any amount of light that is lost to its neighboring pixel on one side is recovered in the same amount from its other neighboring pixel on the other side. In contrast, values of p/g≥1 that are different from a positive integer, as is the case in FIGS. 1 to 7 where p/g=3/2, may be used in the present techniques to provide groups or pairs of adjacent pixels exhibiting different angle-sensitive pixel responses.

Figure 8A:
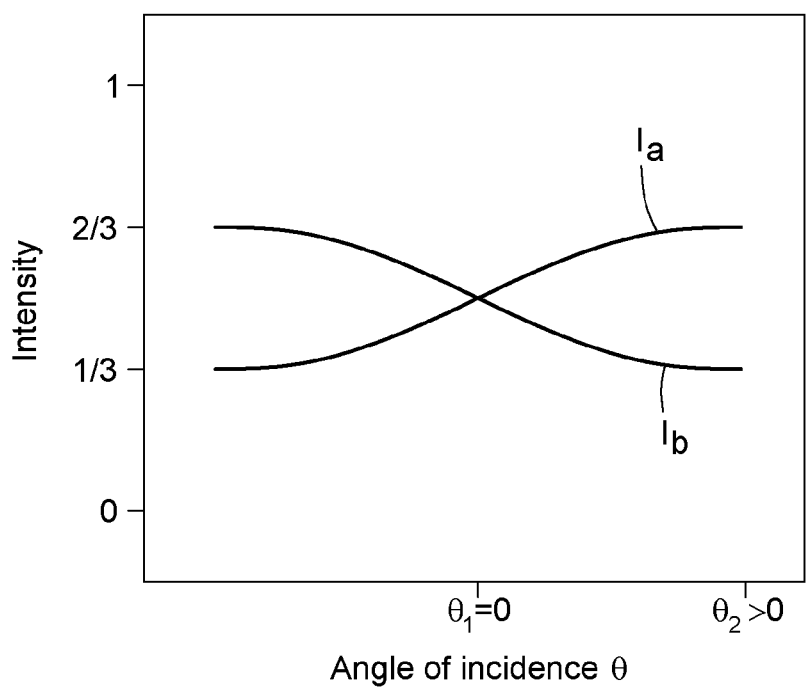
FIG. 8A is a plot of the pixel responses of two adjacent pixels of the light field device of FIG. 7, as a function of angle of incidence.
Figure 8B:
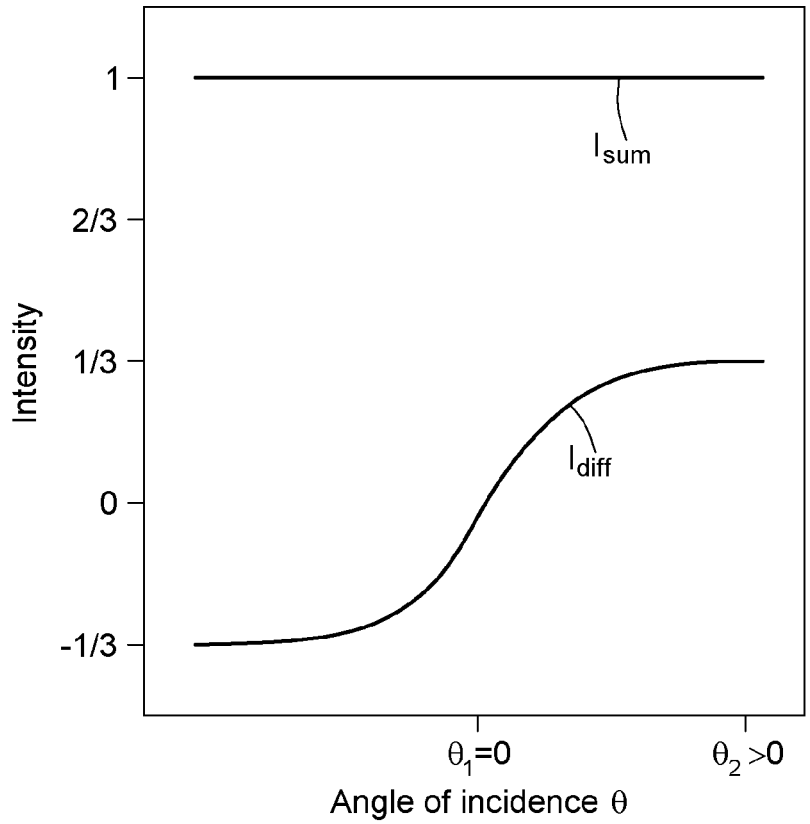
FIG. 8B is a plot of the sum and the difference of the pixel responses of FIG. 8A as a function of angle of incidence.

Referring now to FIGS. 8A and 8B, there are provided a plot of the pixel responses $I_a$, $I_b$ measured by the two individual pixels 40a, 40b of FIG. 7 for a given intensity of incident light (assumed equal to one in FIGS. 8A and 8B) as a function of the angle of incidence θ (FIG. 8A), and a plot of the sum $I_{sum}=I_a+I_b$ and the difference $I_{diff}=I_a-I_b$ of the two pixel responses as a function of θ (FIG. 8B). It is appreciated from FIG. 8A that the intensities $I_a$, $I_b$ vary in a complementary way as a function of θ such that their $I_{sum}$ remains independent of θ, as can be verified from FIG. 8B. The signal $I_{sum}$ is similar to the signal that would be obtained by the pixels 40a, 40b in the absence of the diffraction grating 28, and thus provides 2D intensity image information, with no angle-dependent information encoded therein. In contrast, the differential pixel response $I_{diff}$ varies as a function of θ and represents a measurement of the angle-dependent information encoded into the diffracted wavefront 36 by the diffraction grating 28.

Referring still to FIGS. 8A and 8B, in the case where p/g=3/2, a maximum modulation depth of about 33% between a first angle of incidence (e.g., $θ_2>0$ in FIG. 7; peak modulation level), where two maxima of the diffracted intensity pattern overlie one pixel (e.g., pixel 40a in FIG. 7) and one maximum overlies the other pixel (e.g. pixel 40b in FIG. 7), and a second angle of incidence (e.g., $θ_1=0$ in FIG. 7; unmodulated level), where one maximum is centered on one of the pixel, one maximum is centered on the other pixel, and one maximum is centered on the transition between the pixels. The maximum modulation depth achievable with p/g=3/2 is thus less than for the case where p/g=1/2.

Returning to FIG. 7, the light field imaging device 20 may include a processor 96 configured to receive and process the light field image data acquired by the light-sensitive pixels 40. In some implementations, the processor 96 is configured to compute a plurality of summed pixel responses, where each summed pixel response is based on a sum of the pixel responses of one of the pairs of adjacent pixels (e.g., such as $I_{sum}$ described above), and then to generate a 2D image of the scene or other 2D image information from the plurality of summed pixel responses. Additionally, or alternatively, the processor may be configured to compute a plurality of differential pixel responses, where each differential pixel response is based on a difference between the pixel responses of one of the pairs of adjacent pixels (e.g., such as $I_{diff}$ described above), and then generate a depth image of the scene or other depth- or distance-related information from the plurality of differential pixel responses.

Depending on the application, the processor 96 may include a single processing entity or a plurality of processing entities. Such processing entities may be physically located within the same device, or the processor 96 may represent processing functionality of a plurality of devices operating in coordination. Accordingly, the processor 96 may include or be part of one or more of a computer; a microprocessor; a microcontroller; a coprocessor; a central processing unit (CPU); an image signal processor (ISP); a digital signal processor (DSP) running on a system on a chip (SoC); a dedicated graphics processing unit (GPU); a special-purpose programmable logic device embodied in a hardware device such as, for example, a field-programmable gate array (FPGA) or an application-specific integrated circuit (ASIC); a digital processor; an analog processor; a digital circuit designed to process information; an analog circuit designed to process information; a state machine; and/or other mechanisms configured to process information and operate collectively as a processor. In particular, the terms "processor" should not be construed as being limited to a single processor or a single controller, and accordingly, any known processor or controller architecture may be used. Furthermore, depending on the application, the acquisition and processing of the light field image data may be performed by either the same device or separated devices.

In some implementations, the pixel responses belonging to the same pixel bank or to several pixel banks may be combined together, for example, using appropriate weighting factors, prior to computing the summed and differential pixel responses described above. In the present description, the term "pixel bank" refers to a group of light-sensitive pixels of the pixel array that are arranged along a line which is perpendicular to the grating axis of the overlying diffraction grating. That is, two nearest-neighbor pixel banks are separated from each other by a distance corresponding to the pixel pitch along the grating axis. For example, in FIG. 7, each pixel bank would extend parallel to the pixel axis 60 and be oriented perpendicular to the plane of the page. Likewise, in the embodiment of FIGS. 1 and 2, the diffraction grating 28 overlies four pixel banks, where each pixel bank extends along the pixel axis 60 and includes four pixels 40.

It is appreciated that depending on the application, the p/g ratio of the pixel pitch 62 of the pixel array 38 along the grating axis 30 to the grating period 34 of the diffraction grating 28 may take several values and fulfill different conditions. Non-limiting examples of such conditions include, to name a few, p/g>1 but different from a positive integer; p/g=(2n+1)/2, where n is a positive integer; p/g=n/m, where n and m are positive integers larger than two, and n is larger than m. Some further non-limiting embodiments will now be described with respect to FIGS. 9A to 9F. It is appreciated that while the embodiments of FIGS. 9A to 9F are depicted for monochrome applications, for simplicity, embodiments similar to those of FIGS. 9A to 9F could be used in color applications, for example, by providing a color filter array between the diffraction grating and the pixel array.

Figure 9A:
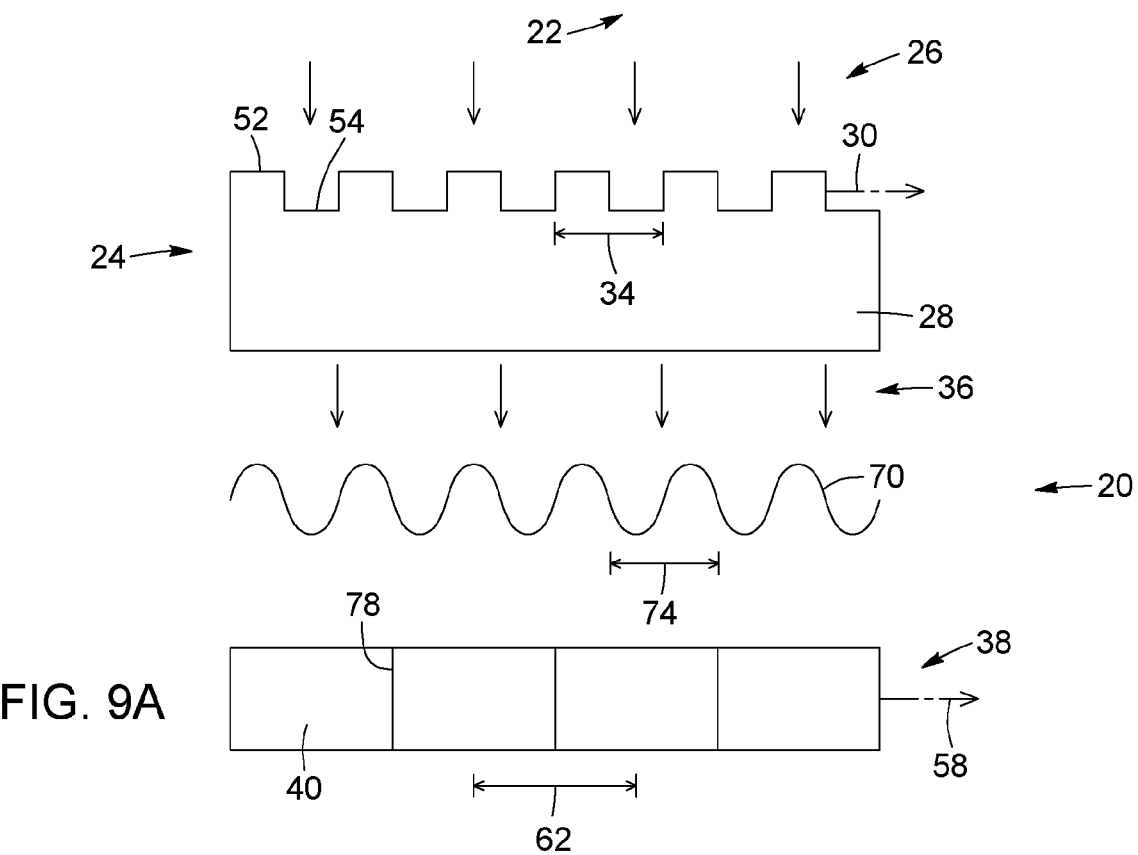
FIGS. 9A to 9F are schematic partially exploded side views of five other possible embodiments of a light field imaging device, in which the propagation of a wavefront of light through the device is schematically depicted.

Referring to FIG. 9A, there is illustrated an embodiment of a light field imaging device 20 having a p/g ratio equal to 3/2, as in the embodiments described above, but a different alignment condition between the diffraction grating 28 and the pixel array 38. In the previously described embodiments depicted in FIGS. 1 to 7, each pair of adjacent pixels 40 was positioned in alignment with either a center of a ridge 52 or a center of a groove 54 of the overlying diffraction grating 28, assuming that the illustrated pixels 40 have a chief ray angle of zero. This provided angle-dependent pixel responses that were asymmetrical (i.e., odd-symmetrical) with respect to normal incidence (θ=0) (see, e.g., the curves $I_a$ and $I_b$ in FIG. 8A). In contrast, the pairs of adjacent pixels 40 in FIG. 9A are centered with transitions between adjacent ridges 52 and grooves 54, again assuming that the illustrated pixels 40 have a chief ray angle of zero. That is, each pixel 40 within a pair is centered with either a ridge 52 of a groove 54, resulting in symmetrical (i.e., even) pixel responses with respect to normal incidence (θ=0).

Figure 9B:
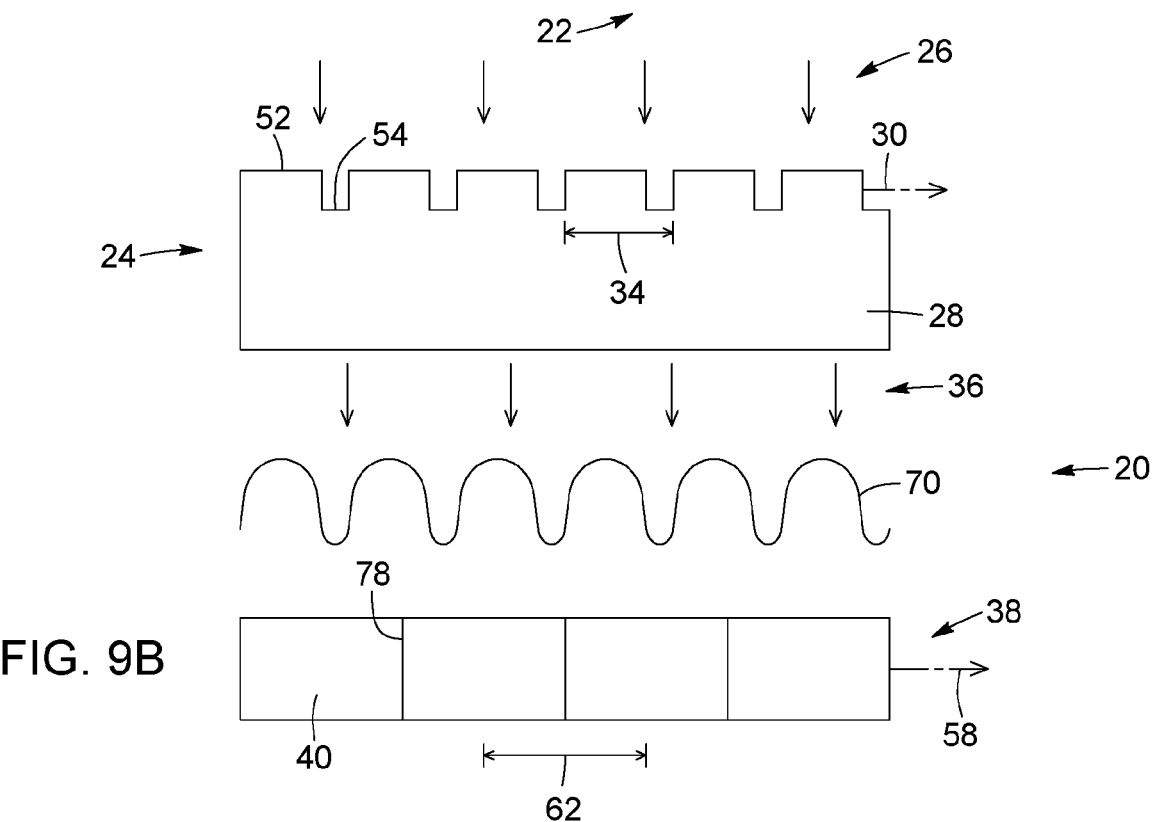

Referring to FIG. 9B, there is illustrated another embodiment of a light field imaging device 20 having a p/g ratio is equal to 3/2. However, compared to the previously described embodiments depicted in FIGS. 1 to 7, where the duty cycle of the diffraction grating 28 (i.e., corresponding to ridges 52 and grooves 54 of equal width), the diffraction grating 28 in FIG. 9B has a duty cycle different from 50%.

Figure 9C:
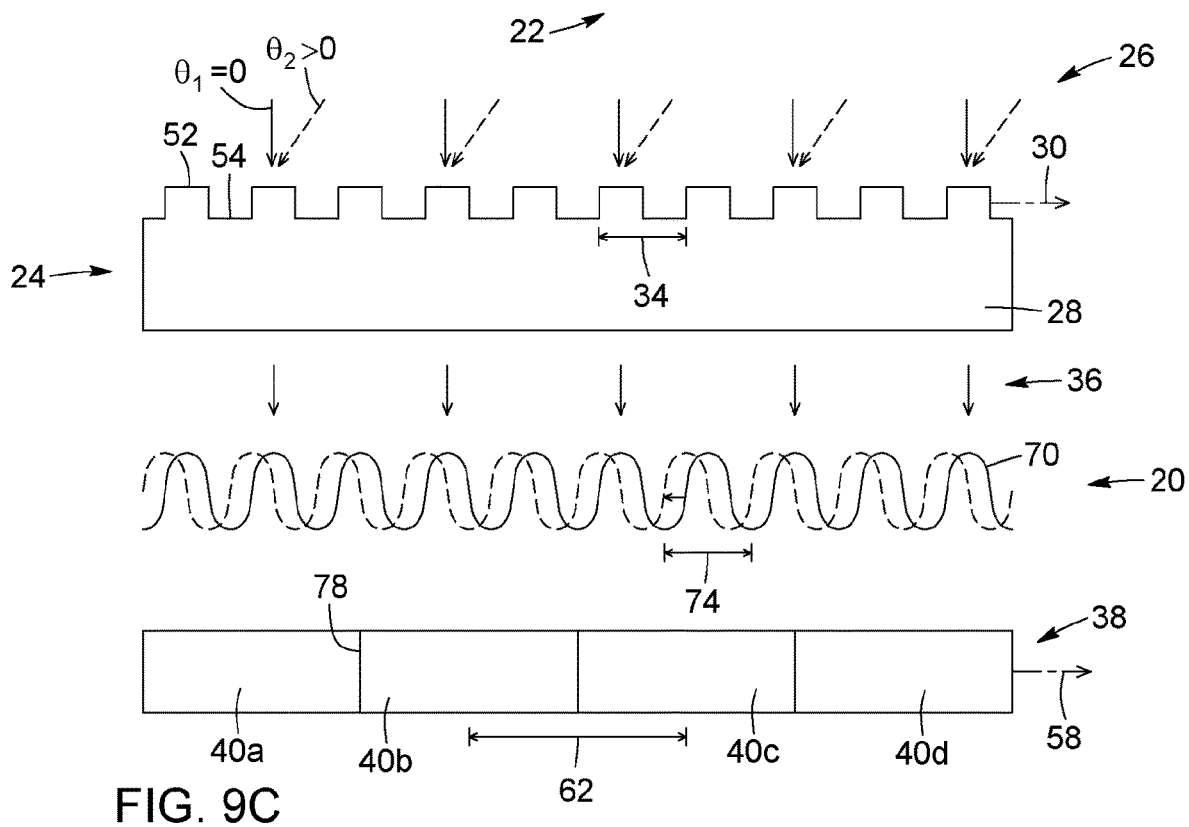

Referring to FIG. 9C, there is illustrated another embodiment of a light field imaging device 20, in which the p/g ratio is equal to 5/2. This embodiment includes pairs of adjacent pixels 40a-40d having pixel responses that are similar to those depicted in FIGS. 8A and 8B, in that they vary in a complementary way as a function of the angle of incidence θ such that their sum $I_{sum}$ remains independent of θ while their difference varies as a function of θ and has angle-dependent information encoded thereinto by the diffraction grating 28. However, the maximum modulation depth achievable when p/g=5/2 is about 20%, which is less than the value of 33% achievable when p/g=3/2. This value of about 20% is achieved between a first angle of incidence ($θ_2>0$ in FIG. 9C; peak modulation level), where three maxima of the diffracted intensity pattern overlie pixel 40*a* and two maxima overlie pixel 40*b*, and a second angle of incidence ($θ_1=0$ in FIG. 9C; unmodulated level), where two maxima overlie pixel 40*a*, two maxima overlie pixel 40*b*, and one maximum is centered on the transition 78 between pixel 40*a* and pixel 40*b*. It should be noted that, when p/g is equal to (2n+1)/2, where n is a positive integer, the maximum modulation depth scales as 1/(2n+1).

Figure 9D:
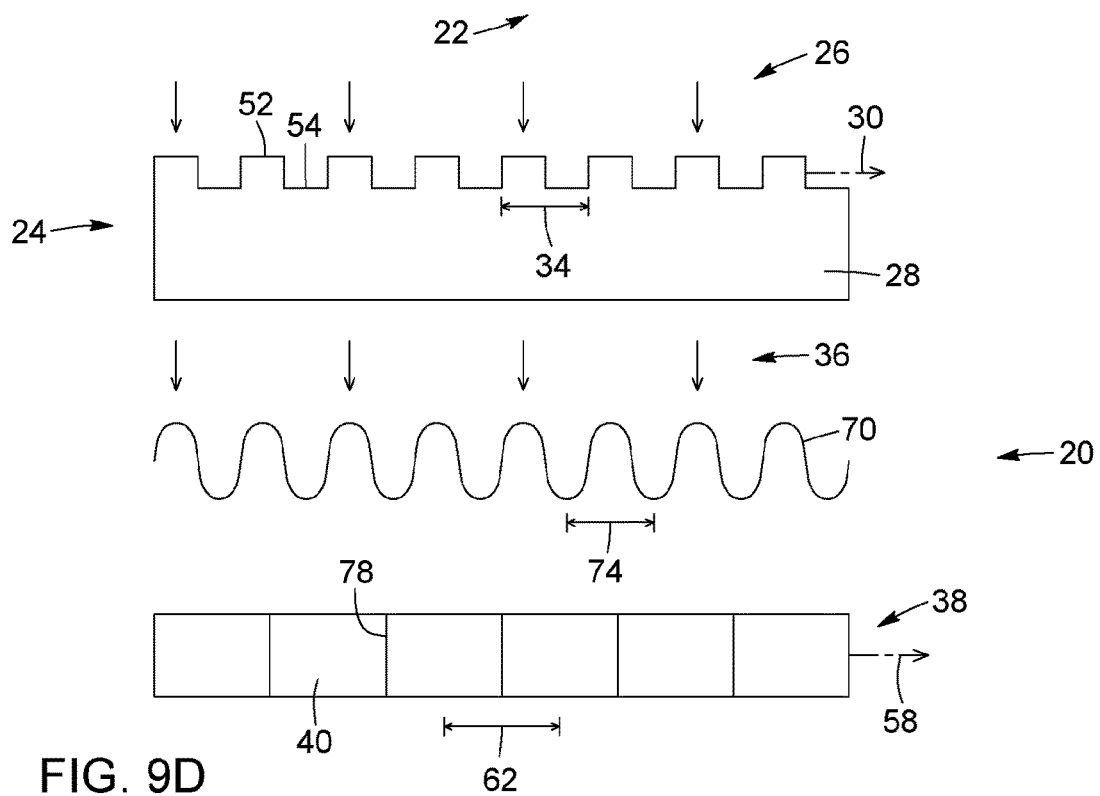

Referring to FIGS. 9D, there is illustrated another embodiment of a light field imaging device 20, in which the p/g ratio is equal to 4/3. This embodiment is an example of a case where p/g is equal to n/m, where n and m are positive integers larger than two, and n is larger than m. It is appreciated that this embodiment also fulfills the condition that the pixel array includes groups or pairs of adjacent pixels where the pixels in each group or pair have different pixel responses as a function of the angle of incidence. In fact, this embodiment includes groups of m=3 pixels having different angle-sensitive pixel responses. As such, the computation of summed and differential pixel responses, described above with respect to pairs of pixel responses, may be generalized to generate 2D images and depth maps for the case of m pixel responses.

Figure 9E:
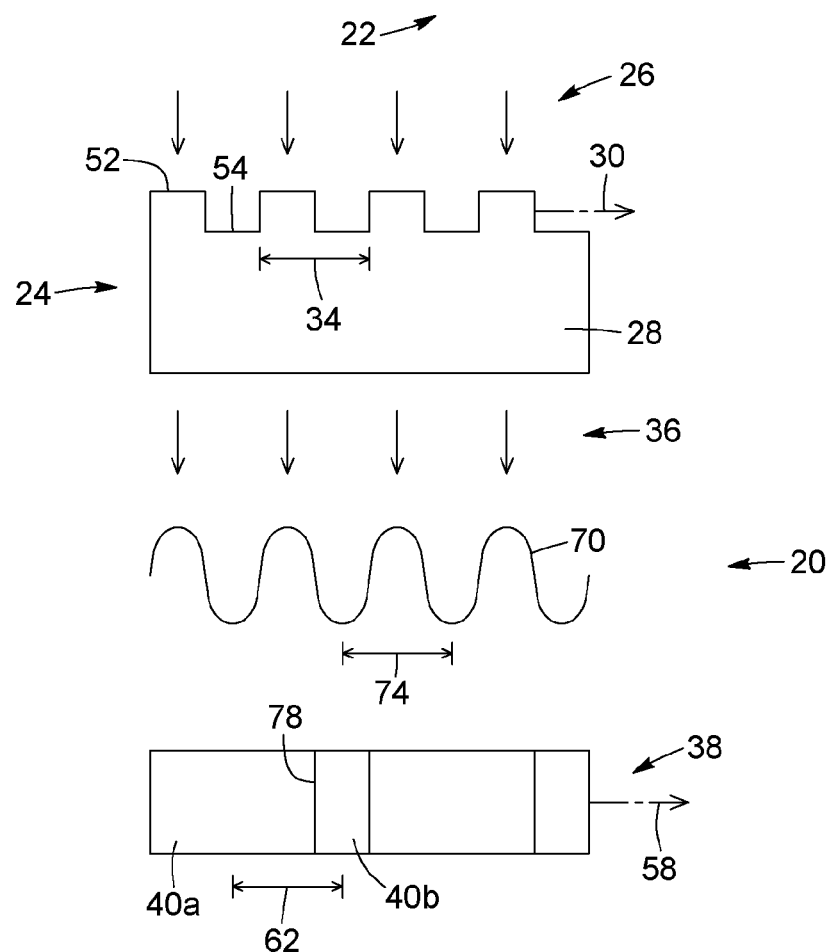

Referring to FIG. 9E, there is illustrated another embodiment of a light field imaging device 20, in which the p/g ratio is equal to one. As noted above, cases for which p/g=n, where is n is any positive integer, including one, do not provide pixel responses that vary depending on the angle of incidence for pixels having identical pixel dimensions along the grating axis. However, this is not necessarily the case for pixel arrays that include groups or pairs of adjacent pixels where the pixels in each group or pair do not all have the same pixel dimensions along the grating axis. Possible examples of sensors having such a pixel architecture include high-dynamic-range (HDR) sensors. In FIG. 9E, pixel 40*a* is twice the size of pixel 40*b* along the grating axis, and the pixel pitch 62 of the pixel array 38, defined as the center-to-center distance between pixel 40*a* and pixel 40*b*, is equal to the grating period 34 of the overlying diffraction grating 28. It is appreciated that in this case, the differential response corresponding to the difference between the angle-dependent pixel responses of pixels 40*a* and pixel 40*b* will vary as a function of the angle of incidence, making it possible to extract depth information therefrom.

Figure 9F:
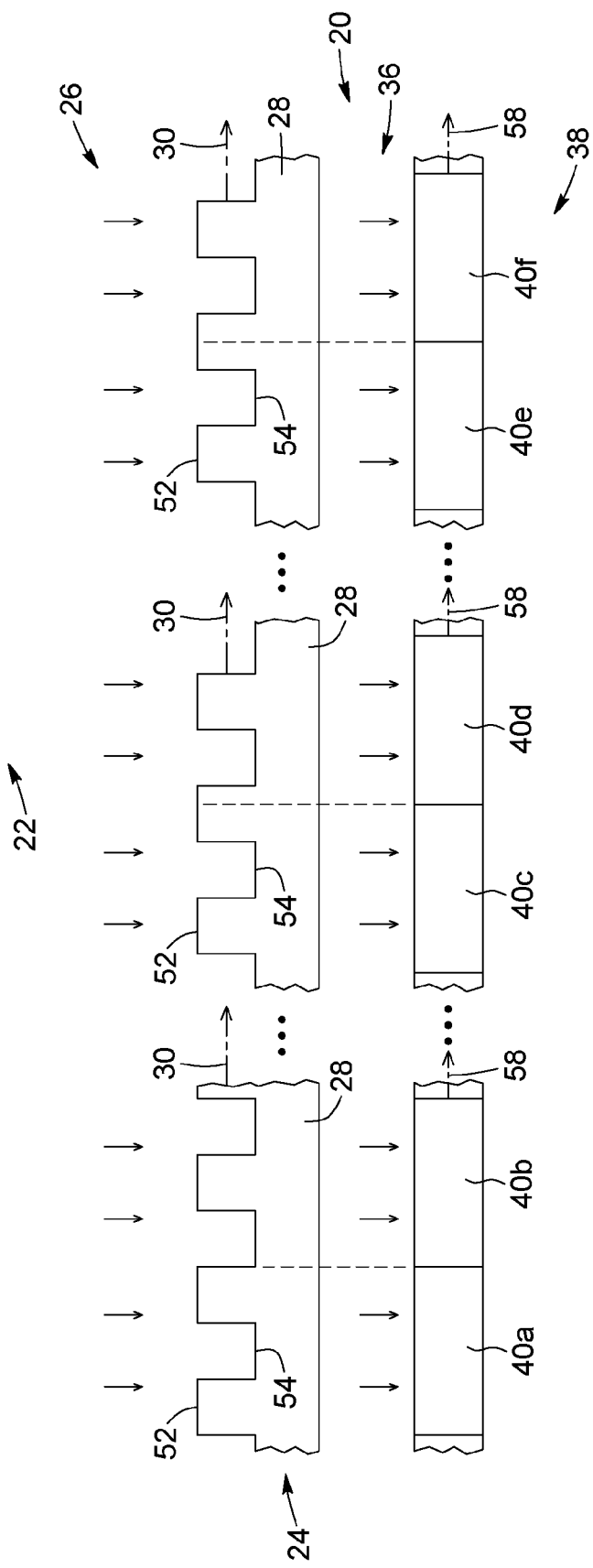

In some implementations, for example, in architectures with high chief ray angle optical systems, the diffraction grating may be designed to follow a designed chief ray angle offset of an overlying microlens array relative to the pixel array such that each corresponding chief ray will pass through the center of the intended grating feature and its subsequent microlens. Such a configuration may ensure appropriate phase offsets for highly constrained optical systems. This means that, in some embodiments, a degree of vertical alignment between the features of the diffraction grating (e.g., its ridges and grooves) and the underlying light-sensitive pixels may change as a function of position within the pixel array, for example, as one goes from the center to the edge of the pixel array, to accommodate a predetermined chief-ray-angle offset. For example, depending on its position within the pixel array, a given light-sensitive pixels may be positioned under and in vertical alignment with a center of a ridge, a center of a groove, a transition between a ridge and a groove, or some intermediate position of a corresponding overlying diffraction grating. This is illustrated in the embodiment of FIG. 9F, in which the pair formed of pixels 40*a* and 40*b* is aligned with a transition between a ridge 52 and a groove 54, the pair formed of pixels 40*c* and 40*d* is aligned with a midpoint between a center of a ridge 52 and a transition between a ridge 52 and a groove 54, and the pair formed of pixels 40*e* and 40*f* is aligned with a center of a ridge 52.

Figure 10:
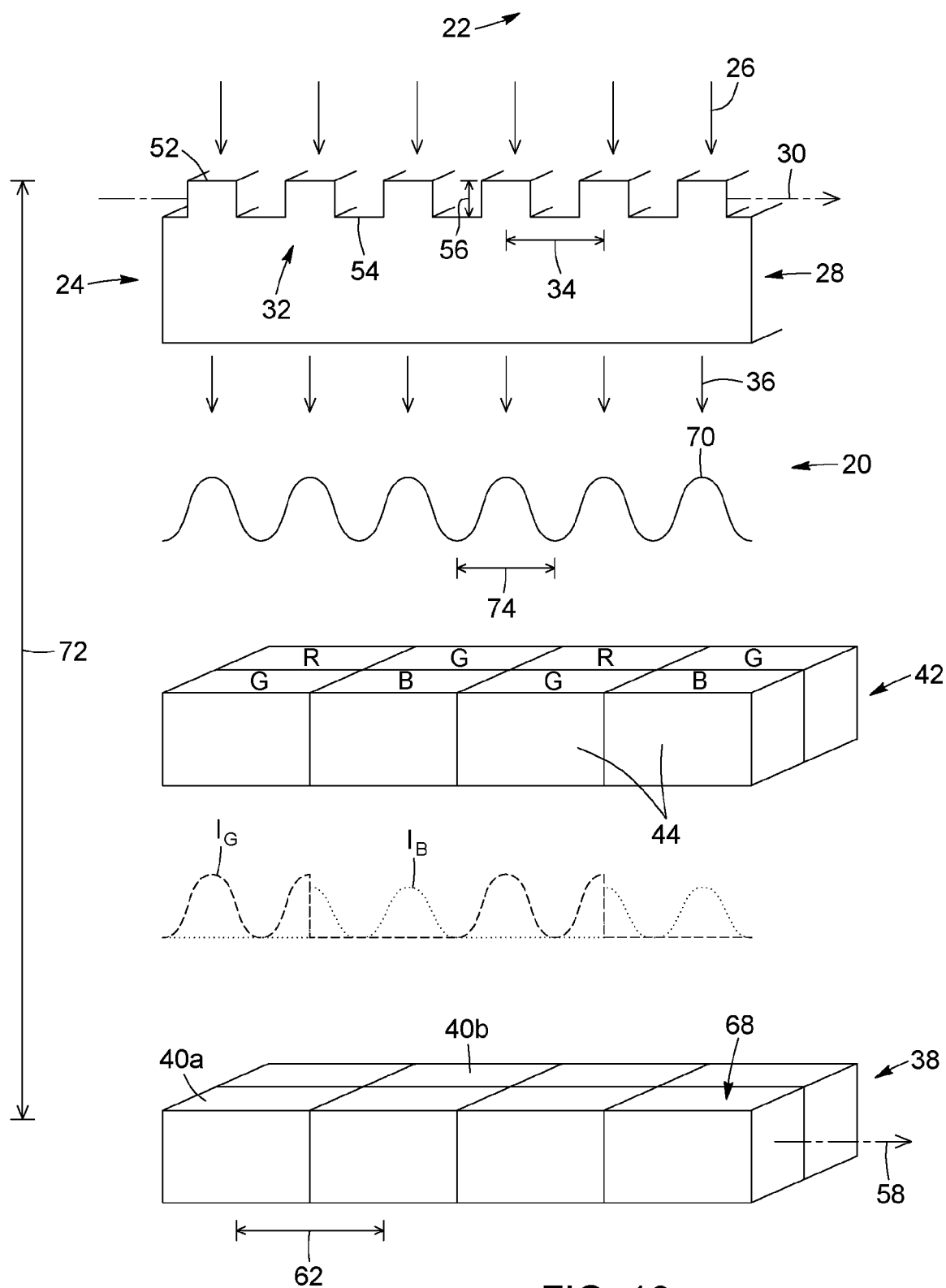
FIG. 10 is a schematic partially exploded side view of a light field imaging device, in accordance with another possible embodiment, where the propagation of a wavefront of light through the device is schematically depicted. The light field imaging device of FIG. 10 is suitable for color imaging applications.

Referring to FIG. 10, there is shown a schematic partially exploded side view of an embodiment of a light field imaging device 20 suitable for color imaging applications. The light field imaging device 20 shares similarities with the one shown in FIGS. 1 and 2, in that it includes a diffraction grating assembly 24 including a diffraction grating 28 disposed on top of a color filter array 42, which is itself disposed on top of a pixel array 38 of light-sensitive pixels 40. For illustrative purposes, the diffraction grating 28 is a binary phase transmission grating having a duty cycle of 50% and a periodic refractive index modulation pattern 32 consisting of alternating sets of ridges 52 and grooves 54, and the color filter array 42 has a Bayer pattern. The Bayer pattern alternates rows of alternating green (G) and blue (B) filters with rows of alternating red (R) and green (G) filters, one of each row being depicted in FIG. 10.

FIG. 10 schematically depicts the propagation of light through the device 20. In operation, the diffraction grating 28 receives an optical wavefront 26 originating from a scene 22 on its input side, and diffracts the optical wavefront 26 to generate, on its output side, a diffracted wavefront 36 that propagates toward the color filter array 42. For simplicity, it is assumed that the diffraction grating 28 of FIG. 10 is achromatic in the spectral range encompassing green and blue light. The color filter array 42 is configured to receive and spatio-spectrally filter the diffracted wavefront 36 prior to its detection by the underlying pixel array 38. The operation of the light field imaging device 20 is therefore based on a directly spatio-and-chromatically sampled diffracted wavefront 36 enabled by the provision of a periodic diffraction grating 28 provided on top of a sensor structure including a color filter array 42 and an underlying pixel array 38.

As in FIG. 7, the diffracted wavefront 36 produced by the diffraction grating 28 in FIG. 10 is characterized by a Talbot-like near-field intensity pattern 70 that is spatially modulated according to the grating period 34 and that shifts laterally along the grating axis 30 as a function of an angle of incidence of the incident optical wavefront 26. Also, as in FIG. 7, the diffraction grating 28 and the pixel array 38 are positioned relative to each other so as to detect these Talbot-like, near-field intensity patterns formed at observation planes away from integer multiples of the half-Talbot distance, for example, at observation planes located at $z_T/4$ or $3z_T/4$. However, in contrast to the monochrome implementation of FIG. 7, in the color implementation of FIG. 10, the Talbot-like, near-field intensity pattern 70 detected by the pixel array 38 after having passed through the color filter array 42 will be a combination or superposition of the portions of the diffracted wavefront 36 filtered by the red filters, the portions filtered by the green filters, and the portions filtered by the blue filters. Accordingly, using a standard RGGB Bayer pattern as an example, the modulating component $I_{mod}$ and the base component $I_{base}$ of the intensity pattern I may be split into their respective color components as follows:

$$I_R \sim I_{mod,R}(\text{depth info}) \times I_{base,R}(\text{2D image}), \quad (5)$$

$$I_G \sim I_{mod,G}(\text{depth info}) \times I_{base,G}(\text{2D image}), \quad (6)$$

$$I_B \sim I_{mod,B}(\text{depth info}) \times I_{base,B}(\text{2D image}), \quad (7)$$

In FIG. 10, the intensity patterns for $I_G$ and $I_B$ are depicted in dashed and dotted lines, respectively.

As in FIG. 7, the ratio p/g in FIG. 10 is equal to 3/2. Thus, the pixel array 38 in FIG. 10 includes pair of adjacent pixels 40 having different angle-sensitive pixel responses as a function of the angle of incidence, from which depth information about the scene 22 may be derived. However, due to the filtering action performed by the color filter array 42, the computation of summed and differential pixel responses such as described may be performed using pixel responses from adjacent pixels disposed under identical color filters to provide more meaningful information. In this regard, in a standard RGGB Bayer pattern, because green filters are present in all pixel banks, the signal $I_G$, which is associated with the more densely sampled green components, will contain pixel responses from pixels in adjacent pixel banks. This is, in a standard RGGB Bayer pattern, the angle-dependent pixel responses of pairs of nearest-neighbor green pixels disposed in adjacent pixel banks (e.g., pixels 40a and 40b in FIG. 10) may be used to compute sets of summed and differential pixel responses as described above. In contrast, the signals $I_R$ and $I_B$, which are associated with the more sparsely sampled red and blue components, are not measured in all pixel banks, may not be readily used to compute such sets of summed and differential pixel responses. However, they may be used to refine the depth information extracted from the signal $I_G$. More detail in this regard are provided in co-assigned international patent application PCT/CA2018/051554, published as WO 2019/109182 A1, the contents of which are incorporated herein by reference in their entirety.

Figure 11A:
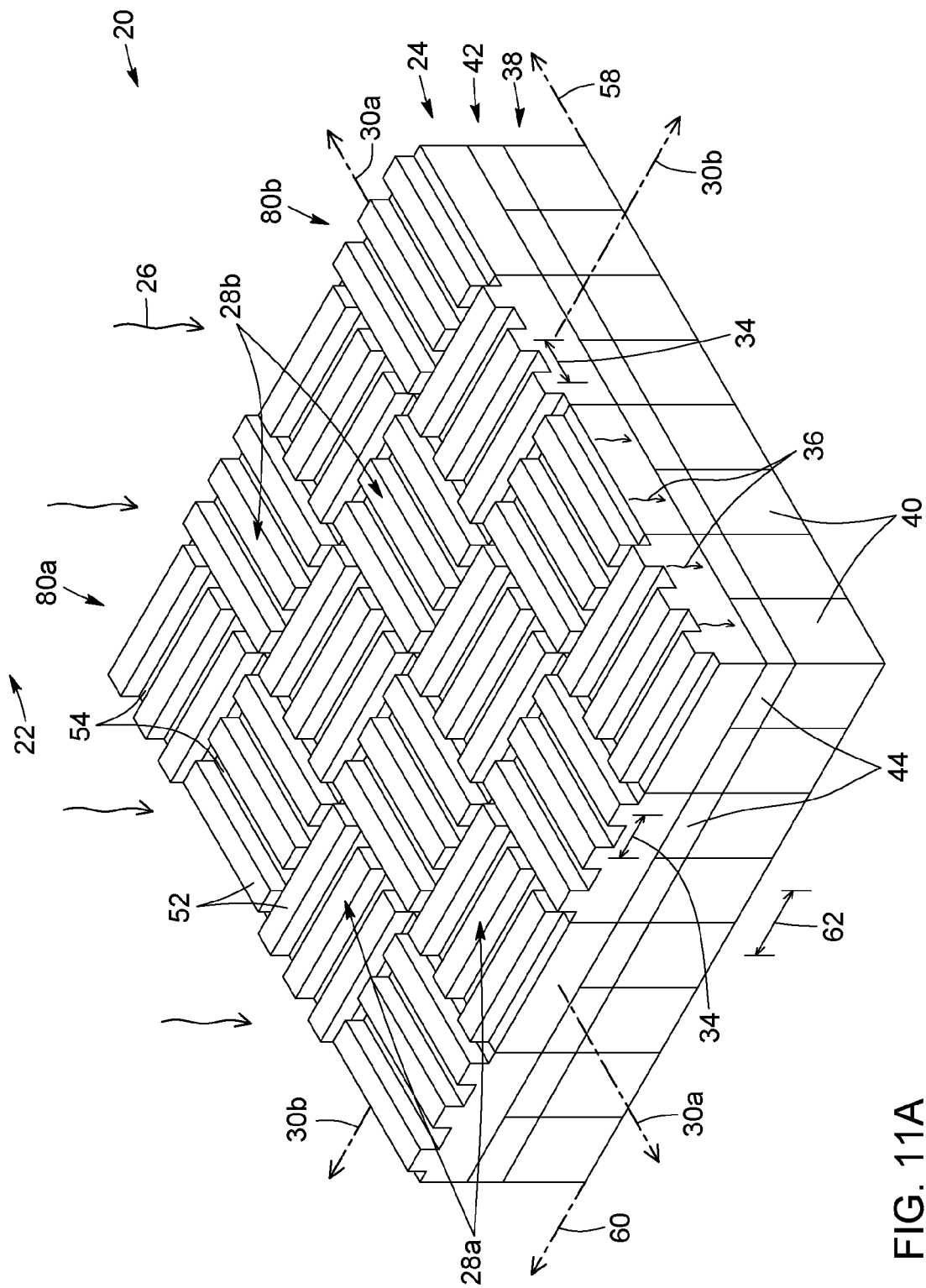
FIG. 11A is a schematic perspective view of a light field imaging device, in accordance with another possible embodiment, where the diffraction grating assembly includes two sets of orthogonally oriented diffraction gratings arranged to alternate in both rows and columns to define a checkerboard pattern.

In the embodiments described so far, the diffraction grating assembly was depicted as including a single diffraction grating. Referring now to FIG. 11A, in other implementations, the diffraction grating assembly 24 may include a plurality of diffraction gratings 28a, 28b arranged in a 2D grating array disposed over the color filter array 42 (or the pixel array 38 in the case of monochrome applications). In FIG. 11A, the diffraction grating assembly 24 includes sixteen diffraction gratings 28a, 28b, each of which including three grating periods overlying a corresponding 2×2 block of light-sensitive pixels 40. However, these numbers are provided for illustrative purposes and may be varied in other embodiments. For example, in some implementations, each diffraction grating may overlie a block of 4×4 or 6×6 pixels. It is appreciated that, in general, the number of diffraction gratings in the diffraction grating assembly may range from one to up to millions, while the number grating periods in each diffraction grating may range from two to ten. Stated otherwise, the number of pixels associated with one diffraction grating may range from a block of 2×2 pixels to the entire pixel array.

The plurality of diffraction gratings 28 may include multiple sets 80a, 80b of diffraction gratings 28a, 28b, where the grating axes 30a, 30b of the diffraction gratings 28a, 28b of different ones of the sets 80a, 80b have different orientations. For example, in the embodiment of FIG. 11A, the multiple sets consist of a first set 80a of diffraction gratings 28a and a second set 80b of diffraction gratings 28b, where the grating axes 30a of the diffraction gratings 28a of the first set 80a extend perpendicularly to the grating axes 30b of the diffraction gratings 28b of the second set 80b. In particular, the first grating axes 30a may be parallel to the first pixel axis 58, while the second grating axes 30b may be parallel to the second pixel axis 60. In the illustrated embodiment, the diffraction gratings 28a, 28b of the first set 80a and second set 80b are arranged to alternate in both rows and columns, defining a checkerboard pattern. Of course, any other suitable regular or irregular arrangements of orthogonally or non-orthogonally oriented gratings may be used in other embodiments. For example, in some variants, the orthogonally oriented gratings could be arranged to alternate only in rows or only in columns, or be arranged randomly. Other variants may include more than two sets of diffraction gratings, which may or may not be orthogonal with respect to one another.

It is to be noted that besides having orthogonal grating axis orientations, the two sets 80a, 80b of diffraction gratings 28a, 28b depicted in the embodiment of FIG. 11A are identical. That is, they are all binary phase gratings made of alternating sets of parallel ridges 52 and grooves 54 having the same duty cycle, grating period, and number of gratings period. However, in other embodiments, each of these parameters may be varied among the different gratings, that is, the diffraction gratings need not all be identical. For example, in some embodiments, the diffraction grating assembly 24 may include diffraction gratings 28 sharing a common grating orientation but otherwise having grating parameters that are not all identical. In general, the diffraction grating assembly 24 may be provided as a grating tile made up of many grating types, each grating type being characterized by a particular set of grating parameters. Non-limiting examples of such grating parameters include the grating orientation, the grating period, the duty cycle, the number of grating periods, the lateral offset with respect to the underlying pixels and/or color filters, and the like.

It is appreciated that providing a diffraction grating assembly with diffraction gratings having different grating axis orientations may be advantageous or required in some implementations, since diffraction occurs along the grating axis of an individual diffraction grating. This means that when the diffraction grating assembly includes a single grating orientation, light coming from objects of the scene that extend perpendicularly to this single grating orientation will generally not produce a diffracted wavefront from which depth angular information may be extracted. In some implementations, providing two sets of orthogonally oriented gratings (e.g., horizontally and vertically oriented gratings, such as in FIG. 11A) may suffice to capture enough light field image data about the scene. The concept of using diffraction grating assemblies with two or more grating orientations may be taken to the limit of completely circular diffraction gratings having increasing periodicity radially form the center, which would provide a near perfect Fourier plane imager.

Figure 11B:
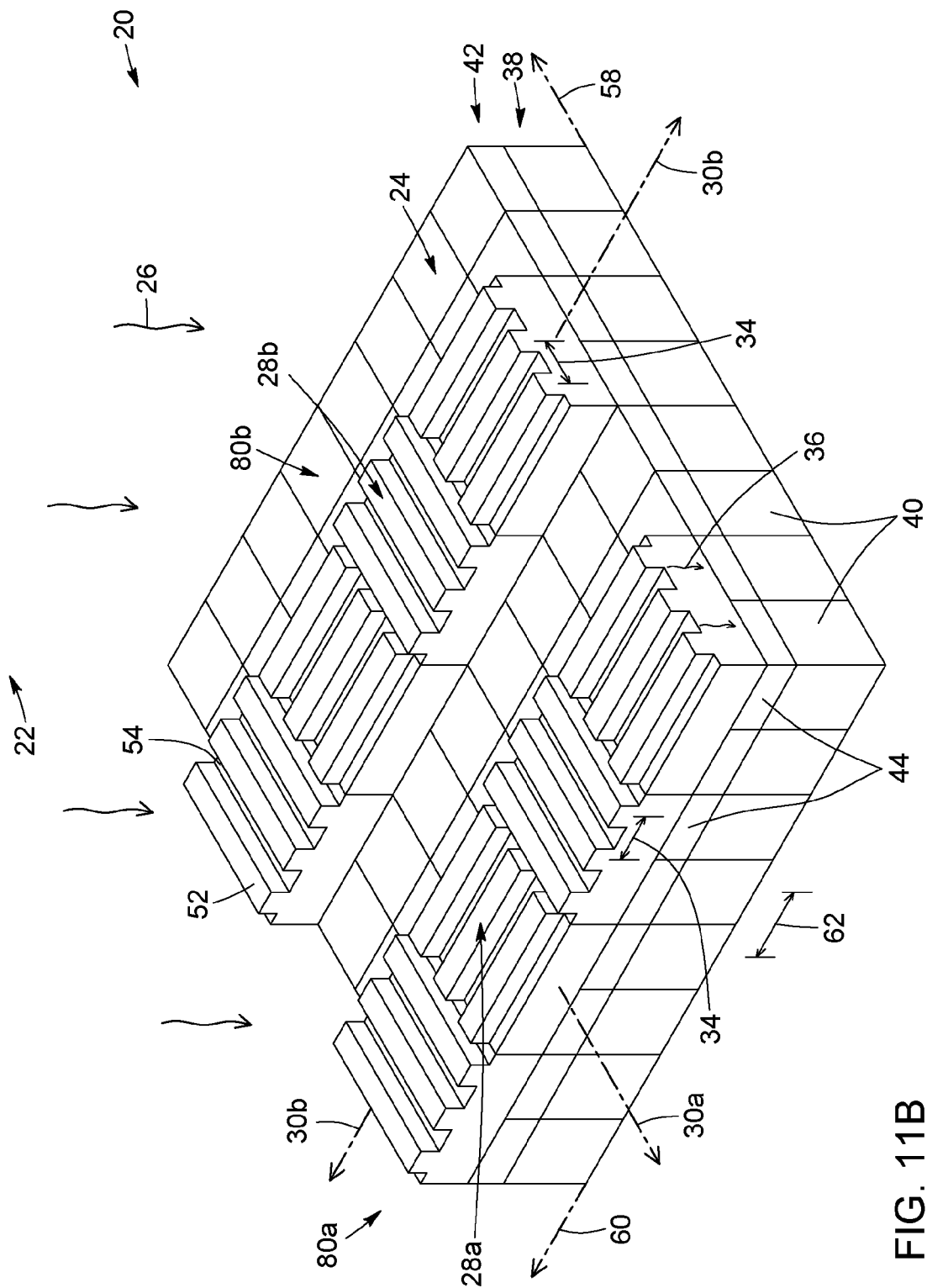
FIG. 11B is a schematic perspective view of a light field imaging device, in accordance with another possible embodiment, where the diffraction grating assembly includes two sets of orthogonally oriented diffraction gratings and covers only a portion of the pixel array.

It is also appreciated that in the embodiment depicted in FIG. 11A, the diffraction grating assembly 24 extends over the entire pixel array 38 such that all of the pixels 40 detect diffracted light having passed through one of the diffraction gratings 28. However, in other embodiments, the diffraction grating assembly may overlie only a portion of the pixel array such that only a subset of the pixels detects diffracted light. By way of example, this may be achieved by removing, in FIG. 11A, half of the diffraction gratings 28a from the first set 80a and/or half of the diffraction gratings 28b from the second set 80*b*, as depicted in FIG. 11B. Such implementations may be advantageous to reduce the amount light field data to be processed and the associated computational weight and time.

Figure 12A:
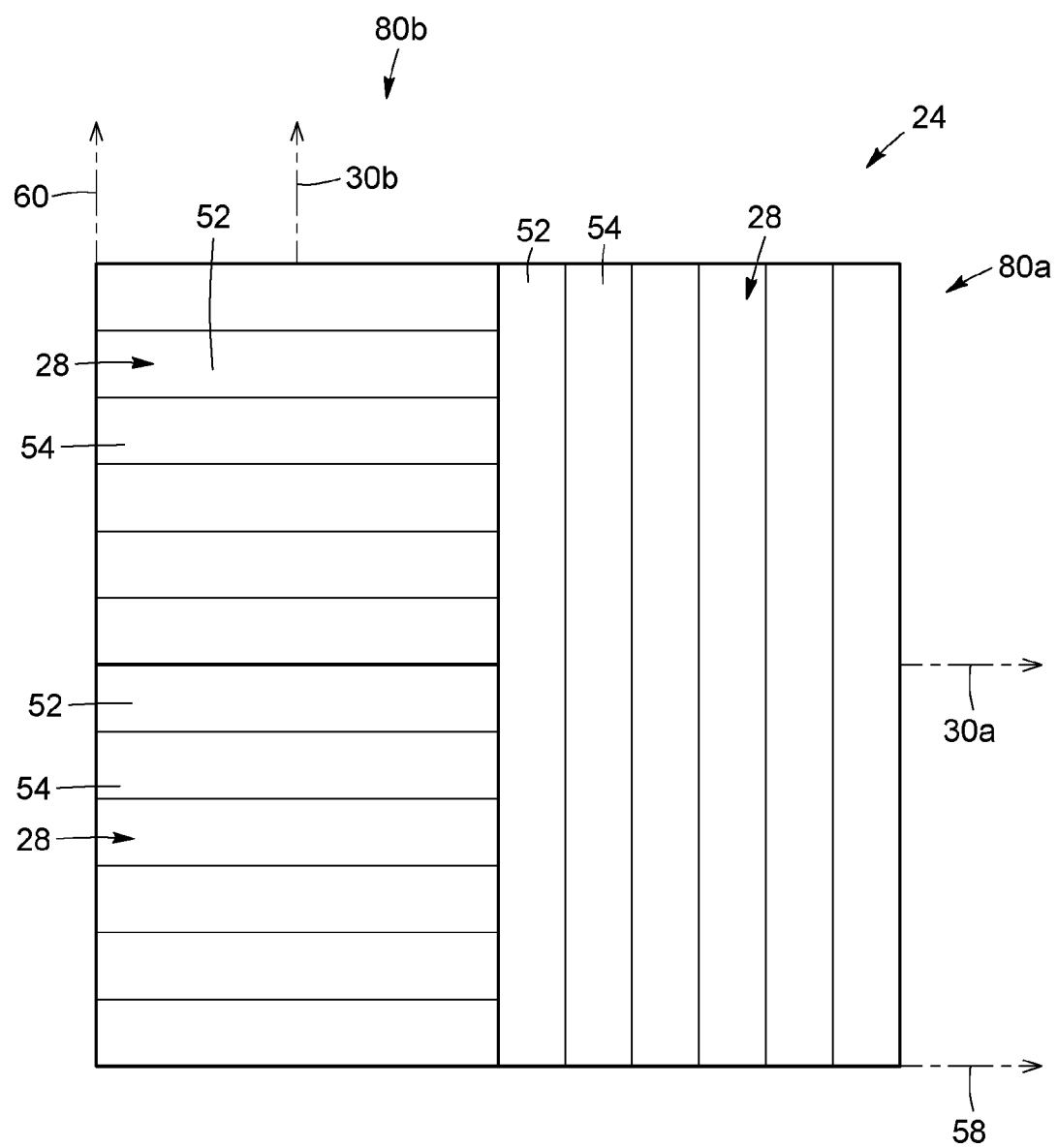
FIGS. 12A to 12C illustrate alternative embodiments of diffraction grating assemblies including a plurality of diffraction gratings arranged in a two-dimensional array.
Figure 12B:
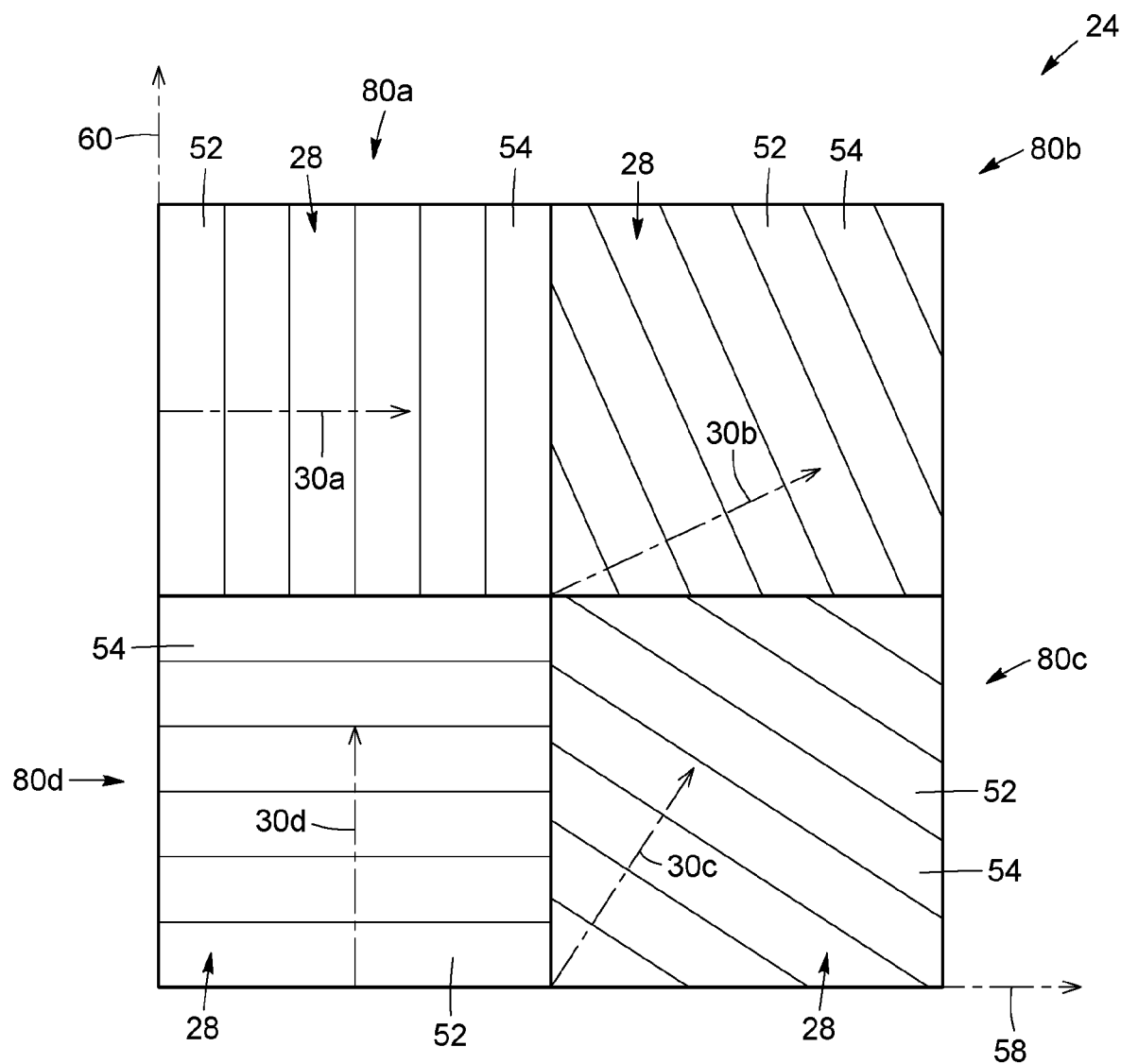
Figure 12C:
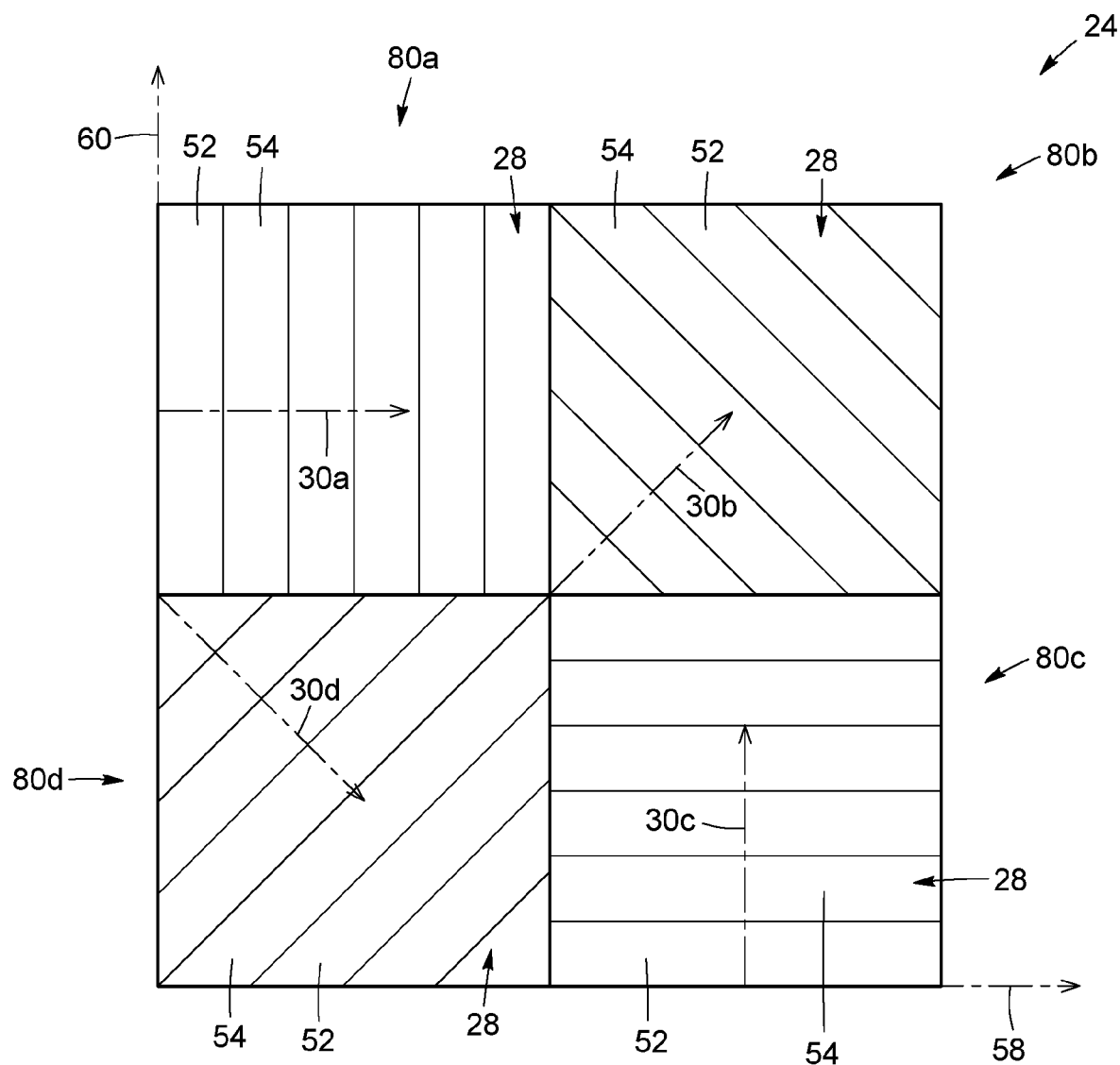

Referring to FIGS. 12A to 12C, there are illustrated other examples of grating arrangements of diffraction grating assemblies 24 including a plurality of diffraction gratings. In FIG. 12A, the diffraction grating assembly 24 includes two sets 80*a*, 80*b* of orthogonally oriented diffraction gratings 28 that alternate only in columns. The grating axis orientation of one set 80*a* is along one pixel axis 58, and the grating axis orientation of the other set 80*b* is along the other pixel axis 60. In FIG. 12B, the diffraction grating assembly 24 includes four sets 80*a* to 80*d* of diffraction gratings 28 whose grating axes 30*a* to 30*d* are oriented at 0°, 33°, 66° and 90° with respect to the horizontal pixel axis 58. In FIG. 12C, the diffraction grating assembly 24 includes four sets 80*a* to 80*d* of diffraction gratings 28 whose grating axes 30*a* to 30*d* are oriented at 0°, 45°, 90° and −45° with respect to the horizontal pixel axis 58. It will be understood that in each of FIGS. 12A to 12C, the depicted diffraction gratings 28 may represent a unit cell of the diffraction grating assembly 24, which is repeated a plurality of times.

Figure 13:
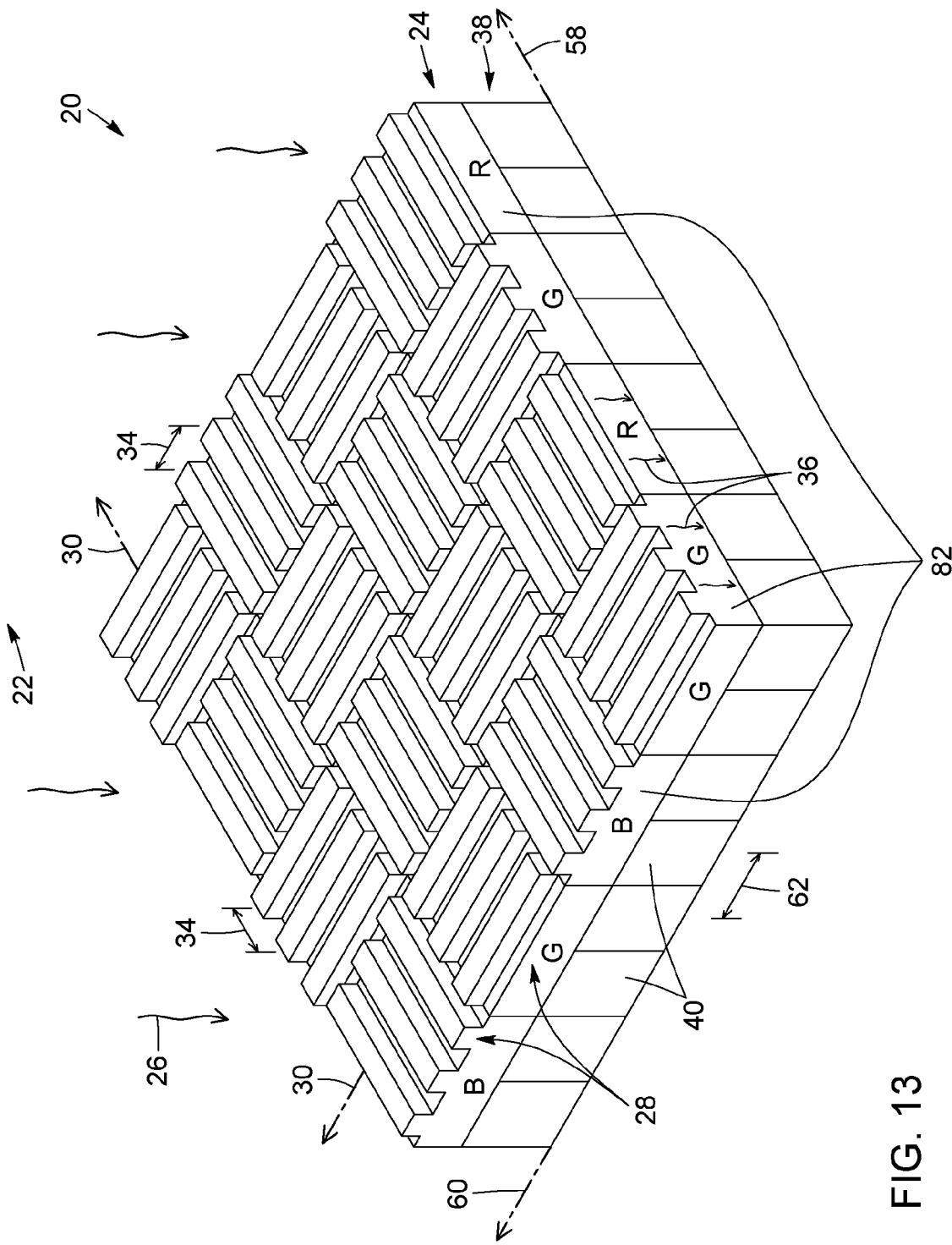
FIG. 13 is a schematic perspective view of a light field imaging device, in accordance with another possible embodiment, where the diffraction grating assembly includes a plurality of diffraction gratings forming an array of color filters, each color filter being embodied by a respective one of the diffraction gratings.

Referring to FIG. 13, there is illustrated an embodiment of a light field imaging device 20 suitable for color-based applications, but without a color filter array interposed between the diffraction grating assembly 24 and the underlying pixel array 38. Rather, in this embodiment, the diffraction grating assembly 24 includes an array of diffraction gratings 28, in which each diffraction grating 28 includes a grating substrate 46 having a refractive index modulation pattern 32 formed thereon (e.g., made of alternating series of ridges 52 and grooves 54). The grating substrate 46 of each diffraction grating 28 also includes a spectral filter material or region 82 configured to spectrally filter the diffracted wavefront 36 prior to its detection by the plurality of light-sensitive pixels 40. In some implementations, each one of the diffraction grating 28 may be made of a material tailored to filter a desired spectral component, for example, by incorporating a suitable dye dopant in the grating substrate 46.

In FIG. 13, the diffraction grating assembly 24 provides not only a diffractive structure, but also a color filter array in which each color filter is embodied by a corresponding one of the diffraction gratings 28. In other words, each diffraction grating 28 may be individually designed and tailored to form a corresponding color filter of the color filter array. In FIG. 13, the color filter array formed by the plurality of diffraction gratings 28 is arranged in a Bayer pattern such that the grating substrate 46 of each diffraction grating 28 acts as a red (R) filter, a green (G) filter or a blue (B) filter. Of course, the color filter array defined by the diffraction grating assembly 24 may be operated outside the visible region of the electromagnetic spectrum and its mosaic color pattern is not limited to Bayer-type patterns, but may be applied to any appropriate mosaic color pattern, including those listed above.

In some implementations, the light field imaging device may include wavefront conditioning optics in front of the diffraction grating. The wavefront conditioning optics may be configured to collect, direct, transmit, reflect, refract, disperse, diffract, collimate, focus or otherwise act on the optical wavefront incident from the scene prior to it reaching the diffraction grating assembly. The wavefront conditioning optics may include lenses, mirrors, filters, optical fibers, and any other suitable reflective, refractive and/or diffractive optical components, and the like. In some implementations, the wavefront conditioning optics may include focusing optics positioned and configured to modify the incident wavefront in such a manner that it may be sampled by the light field imaging device.

Figure 14:
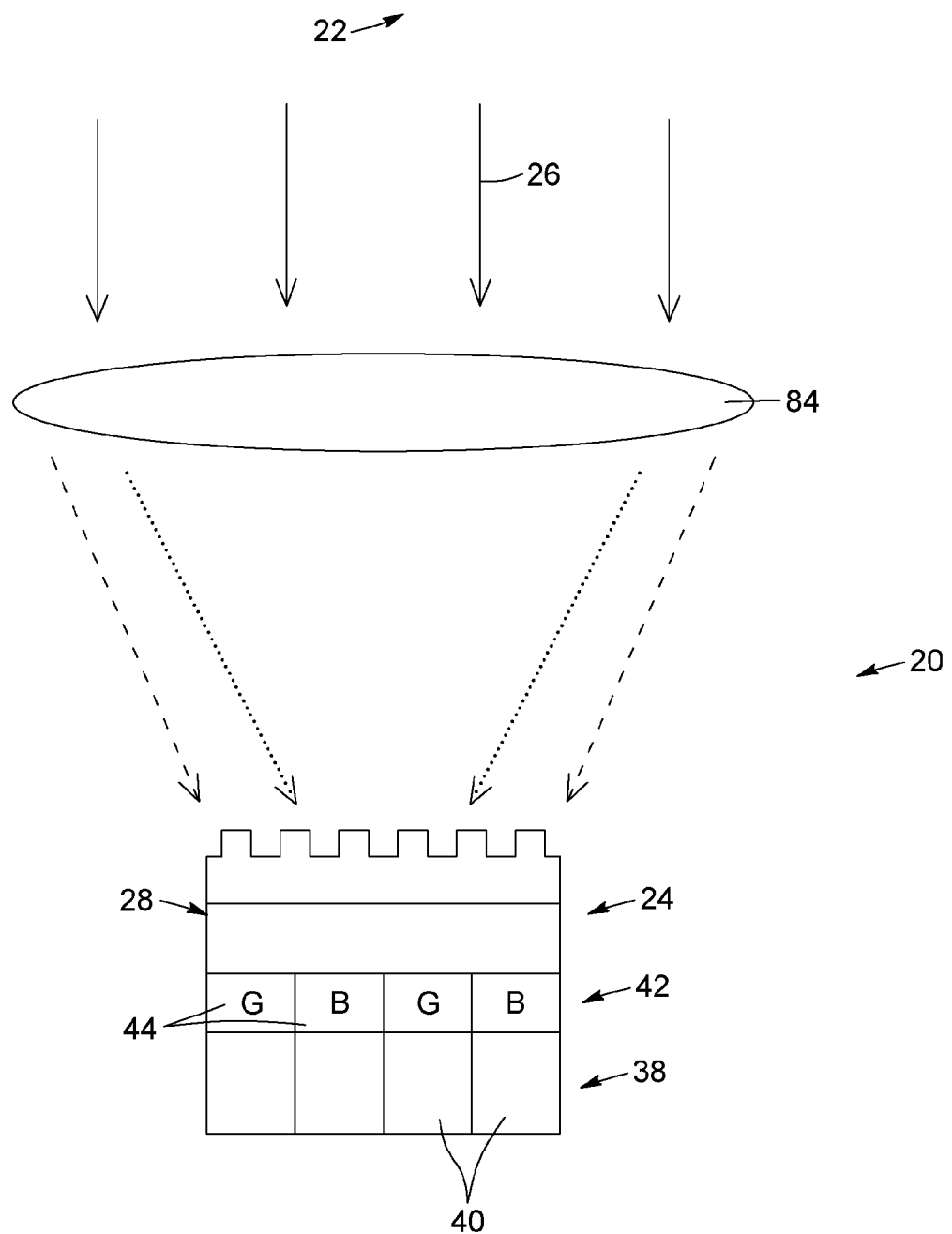
FIG. 14 is a schematic side view of a light field imaging device, in accordance with another possible embodiment, where the light field imaging device includes dispersive optics disposed in front of the diffraction grating assembly to spread an incident optical wavefront prior to it reaching the diffraction grating assembly.

Referring to FIG. 14, another possible embodiment of a light field imaging device 20 is illustrated and includes dispersive optics 84 disposed in a light path of the optical wavefront 26 between the scene 22 and the diffraction grating assembly 24. The dispersive optics 84 is configured to receive and disperse the incoming optical wavefront 26. The dispersive optics 84 may be embodied by any optical component or combination of optical components in which electromagnetic beams are subject to spatial spreading as a function of wavelength as they pass therethrough (e.g., by chromatic aberration). In the embodiment of FIG. 14, the dispersive optics 84 is a focusing lens, for simplicity. However, it will be understood that, in other embodiments, the dispersive optics 84 may be provided as an optical stack including a larger number of optical components (e.g., focusing and defocusing optics) that together act to disperse the optical wavefront 26 before it impinges on the diffraction grating assembly 24 (e.g., due to their intrinsic chromatic aberration).

For exemplary purposes, the incident optical wavefront 26 in FIG. 14 is assumed to be a superposition of waves containing multiple wavelengths of light, for example, a green component (dashed line) and a blue component (dotted line). Each color components of the optical wavefront 26, by the nature of its energy-dependent interaction with the dispersive optics 84, will follow a slightly different optical path, leading to a chromatic dependence in the phase-shift introduced by the diffraction grating 28. As a result, the wavefront spread of the incident optical wavefront 26, as sampled through the angle-dependent diffraction produced by the diffractive grating 28, can provide depth information about the scene 22 from which originates the optical wavefront 26. Non-limiting examples of techniques for processing such depth information and generating therefrom a depth map of a scene are disclosed in co-assigned international patent application PCT/CA2018/051554, published as WO 2019/109182 A1, the contents of which are incorporated herein by reference in their entirety.

In the case of monochromatic plane optical wavefront impinging on a focusing lens such as shown in FIG. 14, the focusing lens gradually refracts and focuses the wavefront as it traverses the lens. It is appreciated that the cross-sectional area of the wavefront reaching the diffraction grating assembly will be larger if the diffraction grating assembly is located out (either before or after) of the focal plane of the focusing lens that if it is located in the focal plane. Accordingly, the diffracted wavefront will be sampled by a greater number of light-sensitive pixels in the out-of-focus than in the in-focus configuration.

Figure 15:
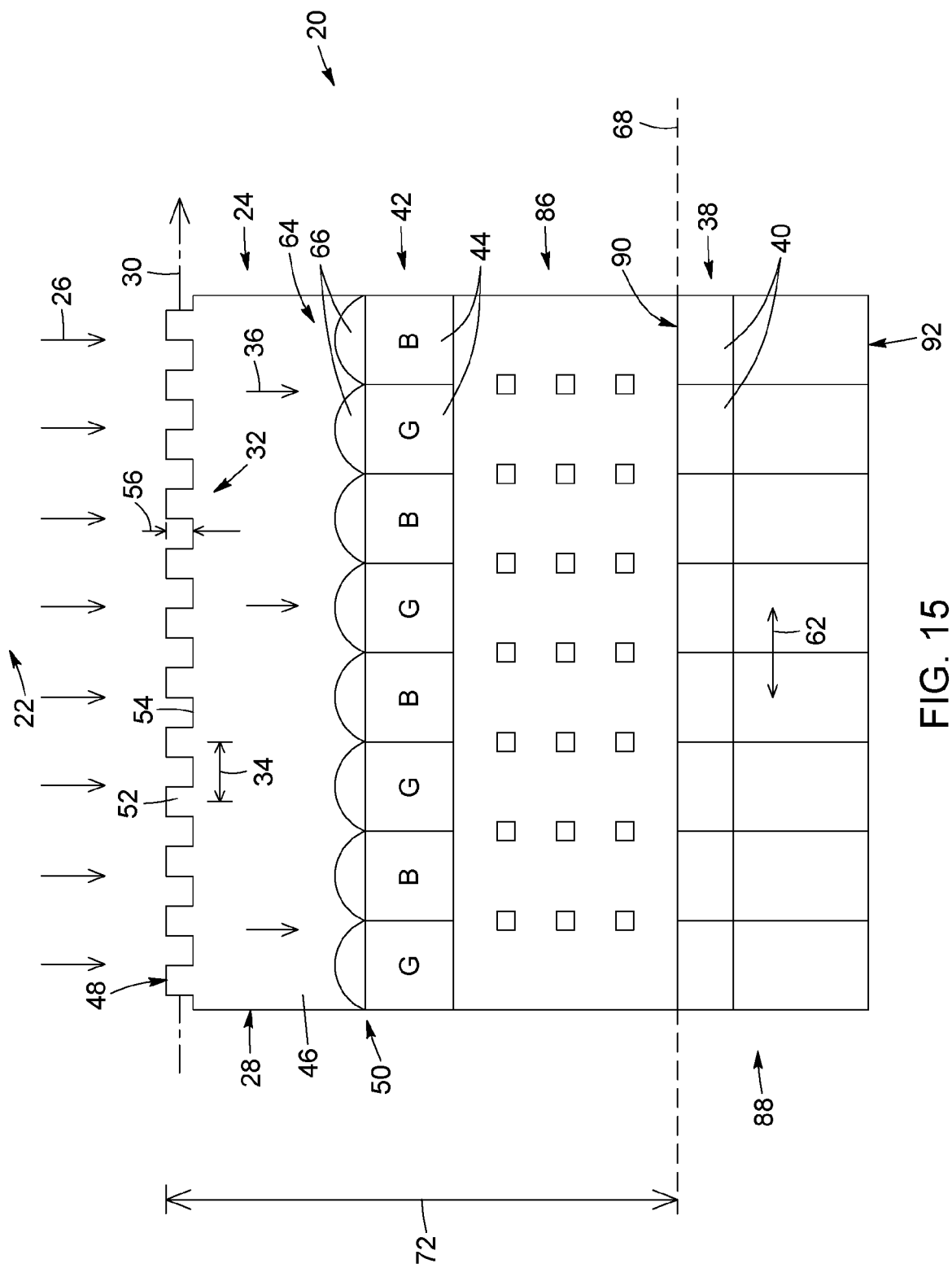
FIG. 15 is a schematic side view of a light field imaging device in a frontside illumination configuration, in accordance with another possible embodiment.
Figure 16:
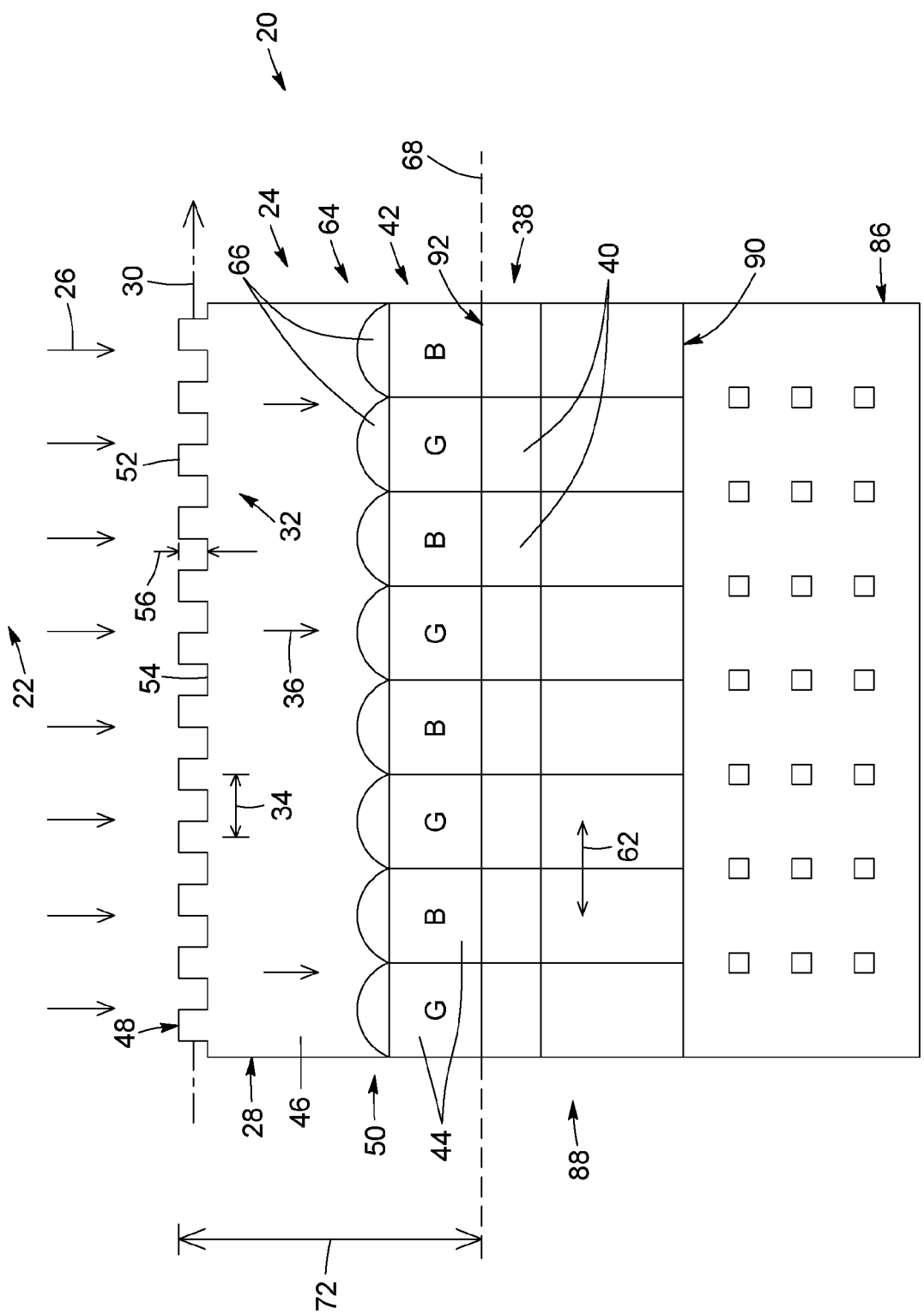
FIG. 16 is a schematic side view of a light field imaging device in a backside illumination configuration, in accordance with another possible embodiment.

Referring now to FIGS. 15 and 16, in some implementations, the light field imaging device 20 may include pixel array circuitry 86 (e.g., a silicon layer hosting a plurality of metal interconnect layers) disposed either between the color filter array 42 and the pixel array 38, in a frontside illumination configuration (FIG. 15), or under the pixel array 38, in a backside illumination configuration (FIG. 16).

Referring to FIG. 15, in frontside illumination technology, light 26 is incident on the device 20 from the front and has to pass through the metal wiring of the pixel array circuitry 86 to reach the pixels 40. The device 20 of FIG. 15 includes a substrate 88 having a front side 90 and a back side 92; a diffraction grating assembly 24 disposed on the front side 90 and configured to receive an optical wavefront 26 incident from a scene 22 and produce a diffracted wavefront 36; a pixel array 38 formed in the substrate 88 to detect the diffracted wavefront 36; and pixel array circuitry 86 coupled to the pixel array 38 and disposed on the front side 90 between the diffraction grating assembly 24 and the pixel array 38. In color imaging applications, the frontside-illuminated light field imaging device 20 may include a color filter array 42 disposed between the diffraction grating assembly 24 and the pixel circuitry 86 and including a plurality of color filters 44 arranged in a mosaic color pattern, for example, a Bayer pattern. The color filter array 42 spatially and spectrally filters the diffracted wavefront 36 according to the mosaic color pattern prior to its detection by the plurality of light-sensitive pixels 40. The device 20 also includes a microlens array 64 disposed over the color filter array 42 and including a plurality of microlenses 66, each of which being optically coupled to a corresponding one of the plurality of the color filters 44. Although not illustrated in FIG. 15, some frontside-illuminated devices may include light guides extending through the pixel array circuitry 86 to deliver diffracted light to the pixels 40. Providing such light guides may reduce optical losses associated with reflection or absorption by the pixel array circuitry 86 and reduce the effective optical stack height (e.g., by raising the effective light-receiving surface 68 to the input surface of the light guides).

Referring to FIG. 16, in backside illumination technology, light 26 is incident on the device 20 from the back and does not pass through the pixel array circuity 86 on its way to the pixels 40. The device 20 of FIG. 16 includes a substrate 88 having a front side 90 and a back side 92; a diffraction grating assembly 24 disposed on the back side 92 and configured to receive an optical wavefront 26 incident from a scene 22 and produce a diffracted wavefront 36; a pixel array 38 formed in the substrate 88 from the back side 92 to detect the diffracted wavefront 36; and pixel array circuitry 86 disposed on the front side 90 and coupled to the pixel array 38. In color imaging applications, the backside-illuminated light field imaging device 20 may include a color filter array 42 disposed on the back side 92, between the diffraction grating assembly 24 and the pixel array 38, and including a plurality of color filters 44 arranged in a mosaic color pattern, for example, a Bayer pattern. The color filter array 42 spatially and spectrally filters the diffracted wavefront 36 according to the mosaic color pattern prior to its detection by the plurality of light-sensitive pixels 40. The device 20 also includes a microlens array 64 disposed over the color filter array 42 and including a plurality of microlenses 66, each of which being optically coupled to a corresponding one of the plurality of the color filters 44.

In both FIGS. 15 and 16, and as described above, the diffraction grating assembly 24 includes at least one diffraction grating 28 having a grating axis 30 and a refractive index modulation pattern 32 with a grating period 34 along the grating axis 30. The diffraction grating 28 is configured to diffract the optical wavefront 26 and to generate, in a near-field regime, a diffracted wavefront 36. As described above, the diffracted wavefront 36 has an intensity pattern that is spatially modulated according to the grating period 34 and that shifts laterally along the grating axis 30 as a function of an angle of incidence of the optical wavefront 26. Furthermore, the diffraction grating 28 also includes a grating substrate 46 including a top surface 48 having the refractive index modulation pattern 32 formed thereon and a bottom surface 50 disposed over the microlens array 64.

Referring still to both FIGS. 15 and 16, the pixel array 38 includes a plurality of light-sensitive pixels 40 and is configured to detect, in the near-field regime, the diffracted wavefront as light field image data. The pixel array 38 includes a plurality of light-sensitive pixels 40 and a pixel pitch 62 along the grating axis 30 that is equal to or larger than the grating period 34. Each light-sensitive pixel 40 samples a respective portion of the diffracted wavefront 36 and generates therefrom a corresponding pixel response. The plurality of light-sensitive pixels 40 includes angle-sensitive groups or pairs of adjacent pixels, where the adjacent pixels in each group or pair have different pixel responses as a function of the angle of incidence of the optical wavefront 26.

It is to be noted that the diffraction grating assembly 24, the pixel array 38, the color filter array 42 and the microlens array 64 of the frontside-illuminated light field imaging device 20 of FIG. 15 and the backside-illuminated light field imaging device 20 of FIG. 16 may share similar features to those described above. As such, these similar features need not be described again in the context of FIGS. 15 and 16. It is also to be noted that stacked-architecture devices are often employed in situations where sensor footprint is an issue (e.g., smartphone modules, tablets, webcams) and are becoming increasingly complex in design. In some implementations, the present techniques involve positioning a diffraction grating assembly directly on top of an existing sensor architecture as an independent process. Therefore, using the present techniques with stacked sensor technology may represent a flexible opportunity for sensor-level depth sensing optics, which may not require a complete sensor or packaging redesign as is typically the case for microlens or coded aperture approaches. Furthermore, the generally modest z-stack increase of the order of micrometers resulting from the integration of the diffraction grating assembly on top of the sensor may similarly simplify packaging requirements and implementation in the overall optical stack of the sensor module.

Diffraction Grating Assembly Implementations

Figure 17:
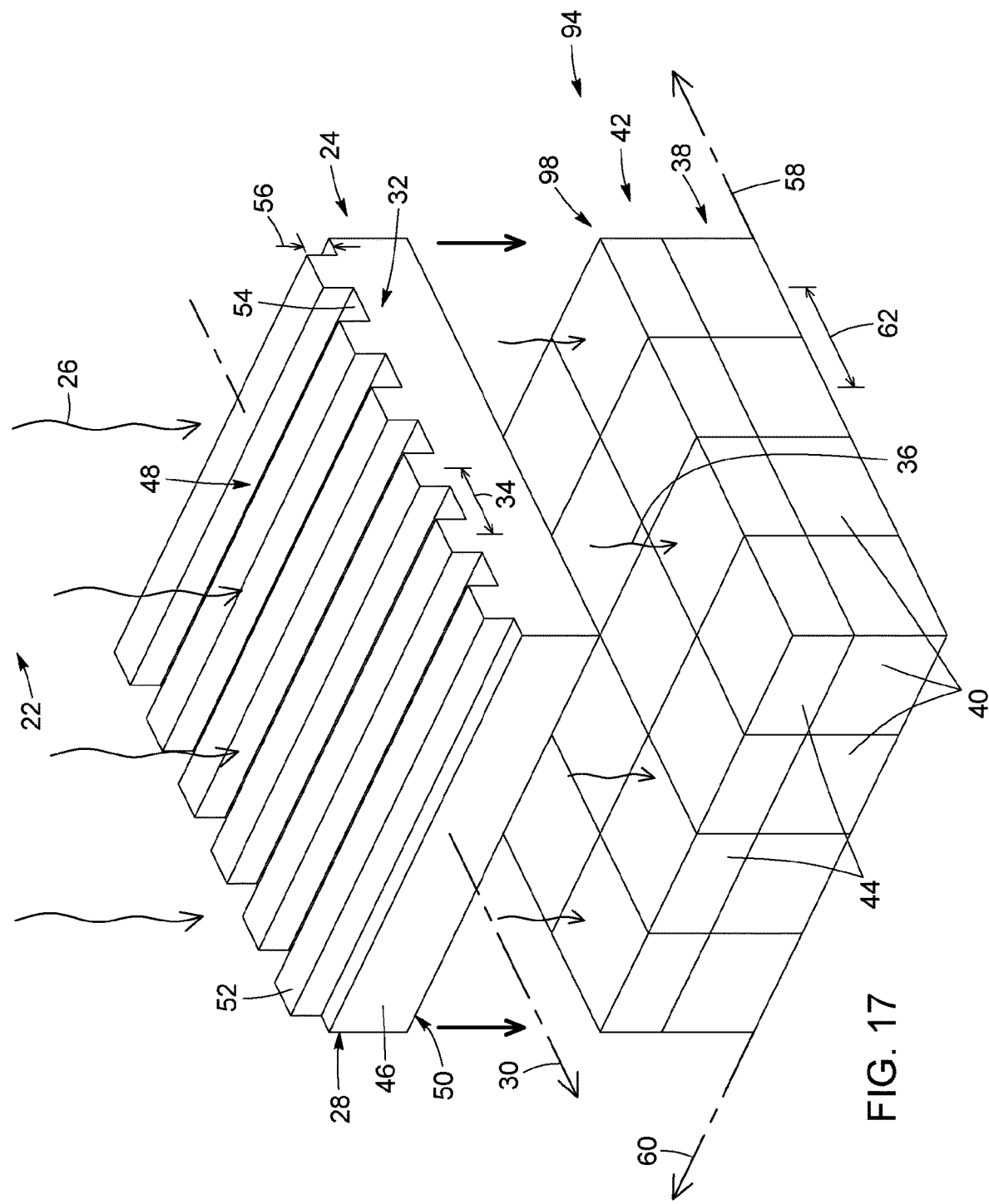
FIG. 17 is a schematic perspective view of a diffraction grating assembly for use in an image sensor including a pixel array having a plurality of light-sensitive pixels to capture light field image data about a scene, in accordance with a possible embodiment.

Referring to FIG. 17, in accordance with another aspect, the present description also relates to a diffraction grating assembly 24 for use with an image sensor 94 including a pixel array 38 having a plurality of light-sensitive pixels 40 to capture light field image data about a scene 22. The diffraction grating assembly 24, which is configured to be disposed over the pixel array 38 of the image sensor 94, may share many similarities with those described above in the context of light field imaging device implementations, insofar as it includes one or more diffraction gratings 28, each of which having a grating axis 30 and a refractive index modulation pattern 32 having a grating period 34 along the grating axis 30, the grating period 34 being equal to or smaller than a pixel pitch 62 along the grating axis 30. As noted above, depending on the application, the ratio of the pixel pitch 62 to the grating period 34 may take various values.

The diffraction grating 28 may be a binary phase grating and the refractive index modulation pattern 32 may include alternating ridges 52 and grooves 54. The diffraction grating 28 is configured to diffract an optical wavefront 26 incident from the scene 22 and generate, in a near-field diffraction region or plane 98, a diffracted wavefront 36 having an intensity pattern that is spatially modulated according to the grating period 34 and that shifts laterally along the grating axis 30 as a function of an angle of incidence of the optical wavefront 26. The diffraction grating assembly 24 is configured to be disposed over the pixel array 38 with the light-sensitive pixels 40 positioned at the near-field diffraction region or plane 98 for detection of the diffracted wavefront 36 as light field image data. In order to enable the image sensor 94 to become sensitive to the angle of incidence of the optical wavefront 26 by disposing thereon the diffraction grating assembly 24 described herein, the light-sensitive pixels 40 include laterally adjacent pixels that generate different angle-dependent pixel responses as a function of angle of incidence.

In color imaging applications, the diffraction grating assembly 24 may be configured to be disposed over a color filter array 42 of the image sensor 94. As described above, the color filter array 42 is disposed over the pixel array 38 and configured to spatially and spectrally filter the diffracted wavefront 36 prior to its detection by the plurality of light-sensitive pixels 40.

Depending on the application, the diffraction grating assembly 24 may include a single diffraction grating 28 or a plurality of diffraction gratings 28 arranged in a 2D grating array or tile disposed over the pixel array 38, and, optionally, the color filter array 42.

Method Implementations

In accordance with another aspect, the present description also relates to various light field imaging methods, including a method of capturing light field image data about a scene and a method of providing 3D or light field imaging capabilities to a conventional 2D image sensor. These methods may be performed with light field imaging devices and diffraction grating assemblies such as those described above, or with other similar devices and assemblies.

Figure 18:
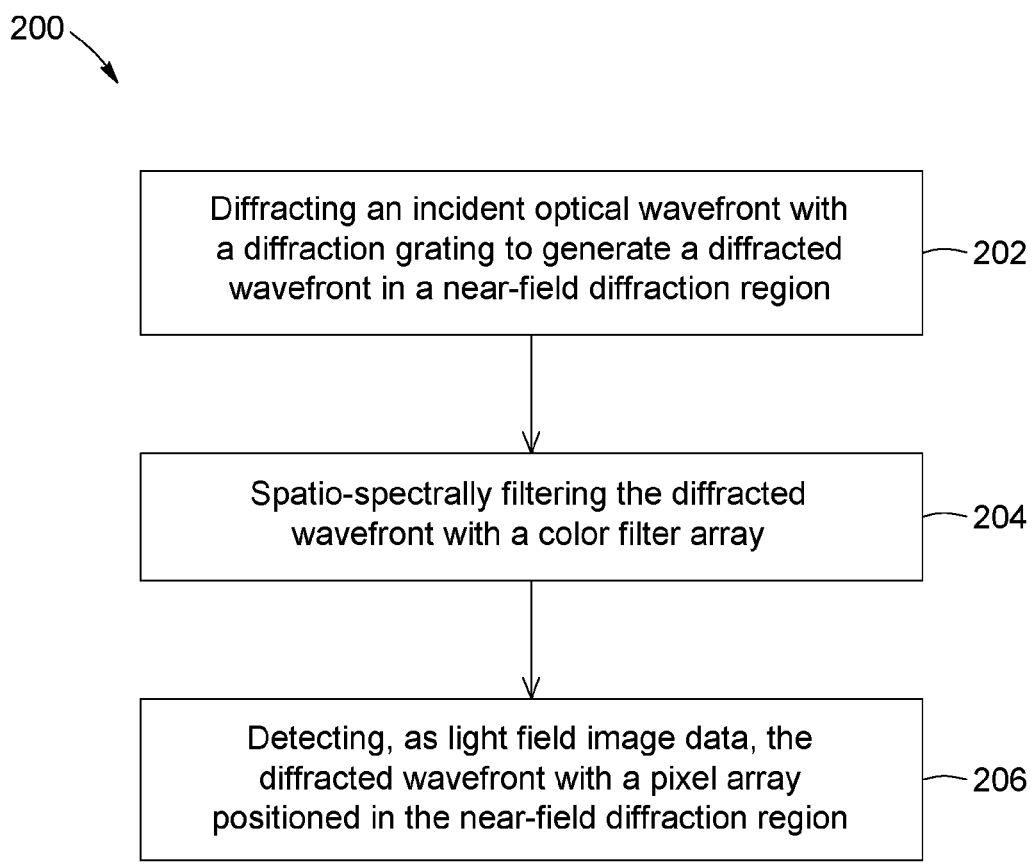
FIG. 18 is a flow diagram of a method of capturing light field image data about a scene, in accordance with a possible embodiment.

Referring to FIG. 18, there is provided a flow diagram of an embodiment of a method 200 of capturing light field image data about a scene. The method 200 may include a step 202 of diffracting an optical wavefront originating from the scene with a diffraction grating. The diffraction grating has a refractive index modulation pattern with a grating period along a grating axis. The diffraction grating is configured to diffract the incident optical wavefront to generate a diffracted wavefront. The diffracted wavefront may have, in a near-field diffraction plane, an intensity pattern that is spatially modulated according to the grating period and that shifts laterally along the grating axis as a function of an angle of incidence of the optical wavefront. In some implementations, the diffracting step 202 may include diffracting the optical wavefront in a waveband ranging from about 400 nm (blue end of visible spectrum) to about 1550 nm (telecommunication wavelengths), for example, from about 400 nm to about 650 nm. In some implementations, the diffraction grating is one of a plurality of diffraction gratings that together form a diffraction grating assembly. In such implementations, the method 200 of FIG. 18 may be performed simultaneously for each diffraction grating of the diffraction grating assembly. In some implementations, the method 200 may include a step of providing the diffraction grating as a phase grating, for example, a binary phase grating. The binary phase grating may include alternating ridges and grooves periodically spaced-apart at the grating period.

The method 200 may also include a step 204 of spatio-spectrally filtering the diffracted wavefront with a color filter array to produce a filtered wavefront. It is to be noted that this step 204 is optional and may be omitted in some implementations, for example, in monochrome imaging applications.

The method 200 may further include a step 206 of detecting, as the light field image data, the spatio-spectrally filtered diffracted wavefront using a pixel array positioned under the color filter array, in the near-field diffraction plane. The pixel array may include a plurality of light-sensitive pixels and a pixel pitch along the grating axis that is equal to or larger than the grating period. In some implementations, the ratio of the pixel pitch to the grating period may be equal to $(2n+1)/2$, where n is a positive integer. For example, the ratio of the of the pixel pitch to the grating period may be equal to 3/2 (for n=1) or 5/2 (for n=2). Of course, the ratio of the pixel pitch to the grating period may take other values, as discussed in detail above. It may be appreciated that when the spatio-spectral filtering step 204 is omitted, no color filter array is disposed between the diffraction grating assembly and the pixel array, and the detecting step 206 involves the direct detection of the diffracted wavefront with the plurality of light-sensitive pixels. The detecting step 206 may include sampling, by each light-sensitive pixel, a respective portion of the diffracted wavefront to generate a corresponding pixel response, where the light-sensitive pixels include groups or pairs of adjacent pixels. The adjacent pixels in each group or pair may have different pixel responses as a function of the angle of incidence. In order to detect the diffracted wavefront in a near-field diffraction plane, the method 200 may include a step of setting a separation distance between the refractive index modulation pattern of the diffraction grating and a light-receiving surface of the pixel array to be less than about twenty times a center wavelength of the optical wavefront or to range between about 0.2 μm and about 20 μm. In some embodiments, the separation distance may correspond to non-integer multiples of the half-Talbot distance, $z_T/2$, for example, $z_T/4$ and $3z_T/4$.

In some implementations, the method 200 may include a step of computing, for each pair of adjacent pixels, a sum of the pixel responses of the adjacent pixels, thereby obtaining a plurality of summed pixel responses, and a step of generating a 2D image of the scene from the plurality of summed pixel responses. Additionally, or alternatively, the method may include a step of computing, for each pair of adjacent pixels, a difference between the pixel responses of the adjacent pixels, thereby obtaining a plurality of differential pixel responses, and a step a generating a depth image of the scene from the plurality of differential pixel responses.

Figure 19:
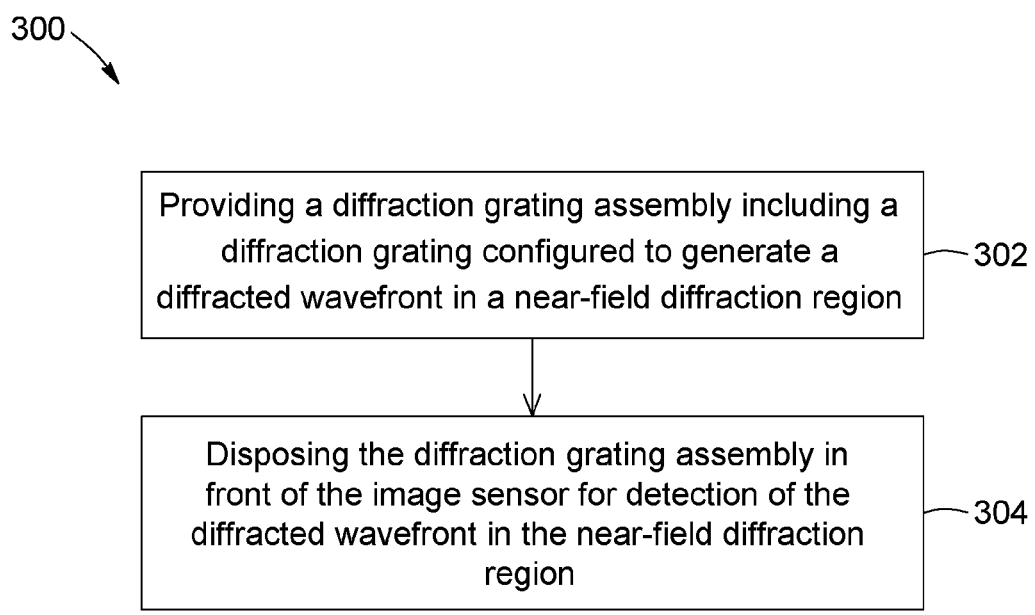
FIG. 19 is a flow diagram of a method of providing 3D imaging capabilities to an image sensor viewing a scene and including an array of light-sensitive pixels, in accordance with a possible embodiment.

Referring now to FIG. 19, there is provided a flow diagram of a method 300 of providing 3D or light field imaging capabilities, for example, depth mapping capabilities, to an image sensor including a pixel array having a plurality of light-sensitive pixels and a pixel pitch along a pixel axis. For example, the image sensor may be a conventional or custom-designed frontside- or backside-illuminated CMOS or CCD sensor. In color applications, the image sensor may include a color filter array in front of the pixel array, as noted above. The method 300 may include a step 302 of providing a diffraction grating assembly including a diffraction grating having a refractive index modulation pattern with a grating period along a grating axis. The grating period may be selected to be equal to or smaller than the pixel pitch, as discussed above. The diffraction grating is configured to diffract an incident optical wavefront into a diffracted wavefront having, in a near-field diffraction plane, an intensity pattern that is spatially modulated according to the grating period and that shifts laterally along the grating axis as a function of an angle of incidence of the optical wavefront. In some implementations, the providing step 302 may include providing the diffraction grating as a binary phase grating including a series of ridges periodically spaced-apart at the grating period, interleaved with a series of grooves periodically spaced-apart at the grating period. Depending on the application, the providing step 302 may include providing the diffraction grating assembly with a plurality of diffraction gratings, either with a single or multiple grating orientations, or with a single diffraction grating.

The method 300 may also include a step 304 of disposing the diffraction grating assembly in front of the image sensor with the grating axis parallel to the pixel axis and the light-sensitive pixels located at the near-field diffraction plane for detection of the diffracted wavefront and including laterally adjacent pixels configured to generate different pixel responses as a function of the angle of incidence, as described above. In some implementations, the disposing step 304 may include orienting the grating axis either parallel to one of two orthogonal pixel axes of the pixel array or oblique (e.g., at 45°) to the pixel axes. In order for the pixel array to detect the diffracted wavefront in a near-field diffraction region, the disposing step 304 may include positioning the diffraction grating assembly at a separation distance from the pixel array that ranges from about 0.2 µm to about 20 µm, or positioning the diffraction grating assembly at a separation distance from the pixel array selected such that an optical path length of the diffracted wavefront prior to being detected with the light-sensitive pixels is less than about twenty times a center wavelength of the optical wavefront. In some embodiments, the separation distance may correspond to non-integer multiples of the half-Talbot distance, $z_T/2$, for example, $z_T/4$ and $3z_T/4$.

Of course, numerous modifications could be made to the embodiments described above without departing from the scope of the appended claims.

The invention claimed is:

1. A light field imaging device, comprising:
a diffraction grating assembly configured to receive an optical wavefront incident from a scene, the diffraction grating assembly comprising a diffraction grating having a grating axis and a refractive index modulation pattern with a grating period along the grating axis, the diffraction grating being configured to generate, in a near-field region, a diffracted wavefront having an intensity pattern that is spatially modulated according to the grating period and that shifts laterally along the grating axis as a function of an angle of incidence of the optical wavefront; and
a pixel array configured to detect the diffracted wavefront in the near-field region, the pixel array having a plurality of light-sensitive pixels and a pixel pitch along the grating axis, a ratio of the pixel pitch to the grating period being equal to $(2n+1)/2$, where n is a positive integer, the light-sensitive pixels being configured to sample respective portions of the diffracted wavefront and generate therefrom corresponding pixel responses, the plurality of light-sensitive pixels comprising pairs of adjacent pixels, the adjacent pixels in each pair having different pixel responses as a function of the angle of incidence.

2. The light field imaging device of claim 1, wherein n=1 or n=2.

3. The light field imaging device of claim 1, further comprising a processor configured to:
compute a plurality of summed pixel responses, each summed pixel response being based on a sum of the pixel responses of a respective one of the pairs of adjacent pixels, and generate a 2D image of the scene from the plurality of summed pixel responses; and/or
compute a plurality of differential pixel responses, each differential pixel response being based on a difference between the pixel responses of a respective one of the pairs of adjacent pixels, and generate a depth image of the scene from the plurality of differential pixel responses.

4. The light field imaging device of claim 1, wherein the diffraction grating is a binary phase grating, and wherein the refractive index modulation pattern comprises a series of ridges periodically spaced-apart at the grating period, interleaved with a series of grooves periodically spaced-apart at the grating period.

5. The light field imaging device of claim 4, wherein a degree of alignment between the ridges and the grooves and the underlying light-sensitive pixels changes as a function of position within the pixel array in accordance with a chief ray angle distribution of the optical wavefront.

6. The light field imaging device of claim 1, wherein a separation distance between the refractive index modulation pattern of the diffraction grating and a light-receiving surface of the pixel array ranges from 0.2 micrometer to 20 micrometers.

7. The light field imaging device of claim 1, further comprising a color filter array disposed over the pixel array and comprising a plurality of color filters arranged in a mosaic color pattern, the color filter array being configured to filter the diffracted wavefront according to the mosaic color pattern prior to detection of the diffracted wavefront by the pixel array.

8. The light field imaging device of claim 7, wherein the adjacent pixels in each pair are disposed under identical color filters.

9. The light field imaging device of claim 1, wherein the diffraction grating is one of a plurality of diffraction gratings of the diffraction grating assembly.

10. The light field imaging device of claim 9, wherein the plurality of diffraction gratings comprises multiple sets of diffraction gratings, the grating axes of the diffraction gratings of different ones of the sets having different orientations.

11. The light field imaging device of claim 1, wherein the diffraction grating is one of a plurality of diffraction gratings of the diffraction grating assembly, each diffraction grating comprises a grating substrate including a top surface having the refractive index modulation pattern formed thereon, and the grating substrate comprises a spectral filter material or region configured to filter the diffracted wavefront prior to detection of the diffracted wavefront by the plurality of light-sensitive pixels, the plurality of diffraction gratings thus forming a color filter array.

12. A method of capturing light field image data about a scene, the method comprising:
diffracting an optical wavefront originating from the scene with a diffraction grating having a grating axis and a refractive index modulation pattern with a grating period along the grating axis to generate a diffracted wavefront having, in a near-field diffraction region, an intensity pattern that is spatially modulated according to the grating period and that shifts laterally along the grating axis as a function of an angle of incidence of the optical wavefront; and
detecting, as the light field image data, the diffracted wavefront with a pixel array positioned in the near-field diffraction region, the pixel array having a plurality of light-sensitive pixels and a pixel pitch along the grating axis, a ratio of the pixel pitch to the grating period being equal to $(2n+1)/2$, where n is a positive integer, said detecting comprising sampling, by the light-sensitive pixels, respective portions of the diffracted wavefront to generate corresponding pixel responses, the plurality of light-sensitive pixels comprising pairs of adjacent pixels, the adjacent pixels in each pair having different pixel responses as a function of the angle of incidence.

13. The method of claim 12, further comprising setting n equal to one or two.

14. The method of claim 12, further comprising:
computing a plurality of summed pixel responses, each summed pixel response being based on a sum of the pixel responses of a respective one of the pairs of adjacent pixels; and
generating a 2D image of the scene from the plurality of summed pixel responses.

15. The method of claim 12, further comprising:
computing a plurality of differential pixel responses, each differential pixel response being based on a difference between the pixel responses of a respective one of the pairs of adjacent pixels; and
generating a depth image of the scene from the plurality of differential pixel responses.

16. The method of claim 12, further comprising providing the diffraction grating as a binary phase grating comprising a series of ridges periodically spaced-apart at the grating period, interleaved with a series of grooves periodically spaced-apart at the grating period.

17. The method of claim 16, further comprising providing a degree of alignment between the ridges and the grooves and the underlying light-sensitive pixels that changes as a function of position within the pixel array in accordance with a chief ray angle distribution of the optical wavefront.

18. The method of claim 12, further comprising filtering the diffracted wavefront with a color filter array prior to detecting the diffracted wavefront with the plurality of light-sensitive pixels.

19. A light field imaging device, comprising:
a diffraction grating assembly configured to receive an optical wavefront incident from a scene, the diffraction grating assembly comprising a phase diffraction grating having a grating axis and a refractive index modulation pattern with a grating period along the grating axis, the refractive index modulation pattern comprising a series of ridges periodically spaced-apart at the grating period, interleaved with a series of grooves periodically spaced-apart at the grating period, the diffraction grating being configured to diffract the optical wavefront to generate a diffracted wavefront; and
a pixel array having a plurality of light-sensitive pixels disposed under the diffraction grating assembly and configured to detect the diffracted wavefront in a near-field region, the pixel array having a pixel pitch along the grating axis, a ratio of the pixel pitch to the grating period being equal to $(2n+1)/2$, where n is a positive integer.

20. The light field imaging device of claim 19, wherein n=1 or n=2.

* * * * *